US012368835B2

(12) United States Patent
Irie et al.

(10) Patent No.: US 12,368,835 B2
(45) Date of Patent: *Jul. 22, 2025

(54) DISPLAY CONTROL DEVICE, DISPLAY CONTROL METHOD, AND PROGRAM

(71) Applicant: FUJIFILM CORPORATION, Tokyo (JP)

(72) Inventors: Fuminori Irie, Saitama (JP); Takashi Aoki, Saitama (JP); Kazunori Tamura, Saitama (JP); Masahiko Miyata, Saitama (JP)

(73) Assignee: FUJIFILM CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/398,988

(22) Filed: Dec. 28, 2023

(65) Prior Publication Data

US 2024/0129449 A1 Apr. 18, 2024

Related U.S. Application Data

(63) Continuation of application No. 17/558,537, filed on Dec. 21, 2021, now Pat. No. 11,909,945, which is a (Continued)

(30) Foreign Application Priority Data

Jun. 28, 2019 (JP) .................................. 2019-122033

(51) Int. Cl.
*H04N 13/282* (2018.01)
*G02B 27/01* (2006.01)
*H04N 13/279* (2018.01)

(52) U.S. Cl.
CPC ......... *H04N 13/282* (2018.05); *G02B 27/017* (2013.01); *H04N 13/279* (2018.05); *G02B 2027/0138* (2013.01); *G02B 2027/014* (2013.01)

(58) Field of Classification Search
None
See application file for complete search history.

(56) References Cited

U.S. PATENT DOCUMENTS

2005/0046698 A1  3/2005  Knight
2012/0060177 A1  3/2012  Stinson, III
(Continued)

FOREIGN PATENT DOCUMENTS

JP   2002-032788 A   1/2002
JP   2015-116336 A   6/2015
(Continued)

OTHER PUBLICATIONS

International Search Report issued in International Application No. PCT/JP2020/024637 on Sep. 15, 2020.
(Continued)

*Primary Examiner* — Stefan Gadomski
(74) *Attorney, Agent, or Firm* — SOLARIS Intellectual Property Group, PLLC

(57) ABSTRACT

A display control device includes a first acquisition unit that acquires first viewpoint position information, and a first control unit that performs a control of displaying a first viewpoint video selected from among a plurality of viewpoint videos generated based on images obtained by imaging an imaging region from a plurality of viewpoint positions on a first display unit, in which the first control unit performs a control of displaying first specific information for specifying a first viewpoint position in the first viewpoint video in a case in which the first viewpoint position indicated by
(Continued)

the acquired first viewpoint position information is included in the first viewpoint video and performs a control of changing a display size of the first specific information depending on an angle of view of the first viewpoint video displayed on the first display unit.

32 Claims, 45 Drawing Sheets

Related U.S. Application Data continuation of application No. PCT/JP2020/024637, filed on Jun. 23, 2020.

(56) References Cited

U.S. PATENT DOCUMENTS

| | | |
|---|---|---|
| 2013/0141588 A1 | 6/2013 | Crookham et al. |
| 2017/0171570 A1 | 6/2017 | Mitsumoto |
| 2018/0061071 A1 | 3/2018 | Okutani |
| 2018/0096520 A1 | 4/2018 | Yoshimura et al. |
| 2018/0176502 A1 | 6/2018 | Bhuruth et al. |
| 2018/0288394 A1 | 10/2018 | Aizawa |
| 2018/0304153 A1 | 10/2018 | Hohjoh et al. |
| 2018/0330536 A1 | 11/2018 | Sawaki |
| 2018/0352215 A1 | 12/2018 | Iwakiri |
| 2018/0376217 A1 | 12/2018 | Kahng et al. |
| 2019/0068997 A1 | 2/2019 | Hellmuth et al. |
| 2019/0133689 A1 | 5/2019 | Johnson et al. |
| 2019/0197789 A1 | 6/2019 | MaCauley et al. |

FOREIGN PATENT DOCUMENTS

| | | |
|---|---|---|
| JP | 2018-106297 A | 7/2018 |
| JP | 2018-190336 A | 11/2018 |
| JP | 2019-062302 A | 4/2019 |
| KR | 1586651 B1 | 1/2016 |
| WO | 2017/068824 A1 | 4/2017 |

OTHER PUBLICATIONS

Written Opinion of the ISA issued in International Application No. PCT/JP2020/024637 on Sep. 15, 2020.

Notice of Allowance issued by USPTO on Oct. 11, 2023, in related U.S. Appl. No. 17/558,537.

DISPLAY CONTROL DEVICE, DISPLAY CONTROL METHOD, AND PROGRAM

CROSS-REFERENCE TO RELATED APPLICATIONS

This application is a continuation application of U.S. Ser. No. 17/558,537, filed on Dec. 21, 2021, which is a continuation application of International Application No. PCT/JP2020/024637, filed Jun. 23, 2020. Further, this application claims priority from Japanese Patent Application No. 2019-122033, filed Jun. 28, 2019. The entire disclosure of each of the above applications is incorporated by reference herein.

BACKGROUND

1. Technical Field

The technology of the present disclosure relates to a display control device, a display control method, and a program.

2. Related Art

JP2018-190336A discloses a method executed by a computer for providing a virtual space by a head mount device, the method comprising a step of defining the virtual space, a step of receiving a first voice signal corresponding utterance of a user of the head mount device, and a step of executing imaging in the virtual space by using the first voice signal as a trigger. The method disclosed in JPA2018-190336A further comprises a step of disposing a first avatar object corresponding to the user in the virtual space and a step of disposing a second avatar object corresponding to a user of another computer capable of communicating with the computer in the virtual space, in which executing imaging includes imaging at least a part of each of the first and second avatar objects based on positional information of the first and second avatar objects.

JP2018-106297A discloses a mixed reality presentation system. The mixed reality presentation system disclosed in JP2018-106297A includes a device having an imaging unit and a display unit, the device being a plurality of head mountable devices, a storage unit that stores identification information of a local coordinate space to which each device belongs, a CG model information for drawing a CG model to be composed on an image captured by the imaging unit, and avatar information for drawing an avatar displayed on behalf of a person with experience who mounts each device, a detection unit that detects a position and a posture of each device, and a control unit that composes the CG model and the avatar on the image captured by the imaging unit of each device based on the position and the posture of the device and outputs the composite image obtained by composing to each display unit.

In the mixed reality presentation system disclosed in JP2018-106297A, the control unit includes a composing unit that, in a case in which one of the plurality of devices is used as an interest device, composes the CG model based on the position and the posture of the interest device and an avatar corresponding to another device belonging to the local coordinate space, which is different from the interest device, on the image captured by the imaging unit of the interest device, and the composing unit composes the CG model and the avatar by controlling an output of the avatar corresponding the other device such that the CG model is visually recognized based on a positional relationship between the interest device, the CG model, and the other device.

SUMMARY

One embodiment according to the technology of the present disclosure provides a display control device, a display control method, and a program which can, in a state in which presence of a specific person can be perceived through a viewpoint video selected from among a plurality of viewpoint videos, change a sense of presence of the specific person depending on an angle of view of the viewpoint video visually recognized.

A first aspect of the technology of the present disclosure relates to a display control device including a first acquisition unit that acquires first viewpoint position information indicating a first viewpoint position of a first person with respect to an imaging region, and a first control unit that performs a control of displaying a first viewpoint video selected from among a plurality of viewpoint videos generated based on images obtained by imaging the imaging region from a plurality of viewpoint positions different from each other on a first display unit, the first display unit being capable of displaying a video visually recognized by a second person different from the first person, in which the first control unit performs a control of displaying first specific information for specifying the first viewpoint position indicated by the first viewpoint position information acquired by the first acquisition unit in the first viewpoint video and performs a control of changing a display size of the first specific information depending on an angle of view of the first viewpoint video displayed on the first display unit in a case in which the first viewpoint position indicated by the first viewpoint position information acquired by the first acquisition unit is included in the first viewpoint video.

A second aspect of the technology of the present disclosure relates to the display control device according to the first aspect, in which the first control unit performs a control of causing the first display unit to set a degree of difference between an image quality of the first viewpoint video and an image quality of the first specific information within a first predetermined range.

A third aspect of the technology of the present disclosure relates to the display control device according to the first aspect or the second aspect, in which the first control unit performs a control of causing the first display unit to change a display aspect of the first specific information depending on a relationship between a display size of the first viewpoint video and the display size of the first specific information.

A fourth aspect of the technology of the present disclosure relates to the display control device according to the third aspect, in which the first control unit changes the display aspect of the first specific information by causing the first display unit to hide the first specific information, to display only an outline of the first specific information, or to translucently display the first specific information in a case in which a ratio of the display size of the first specific information to the display size of the first viewpoint video is equal to or more than a first threshold value.

A fifth aspect of the technology of the present disclosure relates to the display control device according to the third aspect or the fourth aspect, in which the first control unit changes the display aspect of the first specific information depending on the relationship between the display size of the first viewpoint video and the display size of the first specific information and a relationship between a display position of the first viewpoint video and a display position of the first specific information.

A sixth aspect of the technology of the present disclosure relates to the display control device according to the third aspect, in which the first control unit causes the first display unit to display the first specific information in a display aspect emphasized more than other regions in the first viewpoint video in a case in which a ratio of the display size of the first specific information to the display size of the first viewpoint video is less than a second threshold value.

A seventh aspect of the technology of the present disclosure relates to the display control device according to any one of the first aspect to the sixth aspect, in which the first display unit is provided in a first head mounted display mounted on the second person.

An eighth aspect of the technology of the present disclosure relates to the display control device according to any one of the first aspect to the seventh aspect, in which the first viewpoint video is a viewpoint video selected from among the plurality of viewpoint videos in response to a first instruction for selecting any one of the plurality of viewpoint videos, which is received by a first reception unit capable of receiving the first instruction.

A ninth aspect of the technology of the present disclosure relates to the display control device according to any one of the first aspect to the eighth aspect, in which the first acquisition unit further acquires first visual line direction information indicating a first visual line direction of the first person with respect to the imaging region, and the first specific information includes information for specifying the first visual line direction indicated by the first visual line direction information acquired by the first acquisition unit.

A tenth aspect of the technology of the present disclosure relates to the display control device according to any one of the first aspect to the ninth aspect, in which each of the plurality of viewpoint videos has peculiar viewpoint position information indicating a peculiar viewpoint position, each of the plurality of viewpoint videos is a video showing the imaging region observed from the corresponding peculiar viewpoint position, and the first viewpoint position information is the peculiar viewpoint position information of any one of the plurality of viewpoint videos.

An eleventh aspect of the technology of the present disclosure relates to the display control device according to the tenth aspect, in which the first acquisition unit acquires the peculiar viewpoint position information corresponding to a second viewpoint video selected from among the plurality of viewpoint videos which is displayed on a second display unit, the second display unit being capable of displaying a video visually recognized by the first person and the second viewpoint video, as the first viewpoint position information.

A twelfth aspect of the technology of the present disclosure relates to the display control device according to any one of the first aspect to the eighth aspect, in which the first acquisition unit further acquires first visual line direction information indicating a first visual line direction of the first person with respect to the imaging region, the first specific information includes information for specifying the first visual line direction indicated by the first visual line direction information acquired by the first acquisition unit, and the first acquisition unit acquires information indicating a direction facing a second viewpoint video selected from among the plurality of viewpoint videos which is displayed on a second display unit, the second display unit being capable of displaying a video visually recognized by the first person and the second viewpoint video, as the first visual line direction information.

A thirteenth aspect of the technology of the present disclosure relates to the display control device according to the twelfth aspect, in which the second display unit is provided in a second head mounted display mounted on the first person.

A fourteenth aspect of the technology of the present disclosure relates to the display control device according to any one of the eleventh aspect to the thirteenth aspect, in which the second viewpoint video is a viewpoint video selected from among the plurality of viewpoint videos in response to a second instruction for selecting any one of the plurality of viewpoint videos, which is received by a second reception unit capable of receiving the second instruction.

A fifteenth aspect of the technology of the present disclosure relates to the display control device according any one of the first aspect to the eighth aspect further including a second acquisition unit that acquires second viewpoint position information indicating a second viewpoint position of the second person with respect to the imaging region, and a second control unit that performs a control of displaying a second viewpoint video selected from among the plurality of viewpoint videos on a second display unit, the second display unit being capable of displaying a video visually recognized by the first person, in which the second control unit performs a control of displaying second specific information for specifying the second viewpoint position indicated by the second viewpoint position information acquired by the second acquisition unit in the second viewpoint video and performs a control of changing a display size of the second specific information depending on an angle of view of the second viewpoint video displayed on the second display unit in a case in which the second viewpoint position indicated by the second viewpoint position information acquired by the second acquisition unit is included in the second viewpoint video.

A sixteenth aspect of the technology of the present disclosure relates to the display control device according to the fifteenth aspect, in which the second control unit performs a control of causing the second display unit to set a degree of difference between an image quality of the second viewpoint video and an image quality of the second specific information within a second predetermined range.

A seventeenth aspect of the technology of the present disclosure relates to the display control device according to the fifteenth aspect or the sixteenth aspect, in which the first control unit performs a control of causing the second display unit to change a display aspect of the second specific information depending on a relationship between a display size of the second viewpoint video and the display size of the second specific information.

An eighteenth aspect of the technology of the present disclosure relates to the display control device according to the seventeenth aspect, in which the second control unit changes the display aspect of the second specific information by causing the second display unit to hide the second specific information, to display only an outline of the second specific information, or to translucently display the second specific information in a case in which a ratio of the display size of the second specific information to the display size of the second viewpoint video is equal to or more than a third threshold value.

A nineteenth aspect of the technology of the present disclosure relates to the display control device according to the fifteenth aspect or the sixteenth aspect, in which the second control unit changes the display aspect of the second specific information depending on a relationship between a display size of the second viewpoint video and the display size of the second specific information and a relationship between a display position of the second viewpoint video and a display position of the second specific information.

A twentieth aspect of the technology of the present disclosure relates to the display control device according to the seventeenth aspect, in which the second control unit causes the second display unit to display the second specific information in a display aspect emphasized more than other regions in the second viewpoint video in a case in which a ratio of the display size of the second specific information to the display size of the second viewpoint video is less than a fourth threshold value.

A twenty-first aspect of the technology of the present disclosure relates to the display control device according to any one of the first aspect to the twentieth aspect, in which the second acquisition unit further acquires second visual line direction information indicating a second visual line direction of the second person with respect to the imaging region, and the second specific information includes information for specifying the second visual line direction indicated by the second visual line direction information acquired by the second acquisition unit.

A twenty-second aspect of the technology of the present disclosure relates to the display control device according to any one of the fifteenth aspect to the twenty-first aspect, in which each of the plurality of viewpoint videos has peculiar viewpoint position information indicating a peculiar viewpoint position, each of the plurality of viewpoint videos is a video showing the imaging region observed from the corresponding peculiar viewpoint position, and each of the first viewpoint position information and the second viewpoint position information is the peculiar viewpoint position information of any one of the plurality of viewpoint videos.

A twenty-third aspect of the technology of the present disclosure relates to the display control device according to the twenty-second aspect, in which the first acquisition unit acquires the peculiar viewpoint position information corresponding to the second viewpoint video selected from among the plurality of viewpoint videos which is displayed on the second display unit, the second display unit being capable of displaying the video visually recognized by the first person and the second viewpoint video, as the first viewpoint position information, and the second acquisition unit acquires the peculiar viewpoint position information corresponding to the first viewpoint video displayed on the first display unit as the second viewpoint position information.

A twenty-fourth aspect of the technology of the present disclosure relates to the display control device according to any one of the fifteenth aspect to the twenty-third aspect, in which the first acquisition unit further acquires first visual line direction information indicating a first visual line direction of the first person with respect to the imaging region, the first specific information includes information for specifying the first visual line direction indicated by the first visual line direction information acquired by the first acquisition unit, the first acquisition unit acquires information indicating a direction facing the second viewpoint video displayed on the second display unit as the first visual line direction information, the second acquisition unit further acquires second visual line direction information indicating a second visual line direction of the second person with respect to the imaging region, the second specific information includes information for specifying the second visual line direction indicated by the second visual line direction information acquired by the second acquisition unit, and the second acquisition unit acquires information indicating a direction facing the first viewpoint video displayed on the first display unit as the second visual line direction information.

A twenty-fifth aspect of the technology of the present disclosure relates to the display control device according to any one of the fifteenth aspect to the twenty-fourth aspect, in which the second display unit is provided in a second head mounted display mounted on the first person.

A twenty-sixth aspect of the technology of the present disclosure relates to the display control device according to any one of the fifteenth aspect to the twenty-fifth aspect, in which the second viewpoint video is a viewpoint video selected from among the plurality of viewpoint videos in response to a second instruction for selecting any one of the plurality of viewpoint videos, which is received by a second reception unit capable of receiving the second instruction.

A twenty-seventh aspect of the technology of the present disclosure relates to the display control device according to any one of the fifteenth aspect to the twenty-sixth aspect further including a first setting unit that performs setting for hiding the second specific information in a case in which a first predetermined condition is satisfied.

A twenty-eighth aspect of the technology of the present disclosure relates to the display control device according to any one of the first aspect to the twenty-seventh aspect, in which a viewpoint position of at least one of the first person or the second person with respect to the imaging region is limited to a partial region of the imaging region.

A twenty-ninth aspect of the technology of the present disclosure relates to the display control device according to any one of the first aspect to the twenty-eighth aspect further including a second setting unit that performs setting for hiding the first specific information in a case in which a second predetermined condition is satisfied.

A thirtieth aspect of the technology of the present disclosure relates to the display control device according to any one of the first aspect to the twenty-ninth aspect, in which at least one of the plurality of viewpoint videos is a virtual viewpoint video.

A thirty-first aspect of the technology of the present disclosure relates to a display control method including acquiring first viewpoint position information indicating a first viewpoint position of a first person with respect to an imaging region, performing a control of displaying a first viewpoint video selected from among a plurality of viewpoint videos generated based on images obtained by imaging the imaging region from a plurality of viewpoint positions different from each other on a first display unit, the first display unit being capable of displaying a video visually recognized by a second person different from the first person, and performing a control of displaying first specific information for specifying the first viewpoint position indicated by the acquired first viewpoint position information in the first viewpoint video and performing a control of changing a display size of the first specific information depending on an angle of view of the first viewpoint video displayed on the first display unit in a case in which the first viewpoint position indicated by the acquired first viewpoint position information is included in the first viewpoint video.

A thirty-second aspect of the technology of the present disclosure relates to a program causing a computer to execute a process including acquiring first viewpoint position information indicating a first viewpoint position of a first person with respect to an imaging region, performing a control of displaying a first viewpoint video selected from among a plurality of viewpoint videos generated based on images obtained by imaging the imaging region from a plurality of viewpoint positions different from each other on a first display unit, the first display unit being capable of displaying a video visually recognized by a second person different from the first person, and performing a control of displaying first specific information for specifying the first viewpoint position indicated by the acquired first viewpoint position information in the first viewpoint video and performing a control of changing a display size of the first specific information depending on an angle of view of the first viewpoint video displayed on the first display unit in a case in which the first viewpoint position indicated by the acquired first viewpoint position information is included in the first viewpoint video.

BRIEF DESCRIPTION OF THE DRAWINGS

Exemplary embodiments of the technology of the disclosure will be described in detail based on the following figures, wherein.

DETAILED DESCRIPTION

An example of an embodiment according to the technology of the present disclosure will be described with reference to the accompanying drawings.

First, the terms used in the following description will be described.

CPU refers to an abbreviation of "central processing unit". RAM refers to an abbreviation of "random access memory". DRAM refers to an abbreviation of "dynamic random access memory". SRAM refers to an abbreviation of "static random access memory". ROM refers to an abbreviation of "read only memory". SSD refers to an abbreviation of "solid state drive". HDD refers to an abbreviation of "hard disk drive". EEPROM refers to an abbreviation of "electrically erasable and programmable read only memory". OF refers to an abbreviation of "interface". IC refers to an abbreviation of "integrated circuit". ASIC refers to an abbreviation of "application specific integrated circuit". PLD refers to an abbreviation of "programmable logic device". FPGA refers to an abbreviation of "field-programmable gate array". SoC refers to an abbreviation of "system-on-a-chip". CMOS refers to an abbreviation of "complementary metal oxide semiconductor". CCD refers to an abbreviation of "charge coupled device". EL refers to an abbreviation of "electro-luminescence". GPU refers to an abbreviation of "graphics processing unit". LAN refers to an abbreviation of "local area network". 3D refers to an abbreviation of "3 dimension". USB refers to an abbreviation of "universal serial bus". HMD refers to an abbreviation of "head mounted display". fps refers to an abbreviation of "frame per second". GPS refers to an abbreviation of "global positioning system".

Figure 1:
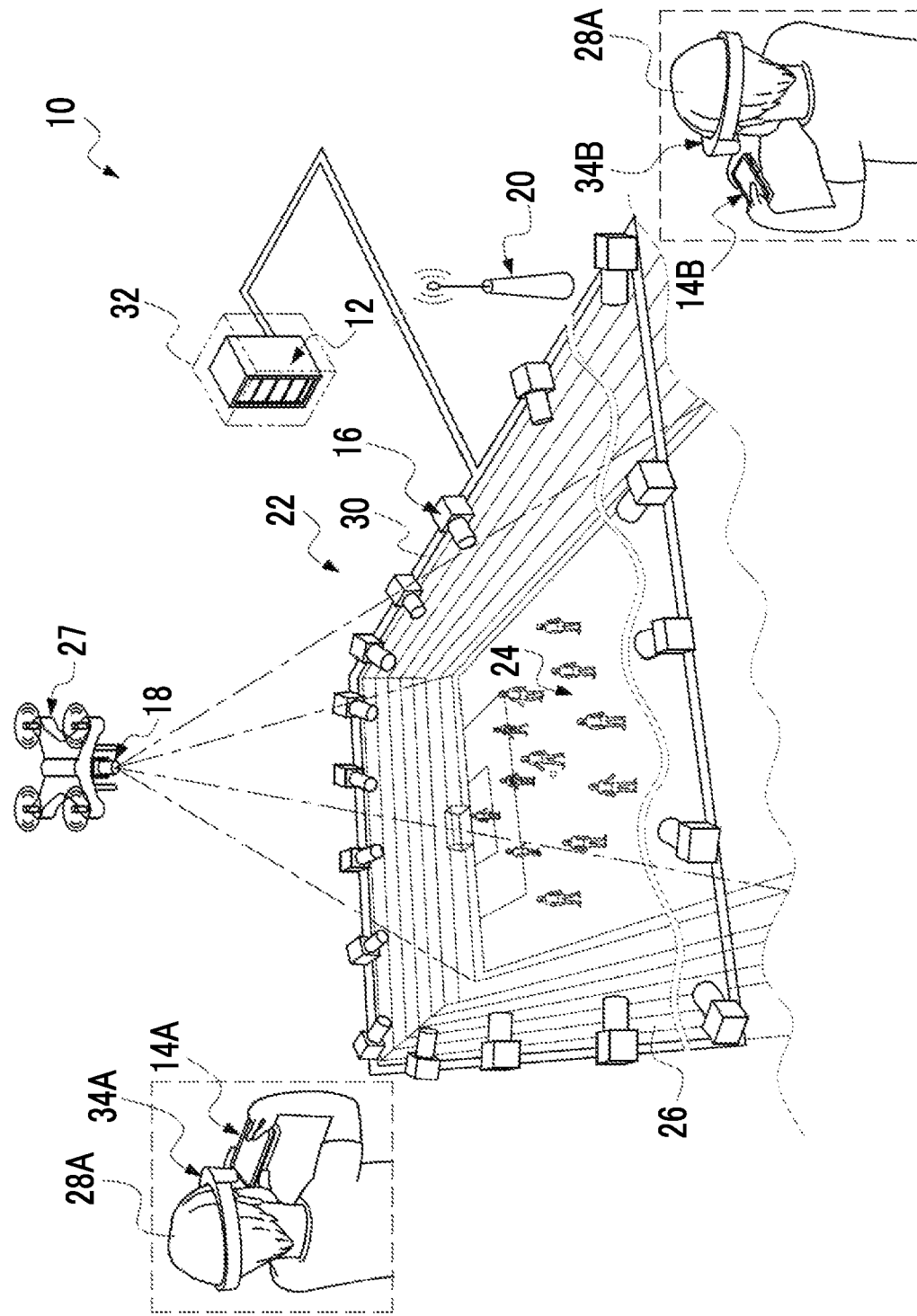
FIG. 1 is a schematic perspective diagram showing an example of an external configuration of an information processing system according to an embodiment.

For example, as shown in FIG. 1, an information processing system 10 comprises a display control device 12, a first smartphone 14A, a second smartphone 14B, a plurality of imaging apparatuses 16, an imaging apparatus 18, and a wireless communication base station (hereinafter, simply referred to as "base station") 20, a first HMD 34A, and a second HMD 34B.

The imaging apparatuses 16 and 18 are devices for imaging having a CMOS image sensor, and each have an optical zoom function and a digital zoom function. Note that another type of image sensor, such as a CCD image sensor, may be adopted instead of the CMOS image sensor. Hereinafter, for convenience of description, in a case in which a distinction is not necessary, the imaging apparatus 18 and the plurality of imaging apparatuses 16, are referred to as "plurality of imaging apparatuses" without reference numeral.

The plurality of imaging apparatuses 16 are installed in a soccer stadium 22. Each of the plurality of imaging apparatuses 16 is disposed so as to surround a soccer field 24, and images a region including the soccer field 24 as an imaging region. Here, an aspect example is described in which each of the plurality of imaging apparatuses 16 is disposed so as to surround the soccer field 24. However, the technology of the present disclosure is not limited to this, and the disposition of the plurality of imaging apparatuses 16 is decided depending on a virtual viewpoint image to be generated. The plurality of imaging apparatuses 16 may be disposed so as to surround the whole soccer field 24, or the plurality of imaging apparatuses 16 may be disposed so as to surround a specific part thereof. The imaging apparatus 18 is installed in an unmanned aerial vehicle (for example, a drone), and images the region including the soccer field 24 as the imaging region in a bird's-eye view from the sky. The imaging region of the region including the soccer field 24 in a bird's-eye view from the sky refers to an imaging face on the soccer field 24 by the imaging apparatus 18.

The display control device 12 is installed in a control room 32. The plurality of imaging apparatuses 16 and the display control device 12 are connected to each other via a LAN cable 30, and the display control device 12 controls the plurality of imaging apparatuses 16 and acquires an image obtained by being imaged by each of the plurality of imaging apparatuses 16. Note that although the connection using a wired communication method by the LAN cable 30 is described as an example here, the technology of the present disclosure is not limited to this, and the connection using a wireless communication method may be used.

The base station 20 transmits and receives various pieces of information to and from the display control device 12, the first smartphone 14A, the second smartphone 14B, the first HMD 34A, the second HMD 34B, and an unmanned aerial vehicle 27 via radio waves. That is, the display control device 12 is connected to the first smartphone 14A, the second smartphone 14B, the first HMD 34A, the second HMD 34B, and the unmanned aerial vehicle 27 via the base station 20 in a wirelessly communicable manner. The display control device 12 controls the unmanned aerial vehicle 27 by wirelessly communicating with the unmanned aerial vehicle 27 via the base station 20, and acquires the image obtained by being imaged by the imaging apparatus 18 from the unmanned aerial vehicle 27.

The display control device 12 is a device corresponding to a server, and the first smartphone 14A, the second smartphone 14B, the first HMD 34A, and the second HMD 34B are devices corresponding to a client terminal with respect to the display control device 12. Note that, in the following, in a case in which a distinction is not necessary, the first smartphone 14A, the second smartphone 14B, the first HMD 34A, and the second HMD 34B are referred to as "terminal device" without reference numeral.

The display control device 12 and the terminal device wirelessly communicate with each other via the base station 20, so that the terminal device requests the display control device 12 to provide various services, and the display control device 12 provides the services to the terminal device in response to the request from the terminal device.

The display control device 12 acquires a plurality of the images from the plurality of imaging apparatuses, and transmits a video generated based on the acquired plurality of images to the terminal device via the base station 20. In the example shown in FIG. 1, a viewer 28A owns the first smartphone 14A, and the first HMD 34A is mounted on a head of the viewer 28A.

A viewer 28B is a different person from the viewer 28A. The viewer 28B owns the second smartphone 14B, and the second HMD 34B is mounted on a head of the viewer 28B. The video transmitted from the display control device 12 (hereinafter, also referred to as "distribution video") is received by the terminal device, and the distribution video received by the terminal device is visually recognized by the viewers 28A and 28B through the terminal device. Note that the viewer 28A is an example of a "second person" according to the technology of the present disclosure, and the viewer 28B is an example of a "first person" according to the technology of the present disclosure. In addition, the distribution video is an example of "video" according to the technology of the present disclosure.

Figure 2:
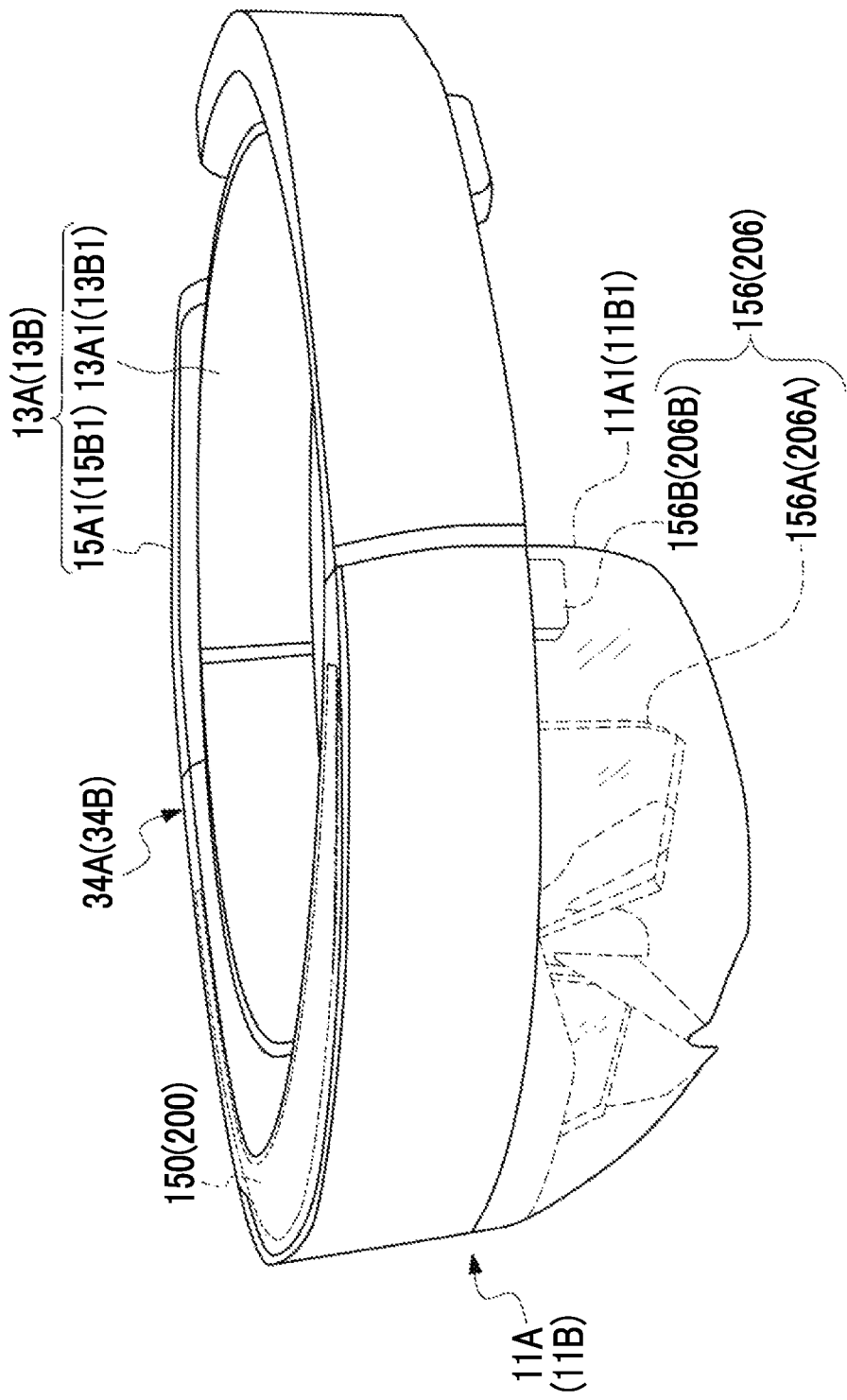
FIG. 2 is a schematic perspective diagram showing an example of an external configuration of a first HMD and a second HMD provided in the information processing system according to the embodiment.

For example, as shown in FIG. 2, the first HMD 34A comprises a body part 11A and a mounting part 13A. In a case in which the first HMD 34A is mounted on the viewer 28A, the body part 11A is positioned in front of the viewer 28A, and the mounting part 13A is positioned in the upper half of the head of the viewer 28A.

The mounting part 13A is a band-shaped member having a width of about several centimeters, and comprises an inner ring 13A1 and an outer ring 15A1. The inner ring 13A1 is formed in an annular shape and is fixed in a state of being closely attached to the upper half of the head of the viewer 28A. The outer ring 15A1 is formed in a shape in which an occipital side of the viewer 28A is cut out. The outer ring 15A1 bends outward from an initial position or shrinks inward from a bent state toward the initial position depending on adjustment of a size of the inner ring 13A1.

The body part 11A comprises a protective frame 11A1, a computer 150, and a display 156. The computer 150 controls the whole first HMD 34A. The protective frame 11A1 is one transparent plate curved so as to cover the whole eyes of the viewer 28A, and is made of, for example, transparent colored plastic.

The display 156 comprises a screen 156A and a projection unit 156B, and the projection unit 156B is controlled by the computer 150. The screen 156A is disposed inside the protective frame 11A1. The screen 156A is assigned to each of the eyes of viewer 28A. The screen 156A is made of a transparent material similar to the protective frame 11A1. The viewer 28A visually recognizes a real space via the screen 156A and the protective frame 11A1 with the naked eye. That is, the first HMD 34A is a transmission type HMD.

The screen 156A is located at a position facing the eyes of the viewer 28A, and the distribution video is projected on an inner surface of the screen 156A (surface on the viewer 28A side) by the projection unit 156B under the control of the computer 150. Since the projection unit 156B is a well-known device, detailed description thereof will be omitted. However, the projection unit 156B is a device including a display element, such as a liquid crystal, which displays the distribution video and projection optical system that projects the distribution video displayed on the display element toward the inner surface of the screen 156A. The screen 156A is realized by using a half mirror that reflects the distribution video projected by the projection unit 156B and transmits the light in the real space. The projection unit 156B projects the distribution video on the inner surface of the screen 156A at a predetermined frame rate (for example, 60 fps). The distribution video is reflected by the inner surface of the screen 156A and is incident on the eyes of the viewer 28A. As a result, the viewer 28A visually recognizes the distribution video. Note that the half mirror is described as an example of the screen 156A here, but the technology of the present disclosure is not limited to this, and the screen 156A itself may be used as the display element, such as the liquid crystal.

Note that the second HMD 34B also has the same configuration as the first HMD 34A, and the first HMD 34A is applied to the viewer 28A, whereas the second HMD 34B is applied to the viewer 28B.

The second HMD 34B comprises a body part 11B and a mounting part 13B. The mounting part 13B corresponds to the mounting part 13A of the first HMD 34A. In the example shown in FIG. 2, an inner ring 13B1 corresponds to the inner ring 13A1 and an outer ring 15B1 corresponds to the outer ring 15A1. In addition, in the example shown in FIG. 2, the body part 11B corresponds to the body part 11A of the first HMD 34A. In addition, in the example shown in FIG. 2, a protective frame 11B1 corresponds to the protective frame 11A1, a display 206 corresponds to the display 156, a computer 200 corresponds to the computer 150. In addition, in the example shown in FIG. 2, a screen 206A corresponds to the screen 156A, and a projection unit 206B corresponds to the projection unit 156B.

Figure 3:
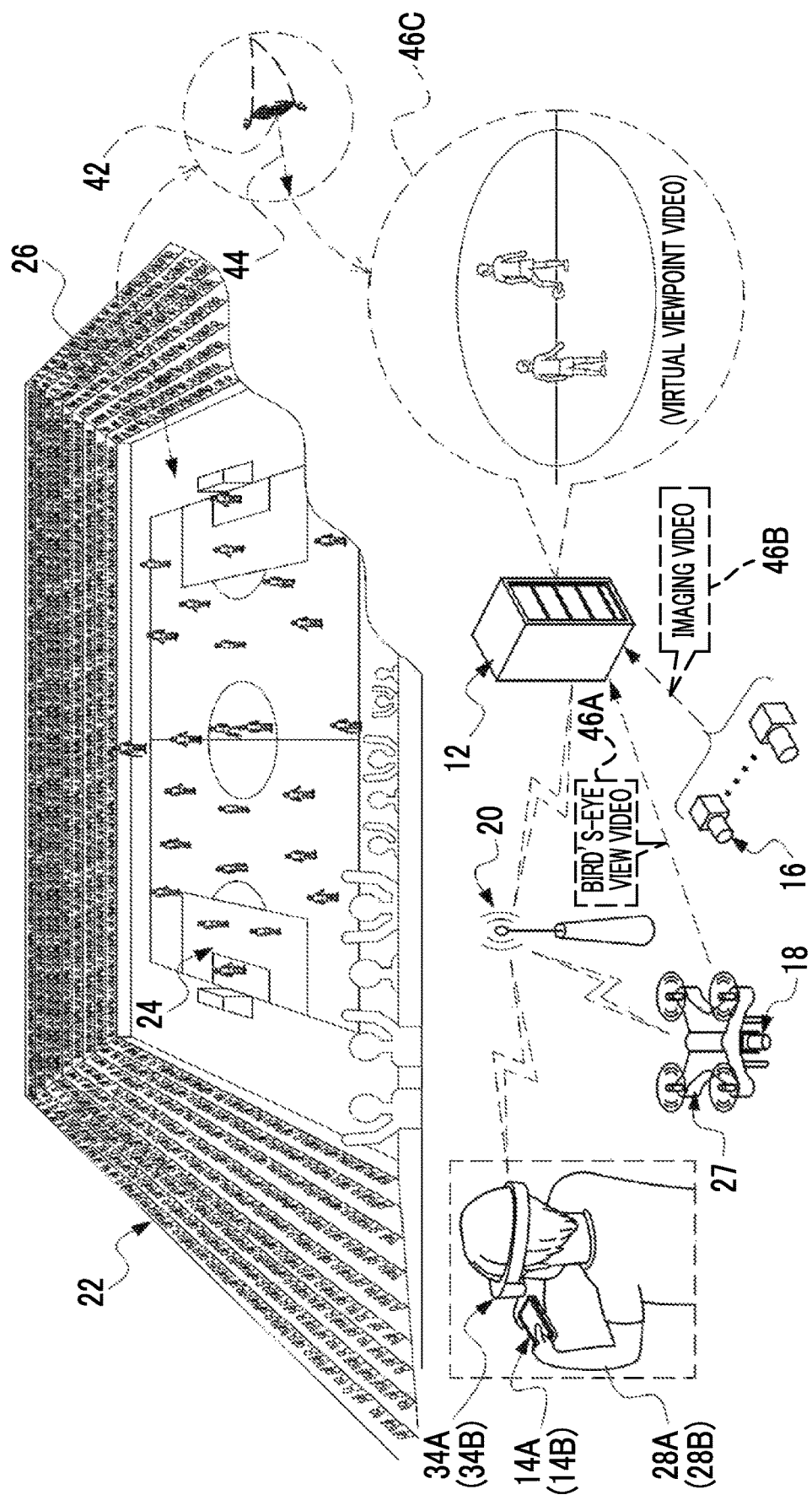
FIG. 3 is a conceptual diagram showing an example of a relationship between a display control device provided in the information processing system according to the embodiment and peripheral device thereof.

For example, as shown in FIG. 3, the display control device 12 acquires a bird's-eye view video 46A showing the region including the soccer field 24 in a case of being observed from the sky from the unmanned aerial vehicle 27. The bird's-eye view video 46A is a moving image obtained by imaging the region including the soccer field 24 as the imaging region (hereinafter, also simply referred to as "imaging region") in a bird's-eye view from the sky by the imaging apparatus 18 of the unmanned aerial vehicle 27. Note that although the bird's-eye view video 46A is described as an example here, the technology of the present disclosure is not limited to this, and may be a still image showing the region including the soccer field 24 in a case of being observed from the sky.

The display control device 12 acquires an imaging video 46B showing the imaging region in a case of being observed from each position of the plurality of imaging apparatuses 16 from each of the plurality of imaging apparatuses 16. The imaging video 46B is a moving image obtained by imaging the imaging region by each of the plurality of imaging apparatuses 16. Note that although the imaging video 46B is described as an example here, the technology of the present disclosure is not limited to this, and may be a still image showing the imaging region in a case of being observed from each position of the plurality of imaging apparatuses 16.

The bird's-eye view video 46A and the imaging video 46B are videos obtained by imaging the images from a plurality of viewpoint positions in which the regions including the soccer field 24 are different from each other, and are examples of "image" according to the technology of the present disclosure.

The display control device 12 generates a virtual viewpoint video 46C based on the bird's-eye view video 46A and the imaging video 46B. The virtual viewpoint video 46C is video showing the imaging region in a case in which the imaging region is observed from a viewpoint position and a visual line direction different from a viewpoint position and a visual line direction of each of the plurality of imaging apparatuses. In the example shown in FIG. 3, the virtual viewpoint video 46C refers to the virtual viewpoint video showing the imaging region in a case in which the imaging region is observed from a viewpoint position 42 and a visual line direction 44 in a spectator seat 26. Examples of the virtual viewpoint video 46C include a moving image using a 3D polygon. Note that the moving image is described as an example of the virtual viewpoint video 46C here, but the technology of the present disclosure is not limited to this, and a still image using the 3D polygon may be used. Here, an aspect example is described in which the bird's-eye view video 46A obtained by being imaged by the imaging apparatus 18 is also provided for generation, but the technology of the present disclosure is not limited to this. For example, the bird's-eye view video 46A is not provided for generation of the virtual viewpoint video 46C, and only a plurality of the imaging videos 46B obtained by being imaged by the plurality of imaging apparatuses 16 may be provided for generation of the virtual viewpoint video 46C. That is, the virtual viewpoint video 46C may be generated only from the videos obtained by being imaged by the plurality of imaging apparatuses 16 without using the video obtained by the imaging apparatus 18 (for example, a drone). In addition, in a case in which the video obtained from the imaging apparatus 18 (for example, a drone) is used, a more accurate virtual viewpoint video can be generated.

The display control device 12 selectively transmits the bird's-eye view video 46A, the imaging video 46B, and the virtual viewpoint video 46C as the distribution video to the terminal device.

Figure 4:
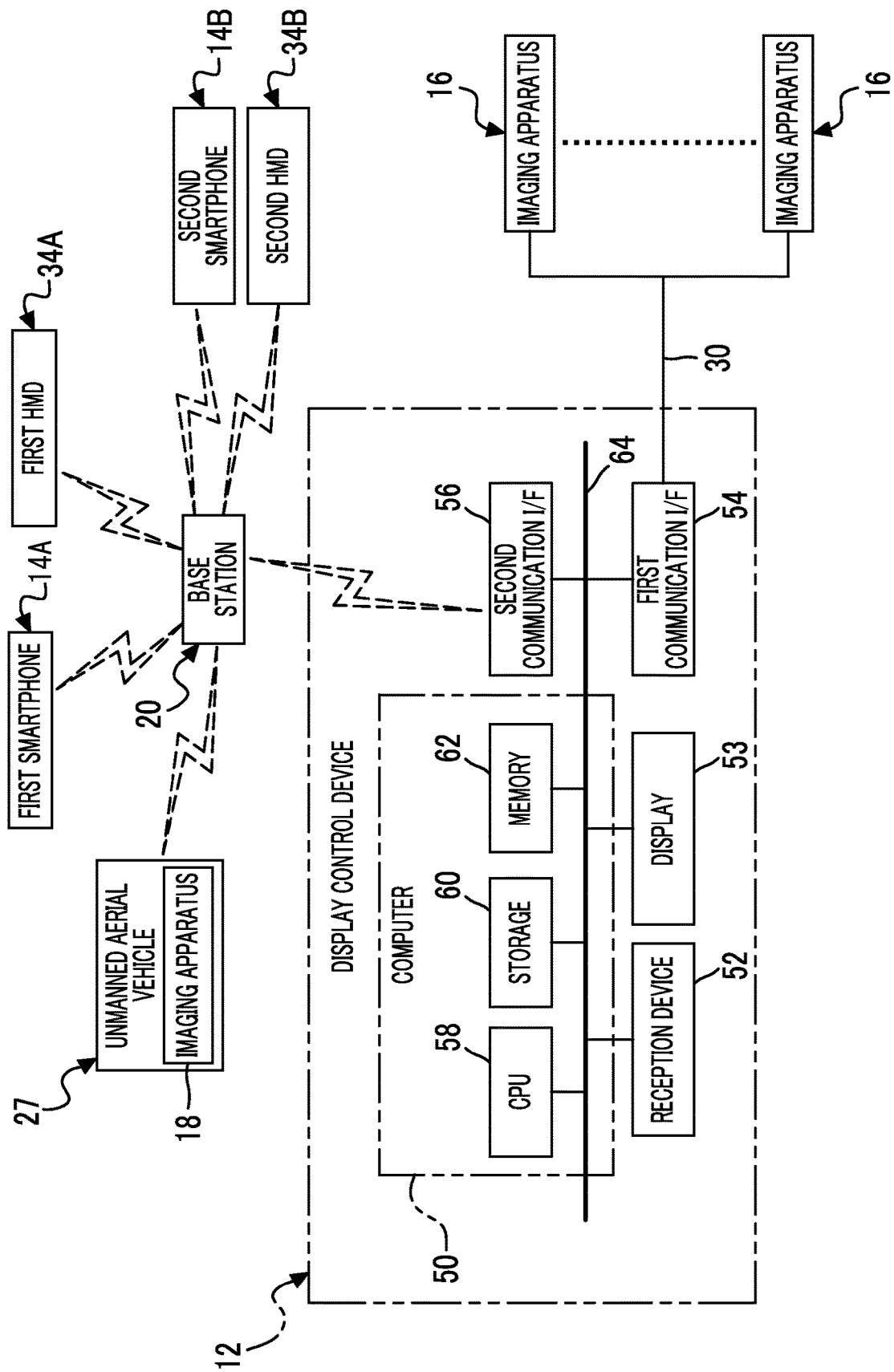
FIG. 4 is a block diagram showing an example of a hardware configuration of an electric system of the display control device according to the embodiment.

For example, as shown in FIG. 4, the display control device 12 comprises a computer 50, a reception device 52, a display 53, a first communication I/F 54, and a second communication I/F 56. The computer 50 comprises a CPU 58, a storage 60, and a memory 62, and the CPU 58, the storage 60, and the memory 62 are connected to each other via a bus line 64. In the example shown in FIG. 4, for convenience of illustration, one bus line is shown as the bus line 64, but a data bus, an address bus, a control bus, and the like are included in the bus line 64.

The CPU 58 controls the whole display control device 12. Various parameters and various programs are stored in the storage 60. The storage 60 is a non-volatile storage device. Here, an EEPROM is adopted as an example of the storage 60, but the technology of the present disclosure is not limited to this, and a mask ROM, an HDD, an SSD, or the like may be used. The memory 62 is a volatile storage device. Various pieces of information are transitorily stored in the memory 62. The memory 62 is used as a work memory by the CPU 58. Here, a DRAM is adopted as an example of the memory 62, but the technology of the present disclosure is not limited to this, and another type of volatile storage device, such as an SRAM, may be used.

The reception device 52 receives the instruction from a user or the like of the display control device 12. Examples of the reception device 52 include a touch panel, a hard key, and a mouse. The reception device 52 is connected to the bus line 64, and the CPU 58 acquires the instruction received by the reception device 52.

The display 53 is connected to the bus line 64 and displays various pieces of information under the control of the CPU 58. Examples of the display 53 include a liquid crystal display. Note that another type of display, such as an organic EL display, may be adopted as the display 53 without being limited to the liquid crystal display.

The first communication I/F 54 is connected to the LAN cable 30. The first communication I/F 54 is realized by a device having an FPGA, for example. The first communication I/F 54 is connected to the bus line 64 and controls the exchange of various pieces of information between the CPU 58 and the plurality of imaging apparatuses 16. For example, the first communication I/F 54 controls the plurality of imaging apparatuses 16 in response to the request of the CPU 58. In addition, the first communication I/F 54 acquires the imaging video 46B (see FIG. 3) obtained by being imaged by each of the plurality of imaging apparatuses 16, and outputs the acquired imaging video 46B to the CPU 58.

The second communication I/F 56 is connected to the base station 20 in the wirelessly communicable manner. The second communication I/F 56 is realized by a device having an FPGA, for example. The second communication I/F 56 is connected to the bus line 64. The second communication I/F 56 controls the exchange of various pieces of information between the CPU 58 and the unmanned aerial vehicle 27 by the wireless communication method via the base station 20. In addition, the second communication I/F 56 controls the exchange of various pieces of information between the CPU 58 and the first smartphone 14A by the wireless communication method via the base station 20. In addition, the second communication I/F 56 controls the exchange of various pieces of information between the CPU 58 and the first HMD 34A by the wireless communication method via the base station 20. In addition, the second communication I/F 56 controls the exchange of various pieces of information between the CPU 58 and the second smartphone 14B by the wireless communication method via the base station 20. Further, the second communication I/F 56 controls the exchange of various pieces of information between the CPU 58 and the second HMD 34B by the wireless communication method via the base station 20.

Figure 5:
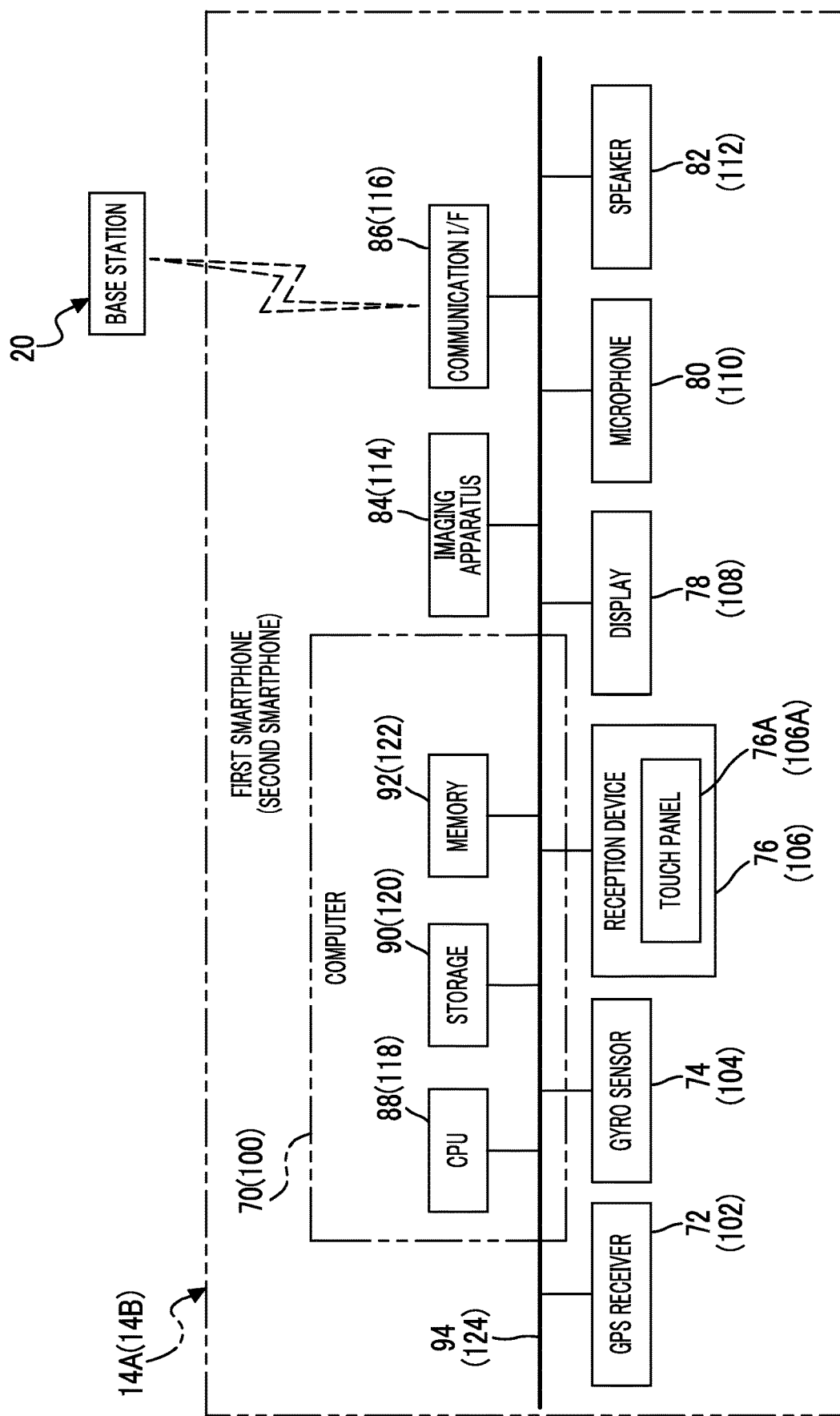
FIG. 5 is a block diagram showing an example of a hardware configuration of an electric system of each of a first smartphone and a second smartphone according to the embodiment.

For example, as shown in FIG. 5, the first smartphone 14A comprises a computer 70, a GPS receiver 72, a gyro sensor 74, a reception device 76, a display 78, a microphone 80, a speaker 82, an imaging apparatus 84, and a communication I/F 86. The computer 70 comprises a CPU 88, a storage 90, and a memory 92, and the CPU 88, the storage 90, and the memory 92 are connected to each other via a bus line 94. In the example shown in FIG. 5, for convenience of illustration, one bus line is shown as the bus line 94, but a data bus, an address bus, a control bus, and the like are included in the bus line 94.

The CPU 88 controls the whole first smartphone 14A. Various parameters and various programs are stored in the storage 90. The storage 90 is a non-volatile storage device. Here, an EEPROM is adopted as an example of the storage 90, but the technology of the present disclosure is not limited to this, and a mask ROM, an HDD, an SSD, or the like may be used. The memory 92 is a volatile storage device. Various pieces of information are transitorily stored in the memory 92, and the memory 92 is used as a work memory by the CPU 88. Here, a DRAM is adopted as an example of the memory 92, but the technology of the present disclosure is not limited to this, and another type of volatile storage device, such as an SRAM, may be used.

The GPS receiver 72 receives radio waves from a plurality of GPS satellites (not shown) in response to the instruction from the CPU 88, and outputs reception result information indicating a reception result to the CPU 88. The CPU 88 calculates current position information indicating a current position of the first smartphone 14A as the three-dimensional coordinate based on the reception result information input from the GPS receiver 72.

The gyro sensor 74 measures an angle around a yaw axis of the first smartphone 14A (hereinafter, also referred to as "yaw angle"), an angle around a roll axis of the first smartphone 14A (hereinafter, also referred to as "roll angle"), and an angle around a pitch axis of the first smartphone 14A (hereinafter, also referred to as "pitch angle"). The gyro sensor 74 is connected to the bus line 94, and angle information indicating the yaw angle, the roll angle, and the pitch angle measured by the gyro sensor 74 is acquired by the CPU 88 via the bus line 94. Note that the first smartphone 14A also comprises an acceleration sensor (not shown). Note that the acceleration sensor and the gyro sensor 74 may be installed as an integrated multi-axes (for example, 6 axes) sensor.

The reception device 76 receives the instruction from the viewer 28A. Examples of the reception device 76 include a touch panel 76A, and a hard key. The reception device 76 is connected to the bus line 94, and the CPU 88 acquires the instruction received by the reception device 76.

The display 78 is connected to the bus line 94 and displays various pieces of information under the control of the CPU 88. Examples of the display 78 include a liquid crystal display. Note that another type of display, such as an organic EL display, may be adopted as the display 78 without being limited to the liquid crystal display.

The first smartphone 14A comprises a touch panel display, and the touch panel display is realized by the touch panel 76A and the display 78. That is, the touch panel display is formed by superimposing the touch panel 76A on a display region of the display 78.

The microphone 80 converts a collected sound into an electric signal. The microphone 80 is connected to the bus line 94. The CPU 88 acquires the electric signal obtained by converting the sound collected by the microphone 80 via the bus line 94.

The speaker 82 converts the electric signal into the sound. The speaker 82 is connected to the bus line 94. The speaker 82 receives the electric signal output from the CPU 88 via the bus line 94, converts the received electric signal into the sound, and outputs the sound obtained by converting the electric signal to the outside of the first smartphone 14A.

The imaging apparatus 84 acquires an image showing a subject by imaging the subject. The imaging apparatus 84 is connected to the bus line 94. The image obtained by imaging the subject by the imaging apparatus 84 is acquired by the CPU 88 via the bus line 94.

The communication OF 86 is connected to the base station 20 in the wirelessly communicable manner. The communication OF 86 is realized by a device having an FPGA, for example. The communication OF 86 is connected to the bus line 94. The communication OF 86 controls the exchange of various pieces of information between the CPU 88 and an external device by the wireless communication method via the base station 20. Here, examples of the "external device" include the display control device 12, the unmanned aerial vehicle 27, the second smartphone 14B, the first HMD 34A, and the second HMD 34B.

The second smartphone 14B has the same configuration as the first smartphone 14A. That is, the second smartphone 14B comprises a computer 100, a GPS receiver 102, a gyro sensor 104, a reception device 106, a touch panel 106A, a display 108, a microphone 110, a speaker 112, an imaging apparatus 114, a communication OF 116, a CPU 118, a storage 120, a memory 122, and a bus line 124.

The computer 100 corresponds to the computer 70. The GPS receiver 102 corresponds to the GPS receiver 72. The gyro sensor 104 corresponds to the gyro sensor 74. The reception device 106 corresponds to the reception device 76. The touch panel 106A corresponds to the touch panel 76A. The display 108 corresponds to the display 78. The microphone 110 corresponds to the microphone 80. The speaker 112 corresponds to the speaker 82. The imaging apparatus 114 corresponds to the imaging apparatus 84. The communication OF 116 corresponds to the communication OF 86. The CPU 118 corresponds to the CPU 88. The storage 120 corresponds to the storage 90. The memory 122 corresponds to the memory 92. The bus line 124 corresponds to the bus line 94. Similar to the bus lines 64 and 94, the bus line 124 also includes a data bus, an address bus, a control bus, and the like.

Figure 6:
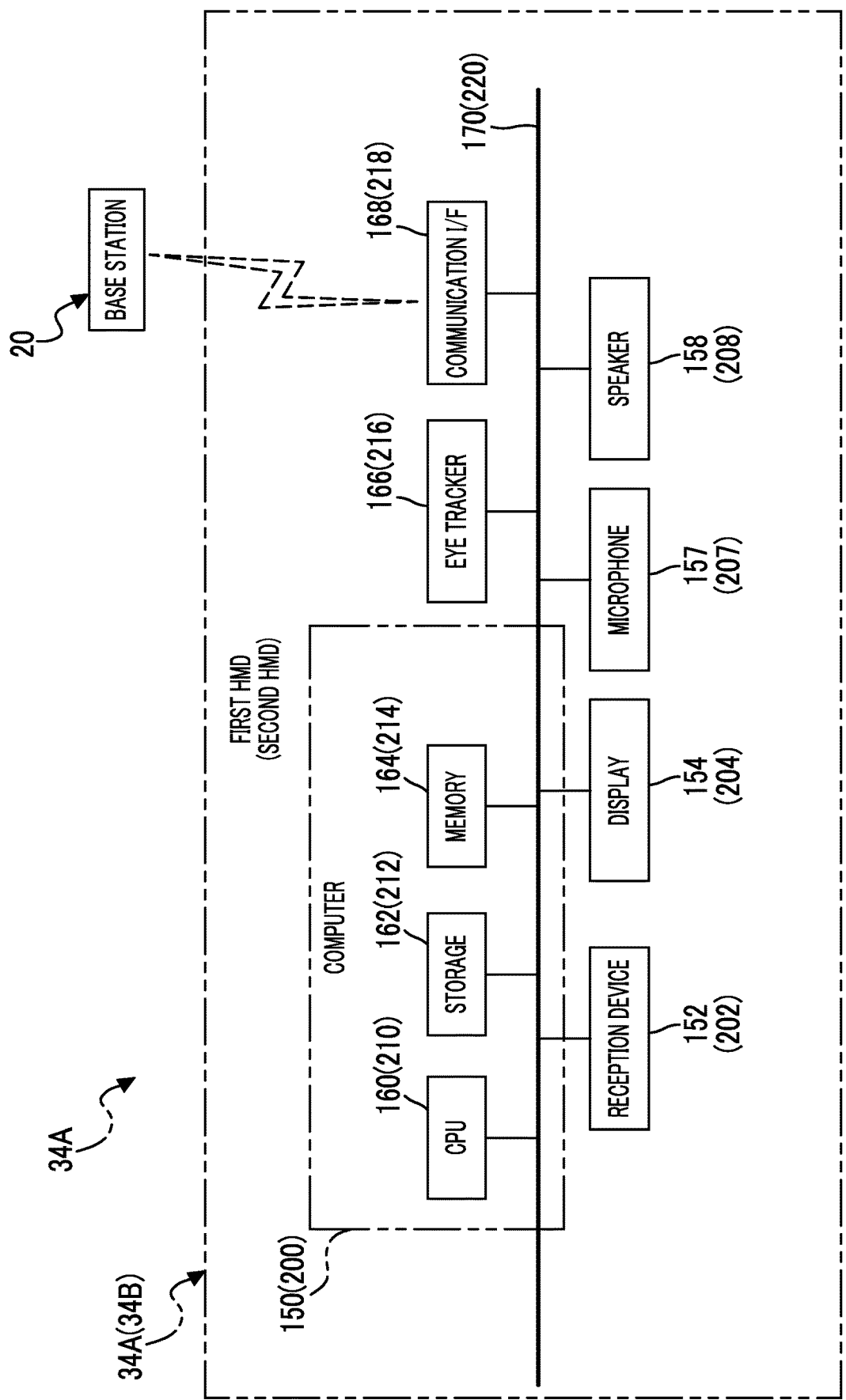
FIG. 6 is a block diagram showing an example of a hardware configuration of an electric system of each of the first HMD and the second HMD according to the embodiment.

For example, as shown in FIG. 6, the first HMD 34A comprises the computer 150, a reception device 152, a display 154, a microphone 157, a speaker 158, an eye tracker 166, and a communication OF 168. The computer 150 comprises a CPU 160, a storage 162, and a memory 164, and the CPU 160, the storage 162, and the memory 164 are connected via a bus line 170. In the example shown in FIG. 6, for convenience of illustration, one bus line is shown as the bus line 170, but a data bus, an address bus, a control bus, and the like are included in the bus line 170.

The CPU 160 controls the whole first HMD 34A. Various parameters and various programs are stored in the storage 162. The storage 162 is a non-volatile storage device. Here, an EEPROM is adopted as an example of the storage 162, but the technology of the present disclosure is not limited to this, and a mask ROM, an HDD, an SSD, or the like may be used. The memory 164 is a volatile storage device. Various pieces of information are transitorily stored in the memory 164, and the memory 164 is used as a work memory by the CPU 160. Here, a DRAM is adopted as an example of the memory 164, but the technology of the present disclosure is not limited to this, and another type of volatile storage device, such as an SRAM, may be used.

The reception device 152 receives the instruction from the viewer 28A. Examples of the reception device 152 include a remote controller and/or a hard key. The reception device 152 is connected to the bus line 170, and the CPU 160 acquires the instruction received by the reception device 152.

The display 154 is a display capable of displaying the distribution video visually recognized by the viewer 28A, and is a display capable of displaying a first viewpoint video selected from among a plurality of viewpoint videos 46 (see FIG. 8), which will be described below. The display 154 is connected to the bus line 170 and displays various pieces of information under the control of the CPU 160. Examples of the display 154 include a liquid crystal display. Note that another type of display, such as an organic EL display, may be adopted as the display 154 without being limited to the liquid crystal display. Note that the display 154 is an example of a "first display unit (first display)" according to the technology of the present disclosure.

The eye tracker 166 includes an imaging apparatus (not shown), images both eyes of the viewer 28A depending on a predetermined frame rate (for example, 60 fps) by using the imaging apparatus, and detects the viewpoint position and the visual line direction of the viewer 28A based on the image obtained by imaging. Then, the eye tracker 166 specifies a gazing point at which the viewer 28A gazes in the distribution video displayed on the display 154 based on the detected viewpoint position and visual line direction.

The communication OF 168 is connected to the base station 20 in a wirelessly communicable manner. The communication OF 168 is realized by a device having an FPGA, for example. The communication OF 168 is connected to the bus line 170. The communication OF 168 controls the exchange of various pieces of information between the CPU 160 and an external device by the wireless communication method via the base station 20. Here, examples of the "external device" include the display control device 12, the unmanned aerial vehicle 27, the first smartphone 14A, the second smartphone 14B, and the second HMD 34B.

The second HMD 34B has the same configuration as the first HMD 34A. That is, the second HMD 34B comprises the computer 200, a reception device 202, a display 204, a microphone 207, a speaker 208, a CPU 210, a storage 212, a memory 214, an eye tracker 216, a communication OF 218, and a bus line 220.

The computer 200 corresponds to the computer 150. The reception device 202 corresponds to the reception device 152. The display 204 corresponds to the display 154. The microphone 207 corresponds to the microphone 157. The speaker 208 corresponds to the speaker 158. The CPU 210 corresponds to the CPU 160. The storage 212 corresponds to the storage 162. The memory 214 corresponds to the memory 164. The eye tracker 216 corresponds to the eye tracker 166. The communication OF 218 corresponds to the communication OF 168. The bus line 220 corresponds to the bus line 170. Similar to the bus lines 64, 94 and 170, the bus line 220 includes a data bus, an address bus, a control bus, and the like.

The display 204 is a display capable of displaying the distribution video visually recognized by the viewer 28B, and is a display capable of displaying a second viewpoint video selected from among the plurality of viewpoint videos 46 (see FIG. 8), which will be described below. Note that the display 204 is an example of a "second display unit (second display)" according to the technology of the present disclosure.

Figure 7:
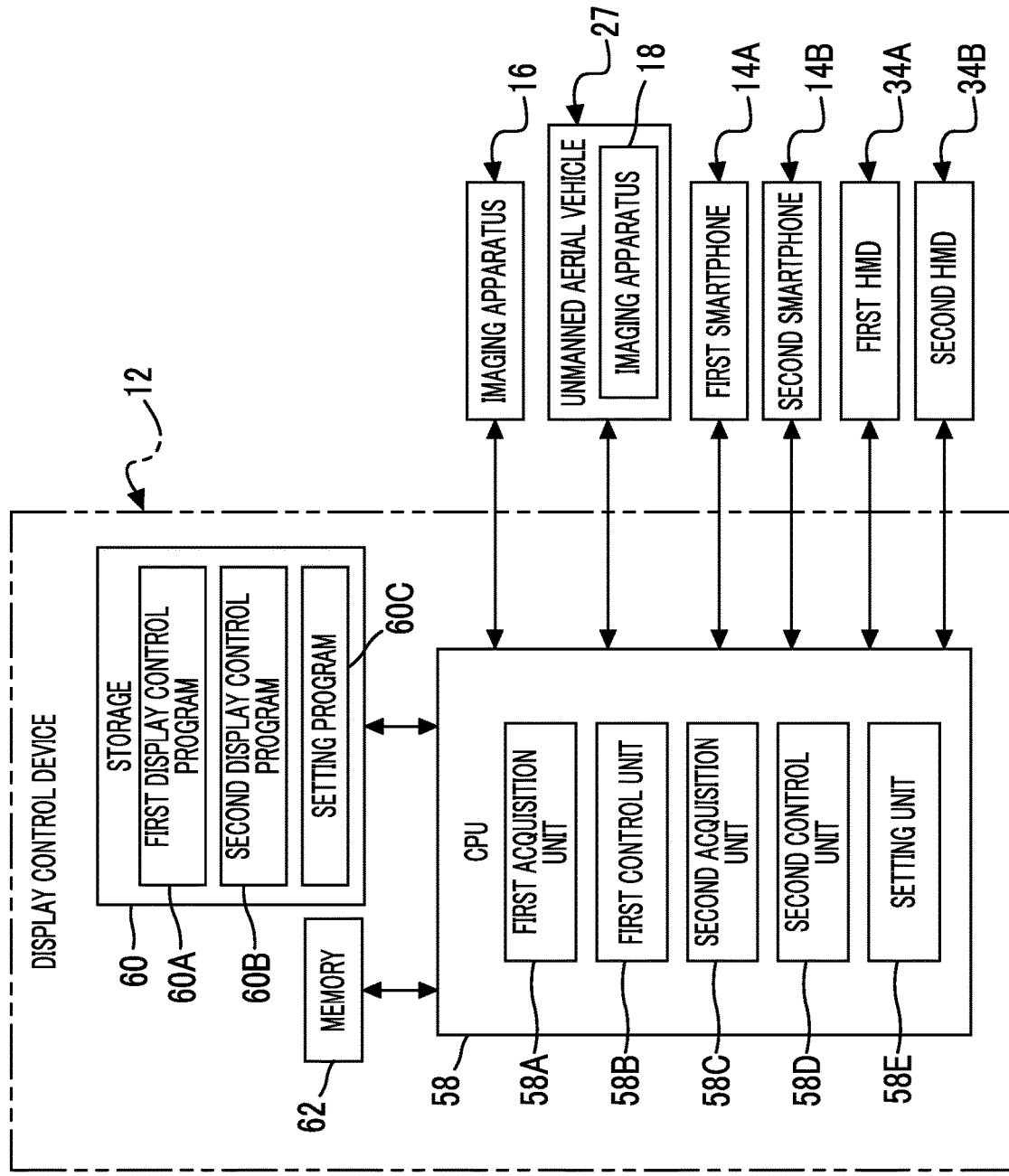
FIG. 7 is a block diagram showing an example of a main function of the display control device according to the embodiment.

For example, as shown in FIG. 7, in the display control device 12, the storage 60 stores a first display control program 60A, a second display control program 60B, and a setting program 60C. Note that, in the following, in a case in which a distinction is not necessary, the first display control program 60A, the second display control program 60B, and the setting program 60C are referred to as "display control device program" without reference numeral.

The CPU 58 reads out the display control device program from the storage 60, and expands the readout display control device program in the memory 62. The CPU 58 controls the whole display control device 12 according to the display control device program expanded in the memory 62, and exchanges various pieces of information with the plurality of imaging apparatuses, the unmanned aerial vehicle 27, and the terminal device.

The CPU 58 is an example of a "processor" according to the technology of the present disclosure, and the memory 62 is an example of a "memory" according to the technology of the present disclosure. The CPU 58 reads out the first display control program 60A from the storage 60, and expands the readout first display control program 60A in the memory 62. The CPU 58 is operated as a first acquisition unit 58A and a first control unit 58B according to the first display control program 60A expanded in the memory 62. The CPU 58 is operated as the first acquisition unit 58A and the first control unit 58B to execute a first display control process (see FIGS. 35 to 37), which will be described below.

The CPU 58 reads out the second display control program 60B from the storage 60, and expands the readout second display control program 60B in the memory 62. The CPU 58 is operated as a second acquisition unit 58C and a second control unit 58D according to the second display control program 60B expanded in the memory 62. The CPU 58 is operated as the second acquisition unit 58C and the second control unit 58D to execute a second display control process (see FIGS. 38 to 40), which will be described below.

The CPU 58 reads out the setting program 60C from the storage 60, and expands the readout setting program 60C in the memory 62. The CPU 58 is operated as a setting unit 58E according to the setting program 60C expanded in the memory 62. The CPU 58 is operated as the setting unit 58E to execute a setting process (see FIG. 41), which will be described below.

Figure 8:
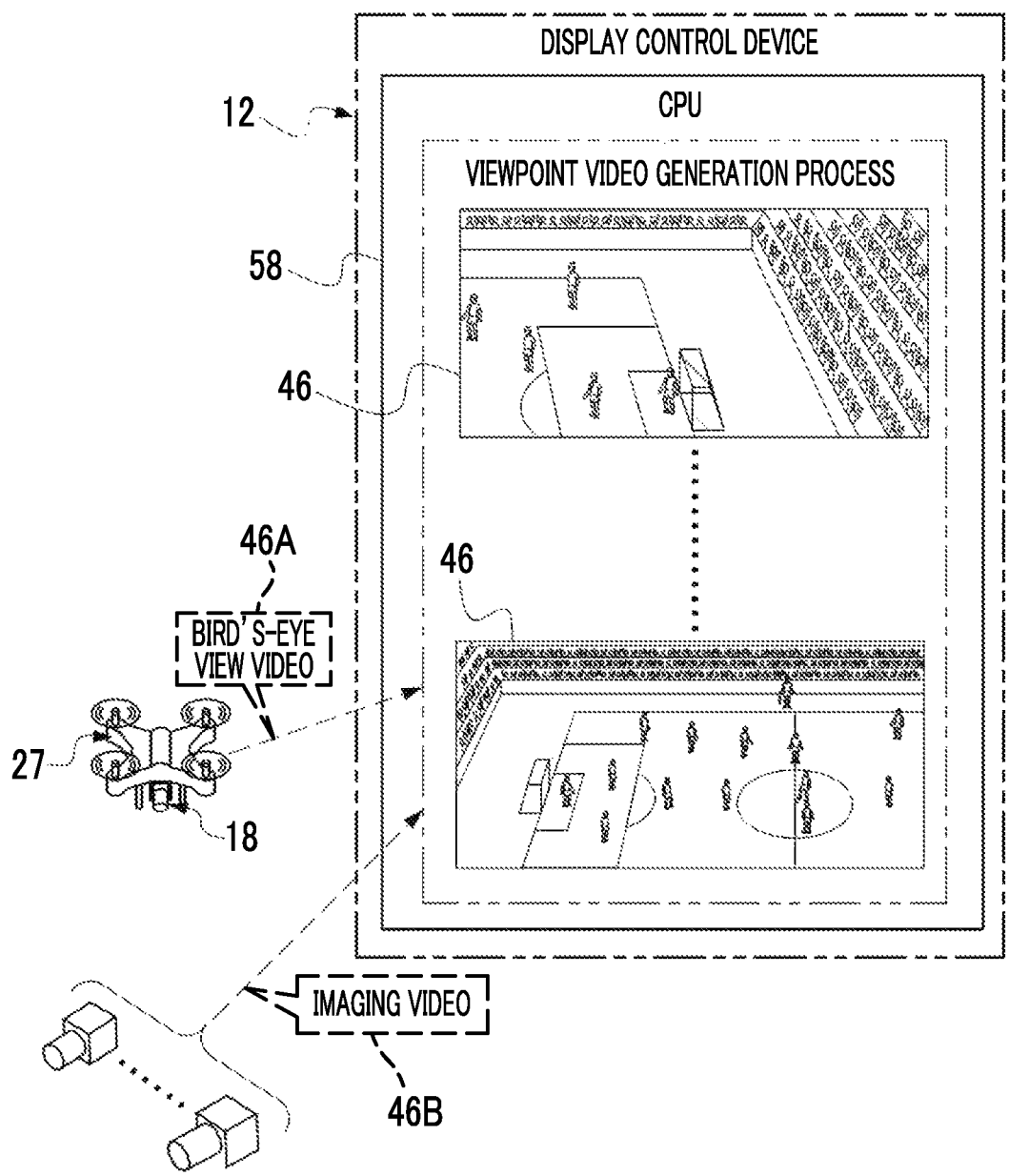
FIG. 8 is a conceptual diagram provided for describing an example of a process content of a viewpoint video generation process executed by a CPU of the display control device according to the embodiment.

For example, as shown in FIG. 8, in the display control device 12, the CPU 58 executes a viewpoint video generation process. The viewpoint video generation process is a process of generating the plurality of viewpoint videos 46. The distribution video described above includes the plurality of viewpoint videos 46. Each of the plurality of viewpoint videos 46 is a video showing the imaging region observed from the corresponding peculiar viewpoint. The plurality of viewpoint videos 46 include the bird's-eye view video 46A, the imaging video 46B, and the virtual viewpoint video 46C. The virtual viewpoint video 46C is generated based on the bird's-eye view video 46A acquired by the imaging apparatus 18 and the plurality of imaging videos 46B acquired by the plurality of imaging apparatuses 16.

Note that, here, although an aspect example is described in which the virtual viewpoint video 46C is generated based on the bird's-eye view video 46A and the plurality of imaging videos 46B, the technology of the present disclosure is not limited to this, and the virtual viewpoint video 46C may be generated based on at least two or more videos of the bird's-eye view video 46A and the plurality of imaging videos 46B. In addition, here, an aspect example is described in which the bird's-eye view video 46A, the imaging video 46B, and the virtual viewpoint video 46C are included in the plurality of viewpoint videos 46, but the technology of the present disclosure is not limited to this, it is not necessary for the virtual viewpoint video 46C to be included in the plurality of viewpoint videos 46, and it is not necessary for the bird's-eye view video 46A to be included in the plurality of viewpoint videos 46. In addition, it is not necessary for the CPU 58 to acquire the imaging videos 46B from all of the plurality of imaging apparatuses 16, and it is not necessary to acquire a part of the imaging videos 46B.

In addition, the viewpoint video 46 is displayed on each display, such as the display 78 (see FIG. 5) of the first smartphone 14A, the display 108 of the second smartphone 14B, the display 154 of the first HMD 34A, and the display 204 of the second HMD 34B. A size of the viewpoint video 46 generated by the viewpoint video generation process and a display size of the viewpoint video 46 displayed on each display have a similarity relationship. In addition, in the following description, a change of the size of the viewpoint video 46 refers to a change of the display size of the viewpoint video 46. Note that the same applies to an avatar, which will be described below, and a change of a size of the avatar refers to a change of a display size of the avatar.

Figure 9:
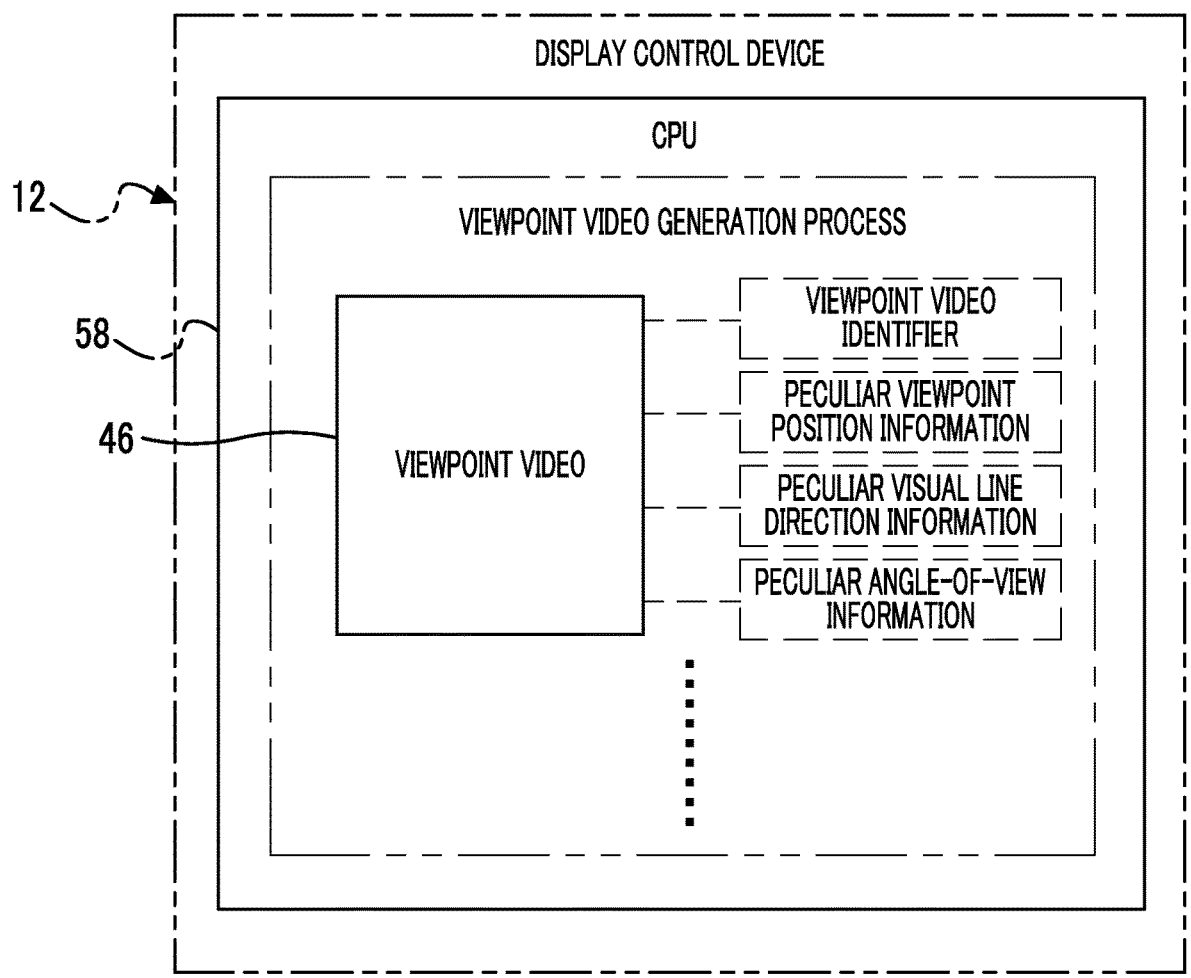
FIG. 9 is a block diagram showing each example of a viewpoint video, a viewpoint video identifier, peculiar viewpoint position information, peculiar visual line direction information, and peculiar angle-of-view information generated by executing the viewpoint video generation process according to the embodiment.

For example, as shown in FIG. 9, each of the plurality of viewpoint videos 46 obtained by executing the viewpoint video generation process by the CPU 58 has a viewpoint video identifier, a peculiar viewpoint position information, peculiar visual line direction information, and peculiar angle-of-view information. That is, each of the plurality of viewpoint videos 46 is associated with the viewpoint video identifier, the peculiar viewpoint position information, and the peculiar visual line direction information. The viewpoint video identifier is an identifier that can uniquely specify the corresponding viewpoint video 46. The peculiar viewpoint position information is information indicating the peculiar viewpoint position. The peculiar viewpoint position is the viewpoint position of the corresponding viewpoint video 46. That is, the peculiar viewpoint position refers to the viewpoint position during which the imaging region shown by the corresponding viewpoint video 46 is observed. Examples of the peculiar viewpoint position information include the three-dimensional coordinate in which the peculiar viewpoint positions of the plurality of viewpoint videos 46 can be relatively specified. Note that, here, the peculiar viewpoint position is limited to a partial region of the imaging region. The partial region refers to the spectator seat 26 (see FIGS. 1 and 3), for example.

The peculiar visual line direction information is information indicating a peculiar visual line direction. The peculiar visual line direction is the visual line direction of the corresponding viewpoint video 46. The visual line direction included in the corresponding viewpoint video 46 refers to the visual line direction in which the imaging region shown by the corresponding viewpoint video 46 is observed. Here, as an example of the peculiar visual line direction, a direction facing the corresponding viewpoint video 46 (for example, a direction passing through a center of the viewpoint video 46 perpendicularly to the viewpoint video 46) is adopted.

The peculiar angle-of-view information is information indicating a peculiar angle of view. The peculiar angle of view is the angle of view of the corresponding viewpoint video 46. That is, the peculiar angle of view refers to the angle of view with respect to the imaging region shown by the corresponding viewpoint video 46.

Figure 10:
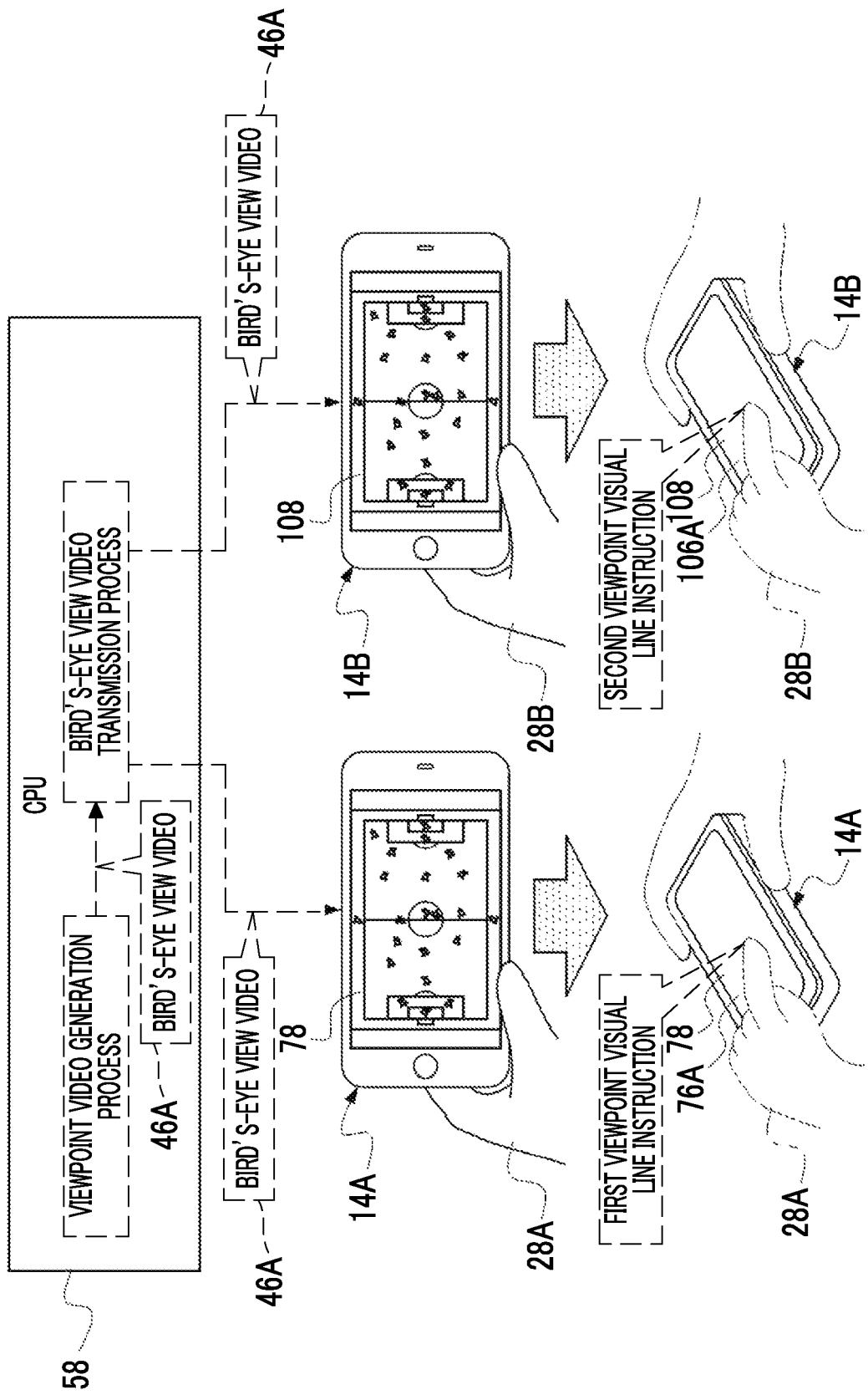
FIG. 10 is a conceptual diagram showing an example of an aspect in which a first viewpoint visual line instruction is given to the first smartphone according to the embodiment and an example of an aspect in which a second viewpoint visual line instruction is given to the second smartphone according to the embodiment.

For example, as shown in FIG. 10, in the display control device 12, the CPU 58 executes a bird's-eye view video transmission process. The bird's-eye view video transmission process is a process of transmitting the bird's-eye view video 46A among the plurality of viewpoint videos 46 generated by the viewpoint video generation process to the first smartphone 14A and the second smartphone 14B.

The bird's-eye view video 46A is received by the first smartphone 14A, and the received bird's-eye view video 46A is displayed on the display 78 of the first smartphone 14A. In a state in which the bird's-eye view video 46A is displayed on the display 78, the viewer 28A gives a first viewpoint visual line instruction to the first smartphone 14A. The touch panel 76A of the first smartphone 14A is a device capable of receiving the first viewpoint visual line instruction, and is an example of a "first reception unit (first reception device)" according to the technology of the present disclosure. The first viewpoint visual line instruction is an instruction for the viewpoint position and the visual line direction with respect to the imaging region, and is used as an instruction for selecting any one of the plurality of viewpoint videos 46. Examples of the first viewpoint visual line instruction include a touch operation and a slide operation on the touch panel 76A. In this case, the instruction for the visual line direction is given by performing the touch operation on the touch panel 76A, and the instruction for the viewpoint position is given by performing the slide operation on the touch panel 76A. The position at which the touch operation is performed on the touch panel 76A corresponds to the viewpoint position with respect to the imaging region, and the direction in which the slide operation is performed on the touch panel 76A corresponds to the visual line direction with respect to the imaging region. Note that the first viewpoint visual line instruction is an example of a "first instruction" according to the technology of the present disclosure.

The bird's-eye view video 46A is received by the second smartphone 14B, and the received bird's-eye view video 46A is displayed on the display 108 of the second smartphone 14B. In a state in which the bird's-eye view video 46A is displayed on the display 108, the viewer 28B gives a second viewpoint visual line instruction to the second smartphone 14B. The touch panel 106A of the second smartphone 14B is a device capable of receiving the second viewpoint visual line instruction, and is an example of a "second reception unit (second reception device)" according to the technology of the present disclosure. The second viewpoint visual line instruction is an instruction for the viewpoint position and the visual line direction with respect to the imaging region, and is used as an instruction for selecting any one of the plurality of viewpoint videos 46. Examples of the second viewpoint visual line instruction include a touch operation and a slide operation on the touch panel 106A. In this case, the instruction for the visual line direction is given by performing the touch operation on the touch panel 106A, and the instruction for the viewpoint position is given by performing the slide operation on the touch panel 106A. The position at which the touch operation is performed on the touch panel 106A corresponds to the viewpoint position with respect to the imaging region, and the direction in which the slide operation is performed on the touch panel 106A corresponds to the visual line direction with respect to the imaging region. Note that the second viewpoint visual line instruction is an example of a "second instruction" according to the technology of the present disclosure.

Figure 11:
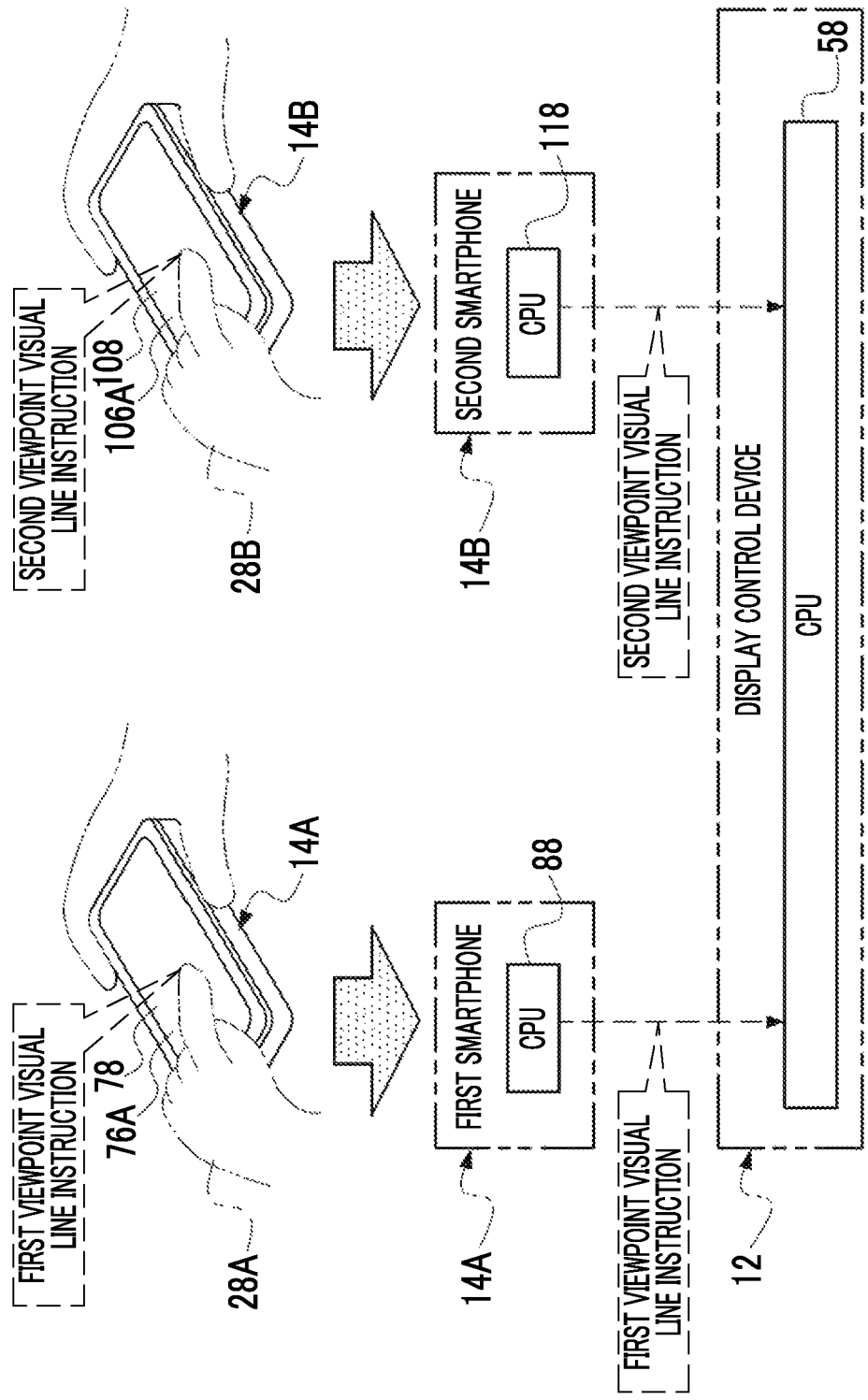
FIG. 11 is a conceptual diagram showing an example of an aspect in which the first viewpoint visual line instruction is transmitted from the first smartphone according to the embodiment to the display control device and the second viewpoint visual line instruction is transmitted from the second smartphone according to the embodiment to the display control device.

As shown in FIG. 11, for example, the first viewpoint visual line instruction received by the touch panel 76A is transmitted by the CPU 88 to the CPU 58 of the display control device 12, and is received by the CPU 58. The second viewpoint visual line instruction received by the touch panel 106A is transmitted by the CPU 118 to the CPU 58 of the display control device 12, and is received by the CPU 58.

Figure 12:
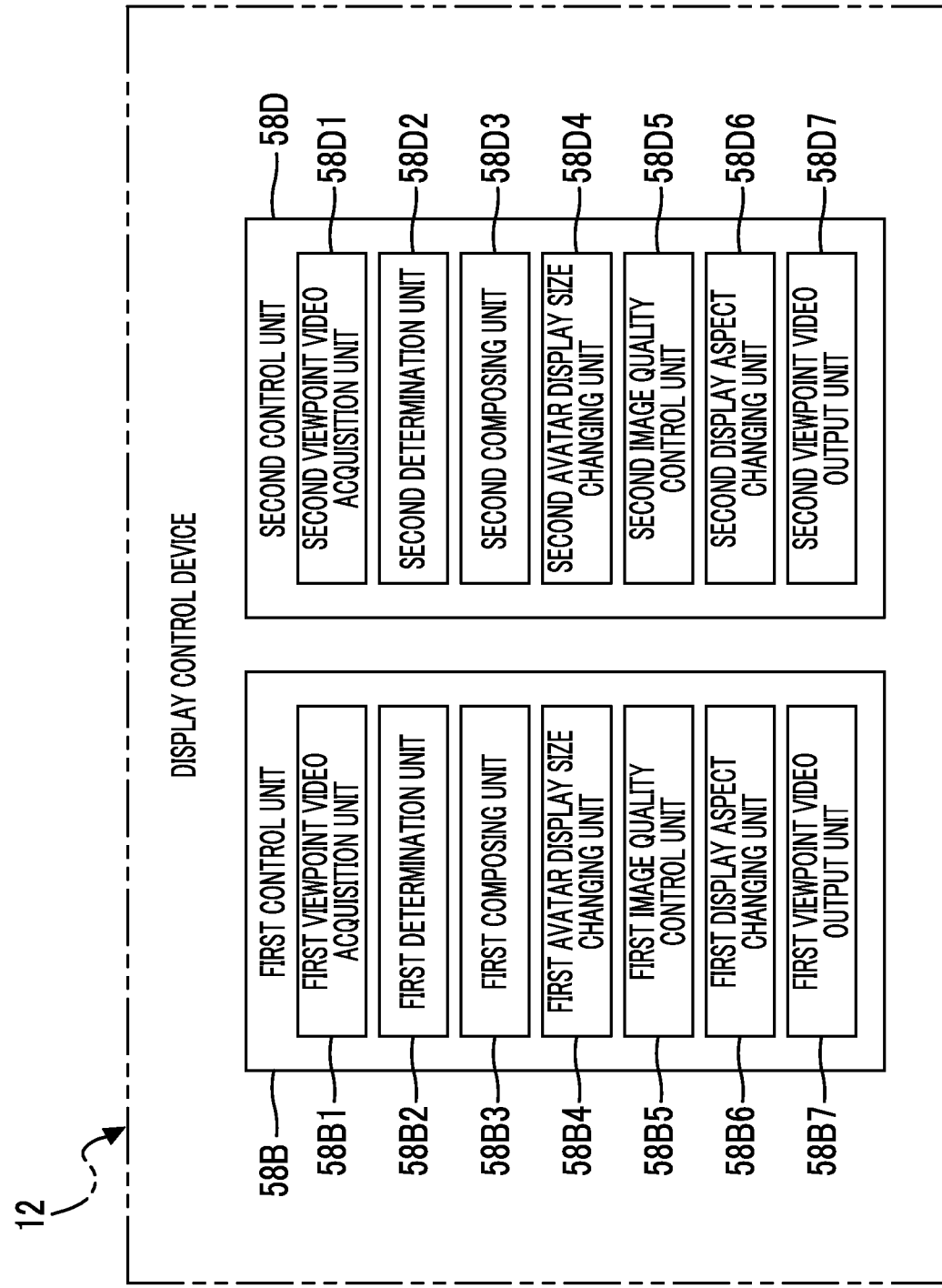
FIG. 12 is a block diagram showing an example of specific functions of a first control unit and a second control unit of the display control device according to the embodiment.

For example, as shown in FIG. 12, in the display control device 12, the first control unit 58B comprises a first viewpoint video acquisition unit 58B1, a first determination unit 58B2, a first composing unit 58B3, a first avatar display size changing unit 58B4, a first image quality control unit 58B5, a first display aspect changing unit 58B6, and a first viewpoint video output unit 58B7. The first control unit 58B performs a control of displaying the first viewpoint video selected from among the plurality of viewpoint videos 46 on the display 154 of the first HMD 34A. Here, the "first viewpoint video" refers to one viewpoint video selected from among the plurality of viewpoint videos 46 by the first control unit 58B. According to the first display control program 60A expanded in the memory 62, the CPU 58 is operated as the first viewpoint video acquisition unit 58B1, the first determination unit 58B2, the first composing unit 58B3, the first avatar display size changing unit 58B4, the first image quality control unit 58B5, the first display aspect changing unit 58B6, and the first viewpoint video output unit 58B7.

In the display control device 12, the second control unit 58D comprises a second viewpoint video acquisition unit 58D1, a second determination unit 58D2, a second composing unit 58D3, a second avatar display size changing unit 58D4, a second image quality control unit 58D5, a second display aspect changing unit 58D6, and a second viewpoint video output unit 58D7. The second control unit 58D performs a control of displaying the first viewpoint video selected from among the plurality of viewpoint videos 46 on the display 204 of the second HMD 34B. Here, the "second viewpoint video" refers to one viewpoint video selected from among the plurality of viewpoint videos 46 by the second control unit 58D. According to the second display control program 60B expanded in the memory 62, the CPU 58 is operated as the second viewpoint video acquisition unit 58D1, the second determination unit 58D2, the second composing unit 58D3, the second avatar display size changing unit 58D4, the second image quality control unit 58D5, the second display aspect changing unit 58D6, and the second viewpoint video output unit 58D7.

Figure 13:
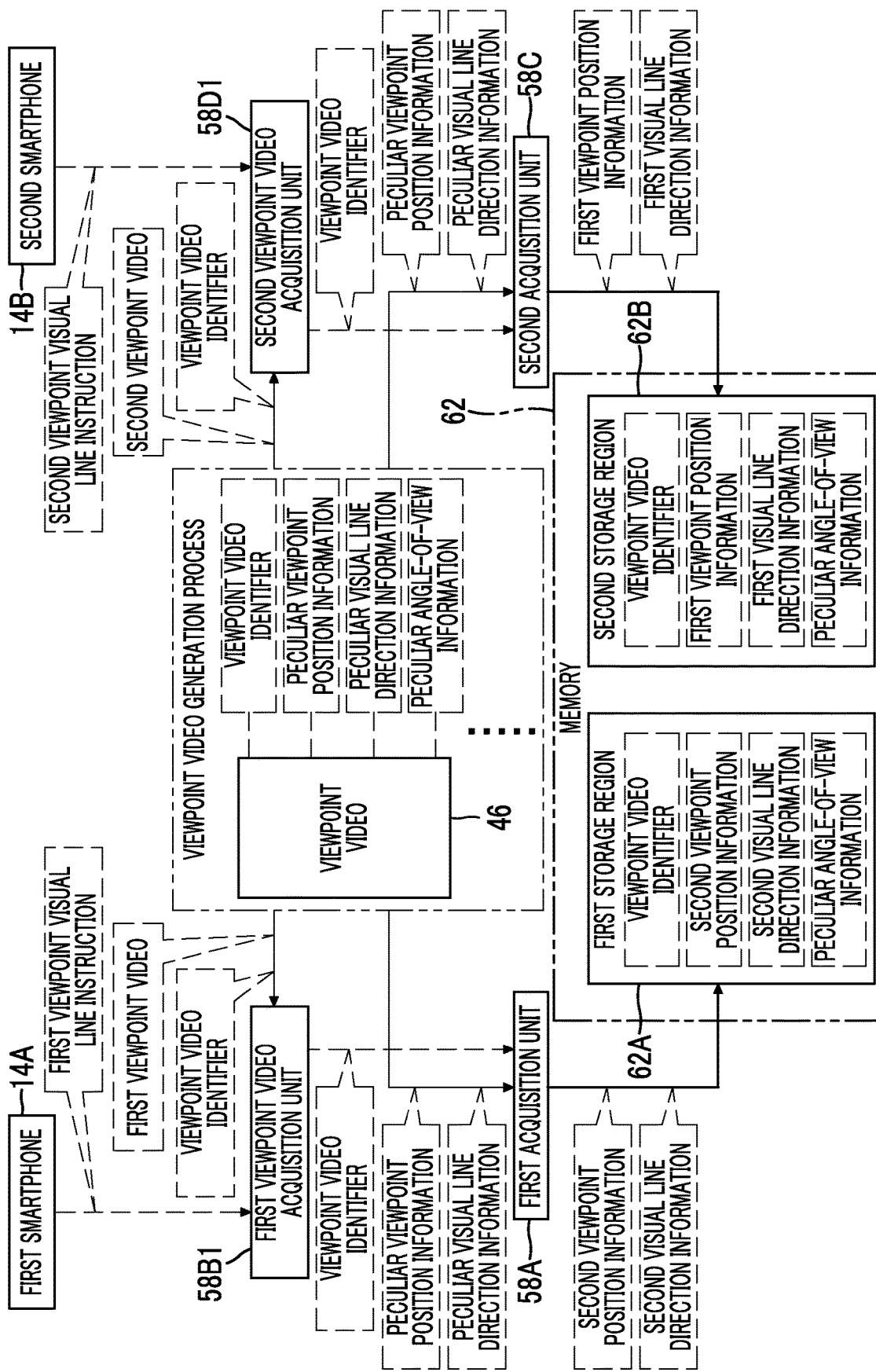
FIG. 13 is a block diagram showing an example of an aspect in which the viewpoint video generated by executing the viewpoint video generation process by the CPU of the display control device according to the embodiment is acquired by a first viewpoint video acquisition unit and a second viewpoint video acquisition unit, and the viewpoint video identifier, the peculiar viewpoint position information, the peculiar visual line direction information, and the peculiar angle-of-view information are stored in a memory.

For example, as shown in FIG. 13, the first viewpoint video acquisition unit 58B1 receives the first viewpoint visual line instruction transmitted from the first smartphone 14A. In a case in which the first viewpoint visual line instruction is received, the first viewpoint video acquisition unit 58B1 selects one viewpoint video 46 from among the plurality of viewpoint videos 46 as the first viewpoint video in response to the first viewpoint visual line instruction, and acquires the selected first viewpoint video. The first viewpoint video is the viewpoint video 46 having peculiar viewpoint position information and peculiar visual line direction information corresponding to the viewpoint position and the visual line direction as instructed by the first viewpoint visual line instruction.

The first viewpoint video acquisition unit 58B1 acquires the viewpoint video identifier associated with the acquired first viewpoint video and outputs the acquired viewpoint video identifier to the first acquisition unit 58A. The first acquisition unit 58A acquires the peculiar viewpoint position information, the peculiar visual line direction information, and the peculiar angle-of-view information associated with the viewpoint video 46 specified by the viewpoint video identifier input from the first viewpoint video acquisition unit 58B1.

The memory 62 has a first storage region 62A and a second storage region 62B. The first acquisition unit 58A stores the acquired peculiar viewpoint position information as the second viewpoint position information in the first storage region 62A. The second viewpoint position information is the peculiar viewpoint position information of any one of the plurality of viewpoint videos 46. Here, the second viewpoint position information refers to information indicating a second viewpoint position. The second viewpoint position refers to the viewpoint position of the viewer 28A with respect to the imaging region.

The first acquisition unit 58A stores the acquired peculiar visual line direction information in the first storage region 62A as second visual line direction information. The second visual line direction information is the peculiar visual line direction information of any one of the plurality of viewpoint videos 46. Here, the second visual line direction information refers to information indicating a second visual line direction. The second visual line direction refers to a visual line direction of the viewer 28A with respect to the imaging region.

The first acquisition unit 58A stores the acquired peculiar angle-of-view information in the first storage region 62A. In addition, the first acquisition unit 58A stores the viewpoint video identifier input from the first viewpoint video acquisition unit 58B1 in the first storage region 62A.

Note that, in a case in which the second viewpoint position information, the second visual line direction information, and the peculiar angle-of-view information are newly acquired by the first acquisition unit 58A, the new second viewpoint position information, second visual line direction information, and peculiar angle-of-view information are overwritten and stored on the first storage region 62A by the first acquisition unit 58A. In a case in which the viewpoint video identifier is newly input to the first acquisition unit 58A from the first viewpoint video acquisition unit 58B1, the new viewpoint video identifier is overwritten and stored on the first storage region 62A by the first acquisition unit 58A.

The second viewpoint video acquisition unit 58D1 receives the second viewpoint visual line instruction transmitted from the second smartphone 14B. In a case in which the second viewpoint visual line instruction is received, the second viewpoint video acquisition unit 58D1 selects one viewpoint video 46 from among the plurality of viewpoint videos 46 as the second viewpoint video in response to the second viewpoint visual line instruction, and acquires the selected second viewpoint video. The second viewpoint video is the viewpoint video 46 having peculiar viewpoint position information and peculiar visual line direction information corresponding to the viewpoint position and the visual line direction as instructed by the second viewpoint visual line instruction.

The second viewpoint video acquisition unit 58D1 acquires the viewpoint video identifier associated with the acquired second viewpoint video and outputs the acquired viewpoint video identifier to the second acquisition unit 58C. The second acquisition unit 58C acquires the peculiar viewpoint position information, the peculiar visual line direction information, and the peculiar angle-of-view information associated with the viewpoint video 46 specified by the viewpoint video identifier input from the second viewpoint video acquisition unit 58D1.

The second acquisition unit 58C stores the acquired peculiar viewpoint position information as the first viewpoint position information in the second storage region 62B. The first viewpoint position information is the peculiar viewpoint position information of any one of the plurality of viewpoint videos 46. Here, the first viewpoint position information refers to information indicating a first viewpoint position. The first viewpoint position refers to the viewpoint position of the viewer 28B with respect to the imaging region.

The second acquisition unit 58C stores the acquired peculiar visual line direction information in the second storage region 62B as first visual line direction information. The first visual line direction information is the peculiar visual line direction information of any one of the plurality of viewpoint videos 46. Here, the first visual line direction information refers to information indicating a first visual line direction. The first visual line direction refers to a visual line direction of the viewer 28B with respect to the imaging region.

The second acquisition unit 58C stores the acquired peculiar angle-of-view information in the second storage region 62B. In addition, the second acquisition unit 58C stores the viewpoint video identifier input from the second viewpoint video acquisition unit 58D1 in the second storage region 62B.

Note that, in a case in which the first viewpoint position information, the first visual line direction information, and the peculiar angle-of-view information are newly acquired by the second acquisition unit 58C, the new first viewpoint position information, first visual line direction information, and peculiar angle-of-view information are overwritten and stored on the second storage region 62B by the second acquisition unit 58C. In a case in which the viewpoint video identifier is newly input to the second acquisition unit 58C from the second viewpoint video acquisition unit 58D1, the new viewpoint video identifier is overwritten and stored on the second storage region 62B by the second acquisition unit 58C.

Figure 14:
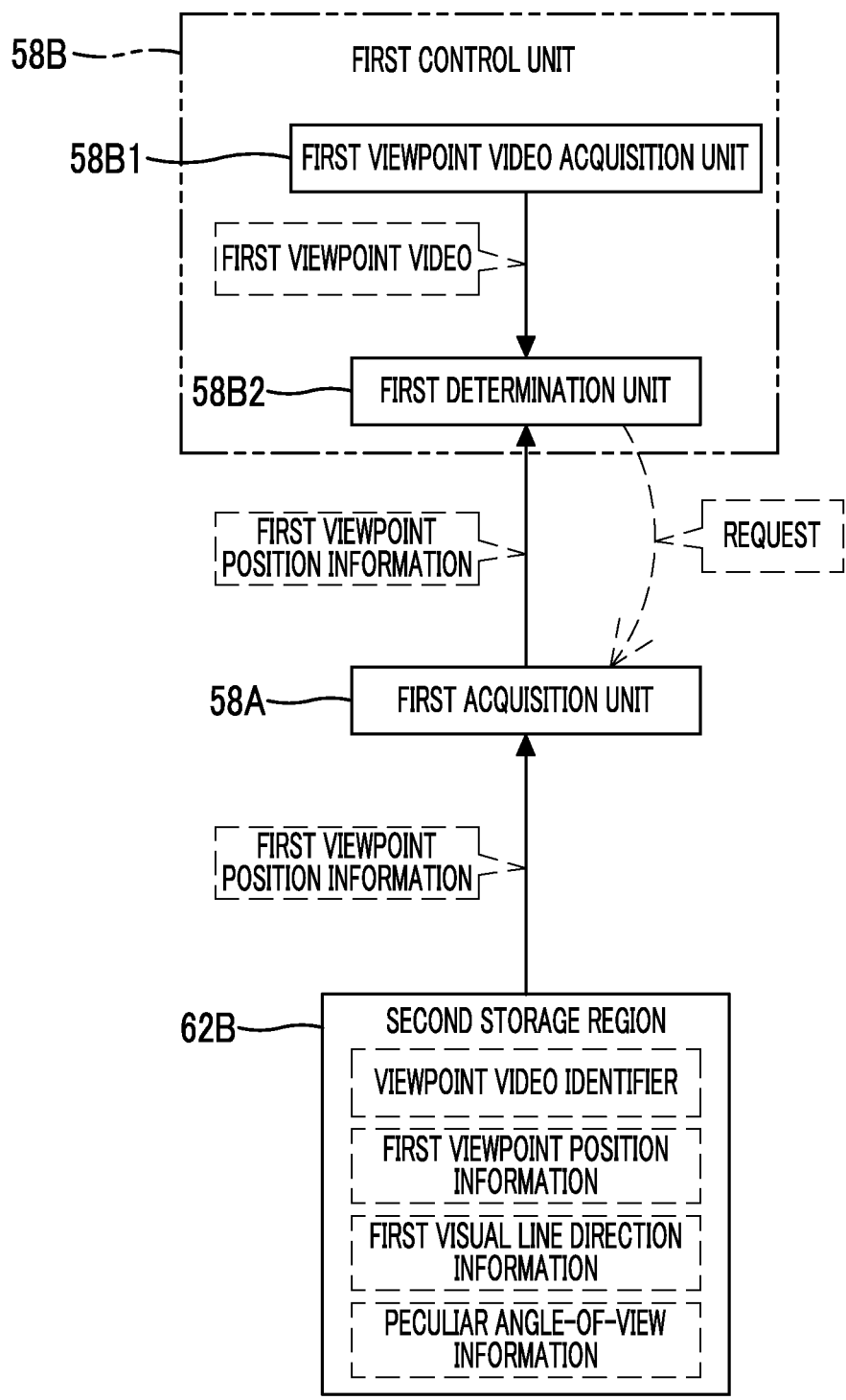
FIG. 14 is a block diagram showing an example of each process content of a first acquisition unit, the first viewpoint video acquisition unit, and a first determination unit according to the embodiment.

For example, as shown in FIG. 14, the first acquisition unit 58A acquires the first viewpoint position information. Specifically, the peculiar viewpoint position information corresponding to the second viewpoint video displayed on the display 204 of the second HMD 34B is stored in the second storage region 62B as the first viewpoint position information, and the first viewpoint position information is acquired from the second storage region 62B by the first acquisition unit 58A.

In a case in which the first viewpoint position indicated by the first viewpoint position information acquired by the first acquisition unit 58A is included in the first viewpoint video, the first control unit 58B performs a control of displaying a first person avatar (see FIG. 25) for specifying the first viewpoint position indicated by the first viewpoint position information acquired by the first acquisition unit 58A in the first viewpoint video. In addition, the first control unit 58B performs a control of changing a display size of a first avatar depending on an angle of view of a first avatar-containing viewpoint video (see FIG. 31) displayed by the display 154.

Figure 24:
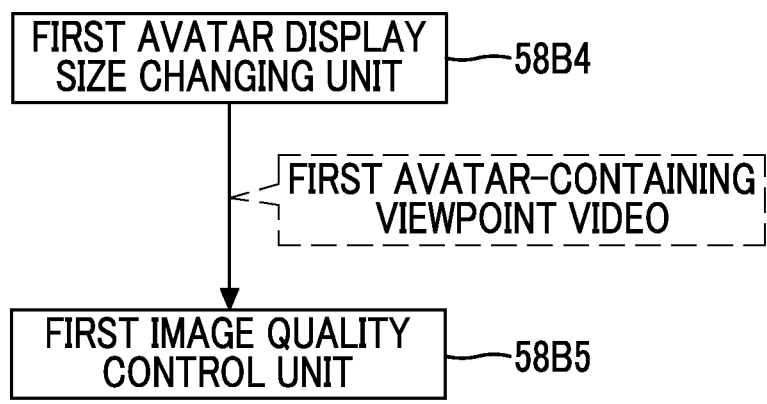
FIG. 24 is a block diagram showing an example of a relationship between the first avatar display size changing unit and a first image quality control unit according to the embodiment.
Figure 25:
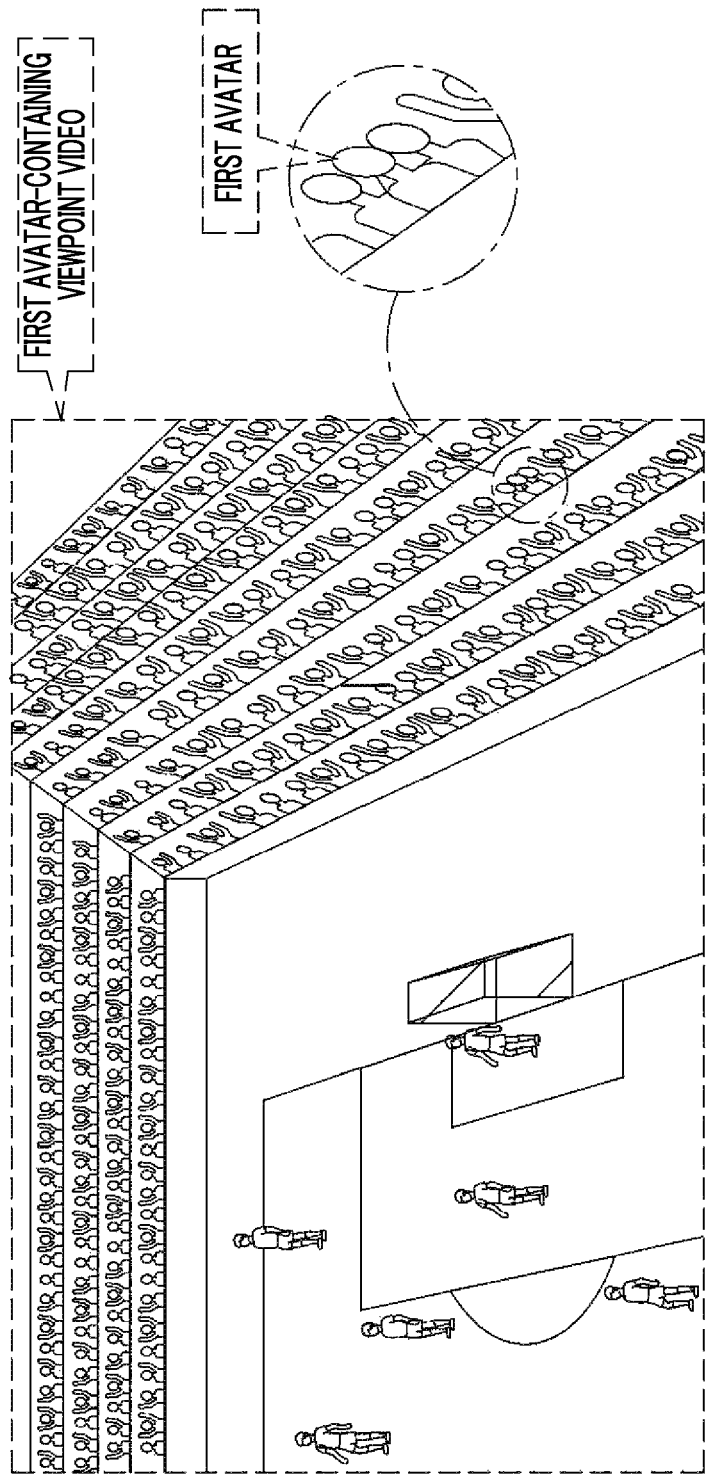
FIG. 25 is a conceptual diagram showing an example of an aspect of the first avatar-containing viewpoint video in a case in which an image quality of the first avatar is controlled by the first image quality control unit according to the embodiment.

In addition, the first control unit 58B performs a control of causing the display 154 to set a degree of difference between an image quality of the first viewpoint video and an image quality of the first avatar within a first predetermined range (see FIGS. 24 and 25). In addition, the first control unit 58B performs a control of causing the display 154 to change a display aspect of the first avatar depending on a relationship between the display size of the first viewpoint video and the display size of the first avatar. In addition, the first control unit 58B performs a control of causing the display 154 to change the display aspect of the first avatar in a case in which a ratio of the display size of the first avatar to the display size of the first viewpoint video is equal to or more than a first predetermined value (for example, 5 percent) (see FIGS. 27 to 29). Note that the first predetermined value is an example of a "first threshold value" of the technology of the present disclosure. Hereinafter, a specific description will be made.

The first viewpoint video acquisition unit 58B1 outputs the acquired first viewpoint video to the first determination unit 58B2. In a case in which the first viewpoint video is input from the first viewpoint video acquisition unit 58B1, the first determination unit 58B2 requests the first acquisition unit 58A to acquire the first viewpoint position information. The first acquisition unit 58A acquires the first viewpoint position information from the second storage region 62B in response to the request from the first determination unit 58B2 and outputs the acquired first viewpoint position information to the first determination unit 58B2.

The first determination unit 58B2 determines whether or not the first viewpoint position indicated by the first viewpoint position information input from the first acquisition unit 58A is included in the first viewpoint video. The determination as to whether or not the first viewpoint position is included in the first viewpoint video is made by referring to, for example, the peculiar angle-of-view information, the peculiar viewpoint position information, and the peculiar visual line direction information corresponding to the first viewpoint video.

Figure 15:
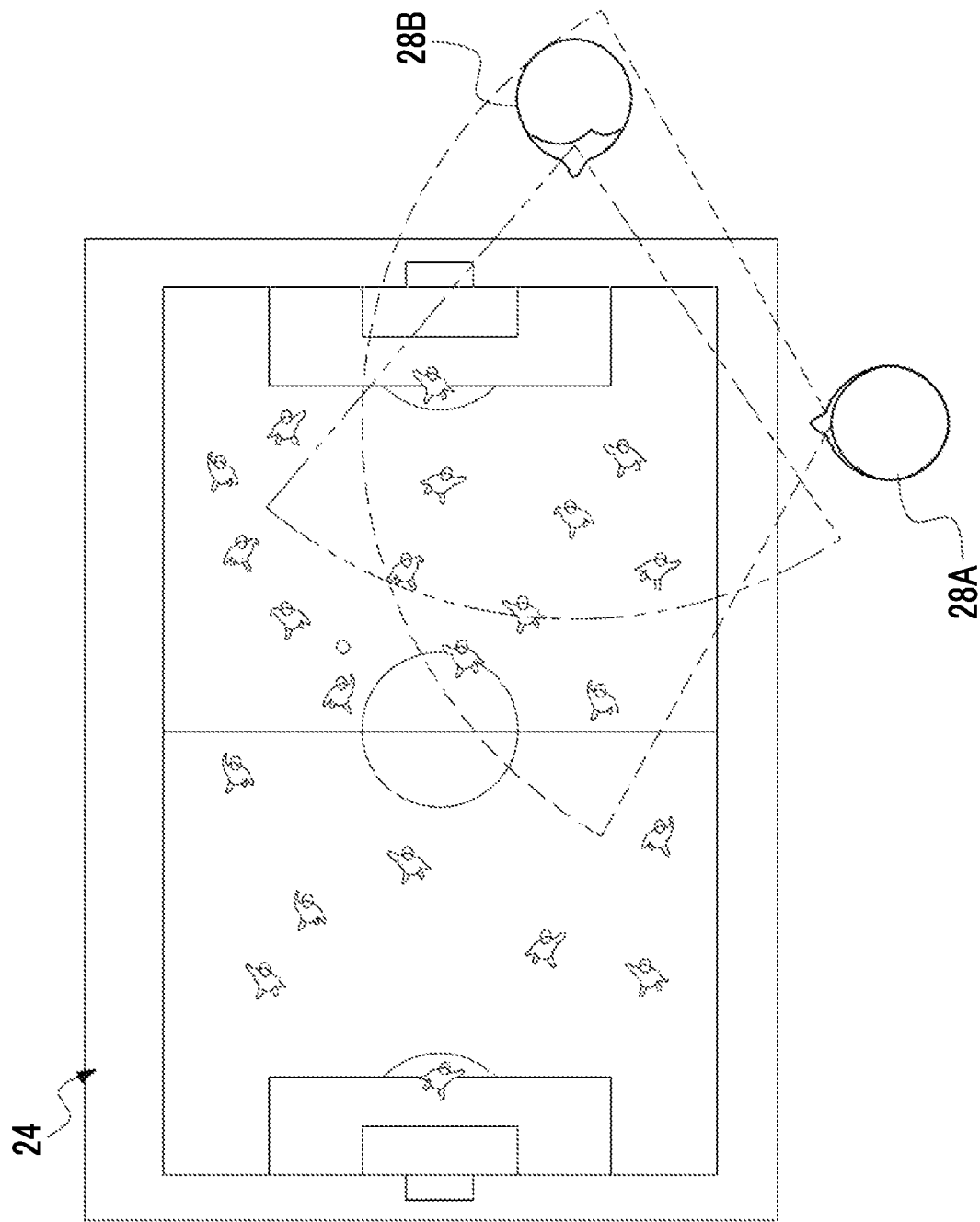
FIG. 15 is a conceptual diagram showing an example of an aspect in which a first viewpoint position is included in a first viewpoint video selected from among a plurality of viewpoint videos.

Here, the fact that the first viewpoint position is included in the first viewpoint video refers to, for example, that at the current point in time, the viewpoint position of the viewer 28B who visually recognizes the second viewpoint video is included in the first viewpoint video visually recognized by the viewer 28A, as shown in FIG. 15. Note that the viewers 28A and 28B shown in FIG. 15 are virtual images shown for convenience, and in the example shown in FIG. 15, it merely expresses virtual presence positions of the viewers 28A and 28B, which can be specified, with respect to the soccer field 24.

Figure 16:
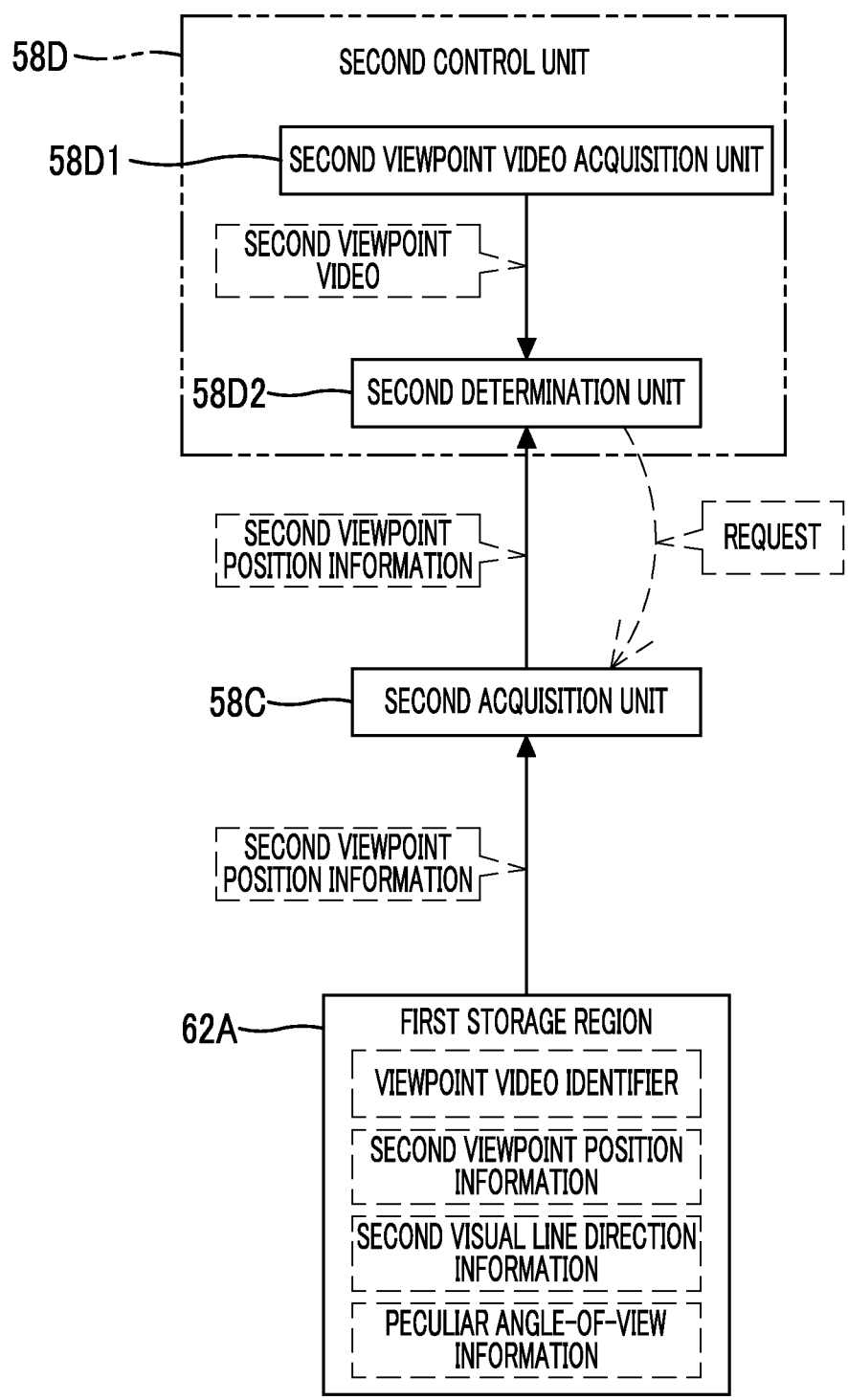
FIG. 16 is a block diagram showing an example of each process content of a second acquisition unit, the second viewpoint video acquisition unit, and a second determination unit according to the embodiment.

For example, as shown in FIG. 16, the second acquisition unit 58C acquires the second viewpoint position information. Specifically, the peculiar viewpoint position information corresponding to the first viewpoint video displayed on the display 154 of the first HMD 34A is stored in the first storage region 62A as the second viewpoint position information, and the second viewpoint position information is acquired from the first storage region 62A by the second acquisition unit 58C.

In a case in which the second viewpoint position indicated by the second viewpoint position information acquired by the second acquisition unit 58C is included in the second viewpoint video, the second control unit 58D performs a control of displaying a second person avatar for specifying the second viewpoint position indicated by the second viewpoint position information acquired by the second acquisition unit 58C in the second viewpoint video. In addition, the second control unit 58D performs a control of changing a display size of a second avatar depending on an angle of view of a second avatar-containing viewpoint video (see FIG. 32) displayed by the display 204.

In addition, the second control unit 58D performs a control of causing the display 204 to set a degree of difference between an image quality of the second viewpoint video and an image quality of the second avatar within a second predetermined range. In addition, the second control unit 58D performs a control of causing the display 204 to change a display aspect of the second avatar depending on a relationship between the display size of the second viewpoint video and the display size of the second avatar. In addition, the second control unit 58D performs a control of causing the display 204 to change the display aspect of the second avatar in a case in which a ratio of the display size of the second avatar to the display size of the second viewpoint video is equal to or more than a second predetermined value (for example, 5 percent) (see FIGS. 29 and 30). Note that the second predetermined value is an example of a "third threshold value" of the technology of the present disclosure. Hereinafter, a specific description will be made.

The second viewpoint video acquisition unit 58D1 outputs the acquired second viewpoint video to the second determination unit 58D2. In a case in which the second viewpoint video is input from the second viewpoint video acquisition unit 58D1, the second determination unit 58D2 requests the second acquisition unit 58C to acquire the second viewpoint position information. The second acquisition unit 58C acquires the second viewpoint position information from the first storage region 62A in response to the request from the second determination unit 58D2 and outputs the acquired second viewpoint position information to the second determination unit 58D2.

The second determination unit 58D2 determines whether or not the second viewpoint position indicated by the second viewpoint position information input from the second acquisition unit 58C is included in the second viewpoint video. The determination as to whether or not the second viewpoint position is included in the second viewpoint video is made by referring to, for example, the peculiar angle-of-view information, the peculiar viewpoint position information, and the peculiar visual line direction information corresponding to the second viewpoint video.

Figure 17:
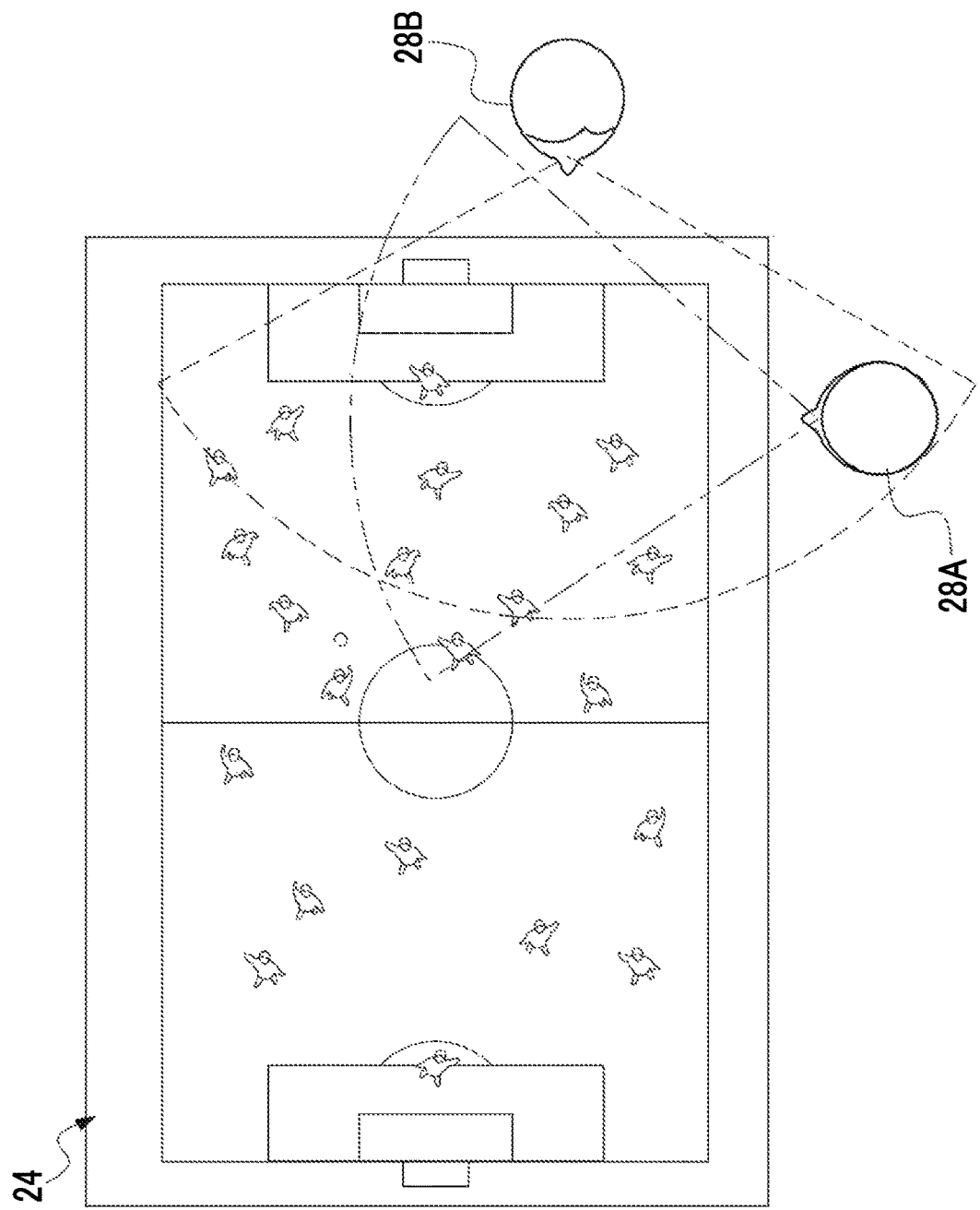
FIG. 17 is a conceptual diagram showing an example of an aspect in which a second viewpoint position is included in a second viewpoint video selected from among the plurality of viewpoint videos.

Here, the fact that the second viewpoint position is included in the second viewpoint video refers to, for example, that at the current point in time, the viewpoint position of the viewer 28A who visually recognizes the first viewpoint video is included in the second viewpoint video visually recognized by the viewer 28B, as shown in FIG. 17. Note that the viewers 28A and 28B shown in FIG. 17 are virtual images shown for convenience, and in the example shown in FIG. 17, it merely expresses virtual presence positions of the viewers 28A and 28B, which can be specified, with respect to the soccer field 24.

Figure 18:
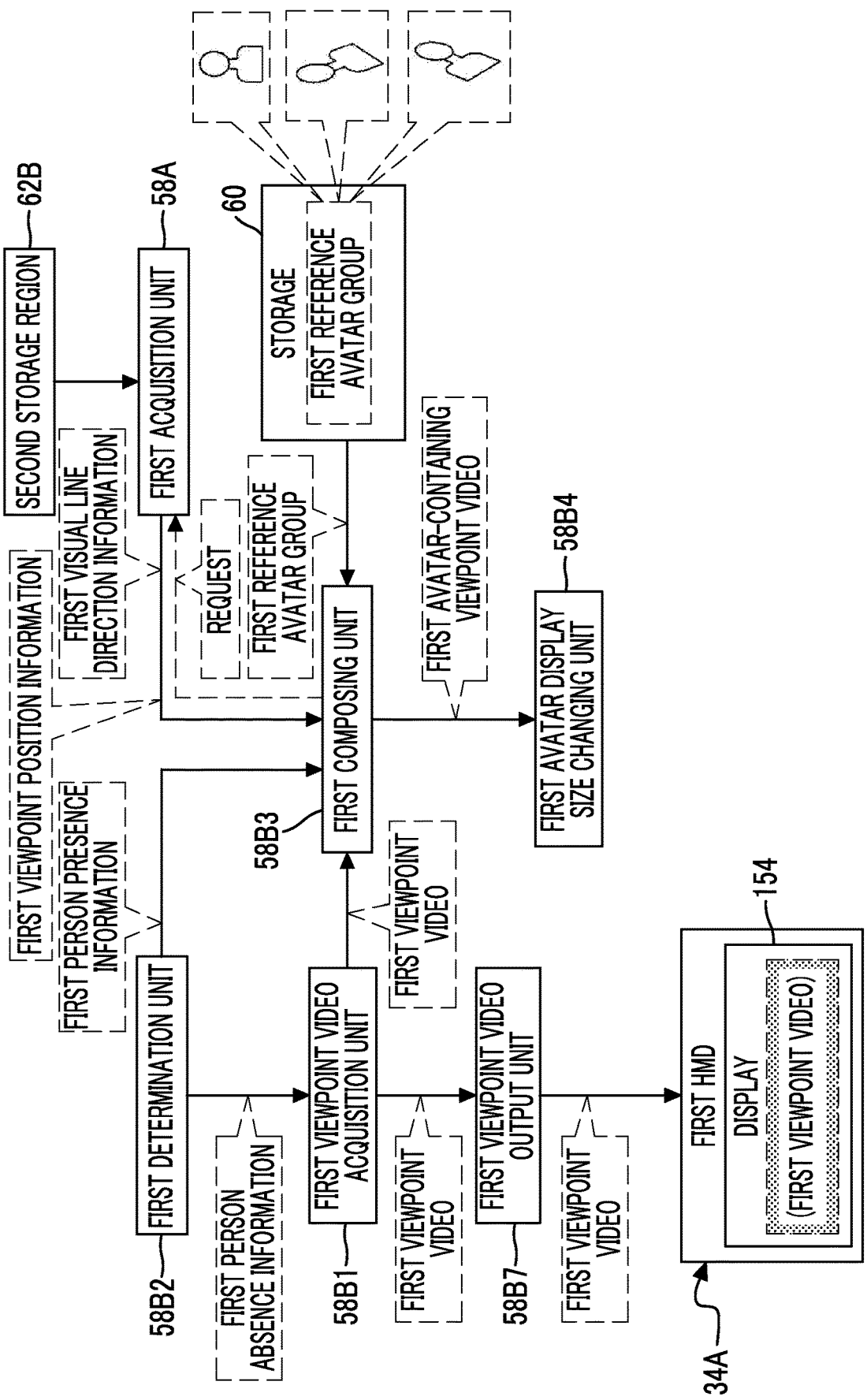
FIG. 18 is a block diagram provided for describing an example of each process content of a first composing unit and a first viewpoint video output unit according to the embodiment.

For example, as shown in FIG. 18, in a case in which it is determined that the first viewpoint position is included in the first viewpoint video, the first determination unit 58B2 outputs first person presence information indicating that the viewer 28B is present in a field of view of the viewer 28A, that is, the first viewpoint position is present to the first composing unit 58B3. In a case in which it is determined that the first viewpoint position is not included in the first viewpoint video, the first determination unit 58B2 outputs first person absence information indicating that the viewer 28B is not present in a field of view of the viewer 28A, that is, the first viewpoint position is not present to the first viewpoint video acquisition unit 58B1.

In a case in which the first person absence information is input from the first determination unit 58B2, the first viewpoint video acquisition unit 58B1 outputs the first viewpoint video to the first viewpoint video output unit 58B7. The first viewpoint video output unit 58B7 outputs the first viewpoint video input from the first viewpoint video acquisition unit 58B1 to the first HMD 34A. The first viewpoint video output unit 58B7 outputs the first viewpoint video to the first HMD 34A, and thus the first viewpoint video is displayed on the display 154.

A first reference avatar group is stored in the storage 60. The first reference avatar group is a set of a plurality of first reference avatars. The first reference avatar refers to a virtual image in imitation of the viewer 28B. The first reference avatar group includes the plurality of first reference avatars indicating the viewer 28B in a case in which the viewer 28B is observed from a plurality of directions.

In a case in which the first person presence information is input from the first determination unit 58B2, the first composing unit 58B3 requests the first acquisition unit 58A to acquire the first viewpoint position information and the first visual line direction information. The first acquisition unit 58A acquires the first viewpoint position information and the first visual line direction information from the second storage region 62B in response to the request from the first composing unit 58B3 and outputs the acquired first viewpoint position information and first visual line direction information to the first composing unit 58B3.

In a case in which the first person presence information is input from the first determination unit 58B2, the first composing unit 58B3 acquires the first viewpoint video from the first viewpoint video acquisition unit 58B1 and acquires the first reference avatar group from the storage 60.

The first composing unit 58B3 generates the first avatar based on the first visual line direction information input from the first acquisition unit 58A. The first avatar refers to a virtual image in imitation of the viewer 28B. By using the first reference avatar group, the first composing unit 58B3 generates the first avatar for specifying the first visual line direction indicated by the first visual line direction information. That is, the first composing unit 58B3 composes the first reference avatar group to generate the first avatar indicating the viewer 28B who faces the first visual line direction. In this way, the first avatar is generated by the first composing unit 58B3 as the avatar for specifying the first visual line direction indicated by the first visual line direction information acquired by the first acquisition unit 58A. Note that the first avatar is an example of "first specific information" according to the technology of the present disclosure.

Figure 19:
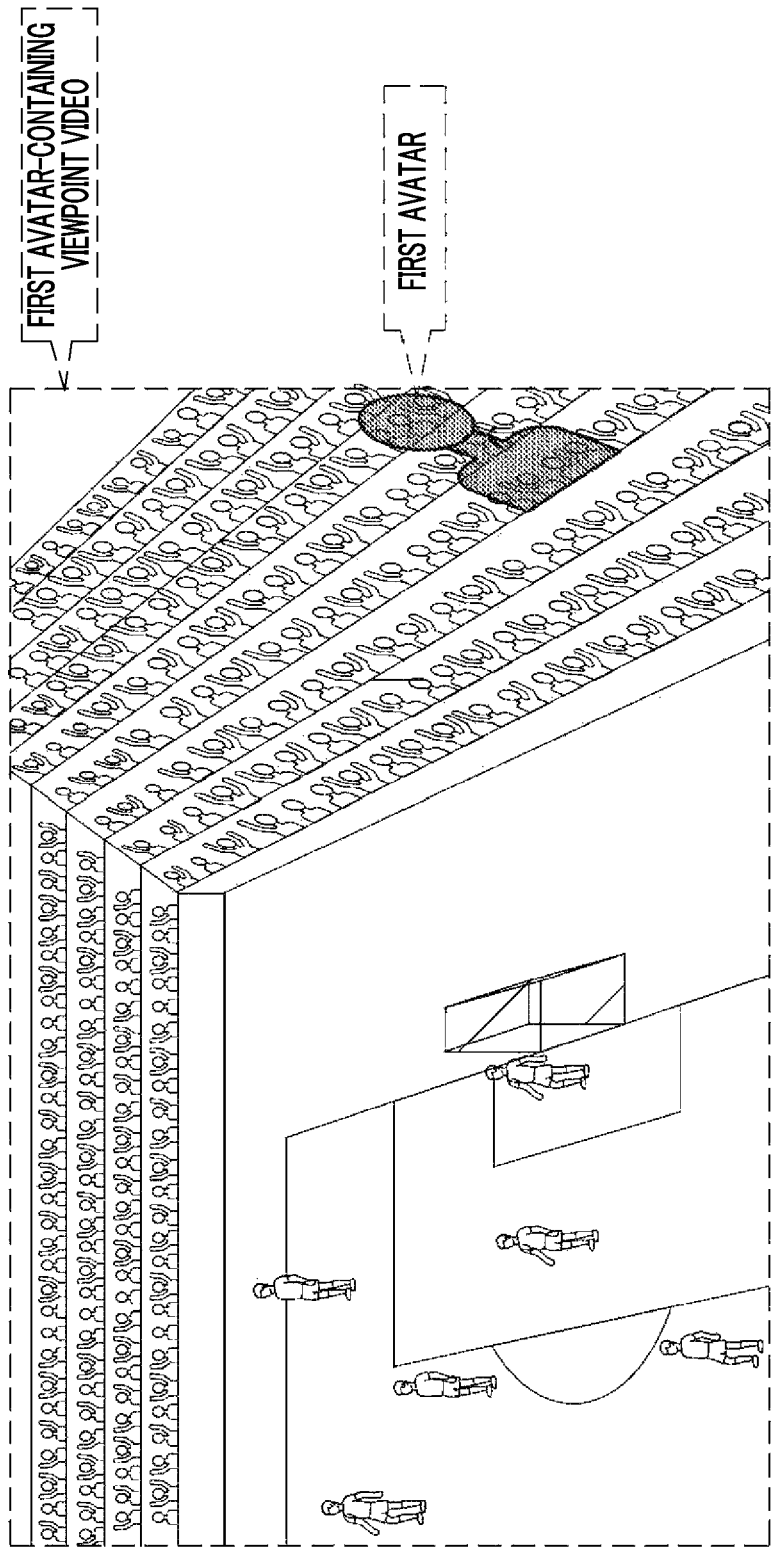
FIG. 19 is a conceptual diagram showing an example of a first avatar-containing viewpoint video generated by the first composing unit according to the embodiment.

The first composing unit 58B3 generates the first avatar-containing viewpoint video by superimposing the first avatar on the first viewpoint video at the first viewpoint position indicated by the first viewpoint position information input from the first acquisition unit 58A, for example, as shown in FIG. 19. The first composing unit 58B3 outputs the generated first avatar-containing viewpoint video to the first avatar display size changing unit 58B4. Note that, here, although an aspect example is described in which the first avatar is superimposed on the first viewpoint video, the technology of the present disclosure is not limited to this.

For example, the first avatar may be embedded in the first viewpoint video, finally, the first avatar need only be displayed in the second viewpoint video displayed on the display 154 of the first HMD 34A.

Figure 20:
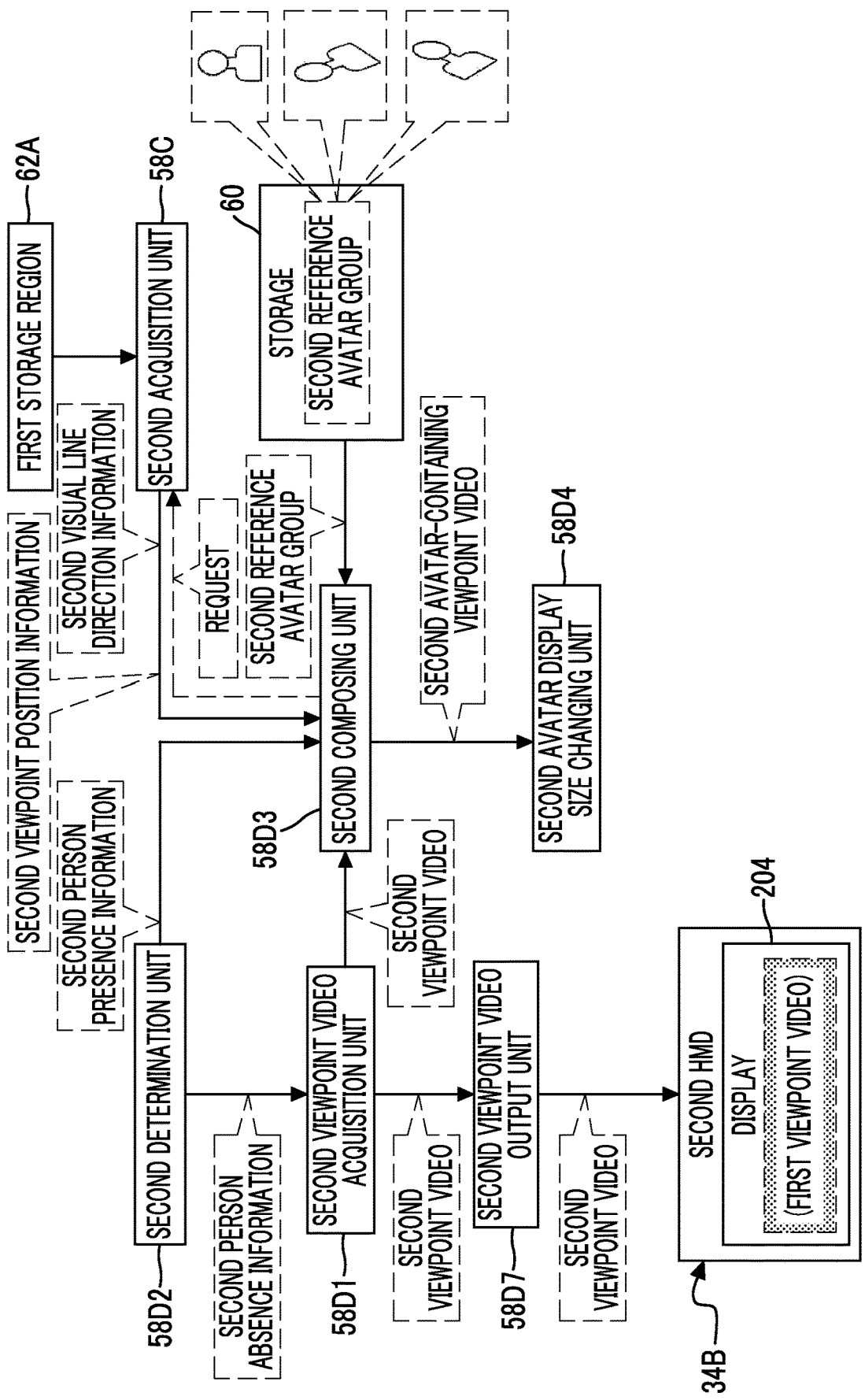
FIG. 20 is a block diagram provided for describing an example of each process content of a second composing unit and a second viewpoint video output unit according to the embodiment.

For example, as shown in FIG. 20, in a case in which it is determined that the second viewpoint position is included in the second viewpoint video, the second determination unit 58D2 outputs second person presence information indicating that the viewer 28A is present in a field of view of the viewer 28B, that is, the second viewpoint position is present to the second composing unit 58D3. In a case in which it is determined that the second viewpoint position is not included in the second viewpoint video, the second determination unit 58D2 outputs second person absence information indicating that the viewer 28A is not present in a field of view of the viewer 28B, that is, the second viewpoint position is not present to the second viewpoint video acquisition unit 58D1.

In a case in which the second person absence information is input from the second determination unit 58D2, the second viewpoint video acquisition unit 58D1 outputs the second viewpoint video to the second viewpoint video output unit 58D7. The second viewpoint video output unit 58D7 outputs the second viewpoint video input from the second viewpoint video acquisition unit 58D1 to the second HMD 34B. The second viewpoint video output unit 58D7 outputs the second viewpoint video to the second HMD 34B, and thus the second viewpoint video is displayed on the display 204.

A second reference avatar group is stored in the storage 60. The second reference avatar group is a set of a plurality of second reference avatars. The second reference avatar refers to a virtual image in imitation of the viewer 28A. The second reference avatar group includes the plurality of second reference avatars indicating the viewer 28A in a case in which the viewer 28A is observed from a plurality of directions.

In a case in which the second person presence information is input from the second determination unit 58D2, the second composing unit 58D3 requests the second acquisition unit 58C to acquire the second viewpoint position information and the second visual line direction information. The second acquisition unit 58C acquires the second viewpoint position information and the second visual line direction information from the first storage region 62A in response to the request from the second composing unit 58D3 and outputs the acquired second viewpoint position information and second visual line direction information to the second composing unit 58D3.

In a case in which the second person presence information is input from the second determination unit 58D2, the second composing unit 58D3 acquires the second viewpoint video from the second viewpoint video acquisition unit 58D1 and acquires the second reference avatar group from the storage 60.

The second composing unit 58D3 generates the second avatar based on the second visual line direction information input from the second acquisition unit 58C. The second avatar refers to a virtual image in imitation of the viewer 28A. By using the second reference avatar group, the second composing unit 58D3 generates the second avatar for specifying the second visual line direction indicated by the second visual line direction information. That is, the second composing unit 58D3 composes the second reference avatar group to generate the second avatar indicating the viewer 28A who faces the second visual line direction. In this way, the second avatar is generated by the second composing unit 58D3 as the avatar for specifying the second visual line direction indicated by the second visual line direction information acquired by the second acquisition unit 58C. Note that the second avatar is an example of "second specific information" according to the technology of the present disclosure.

The second composing unit 58D3 generates the second avatar-containing viewpoint video by superimposing the second avatar on the second viewpoint video at the second viewpoint position indicated by the second viewpoint position information input from the second acquisition unit 58C, as shown in FIG. 19. The second composing unit 58D3 outputs the generated second avatar-containing viewpoint video to the second avatar display size changing unit 58D4. Note that, here, although an aspect example is described in which the second avatar is superimposed on the second viewpoint video, the technology of the present disclosure is not limited to this. For example, the second avatar may be embedded in the second viewpoint video, finally, the second avatar need only be displayed in the second viewpoint video displayed on the display 206 of the second HMD 34B. Note that, in the following, for convenience of description, in a case in which a distinction is not necessary, the first avatar and the second avatar are simply referred to as the "avatar".

Figure 21:
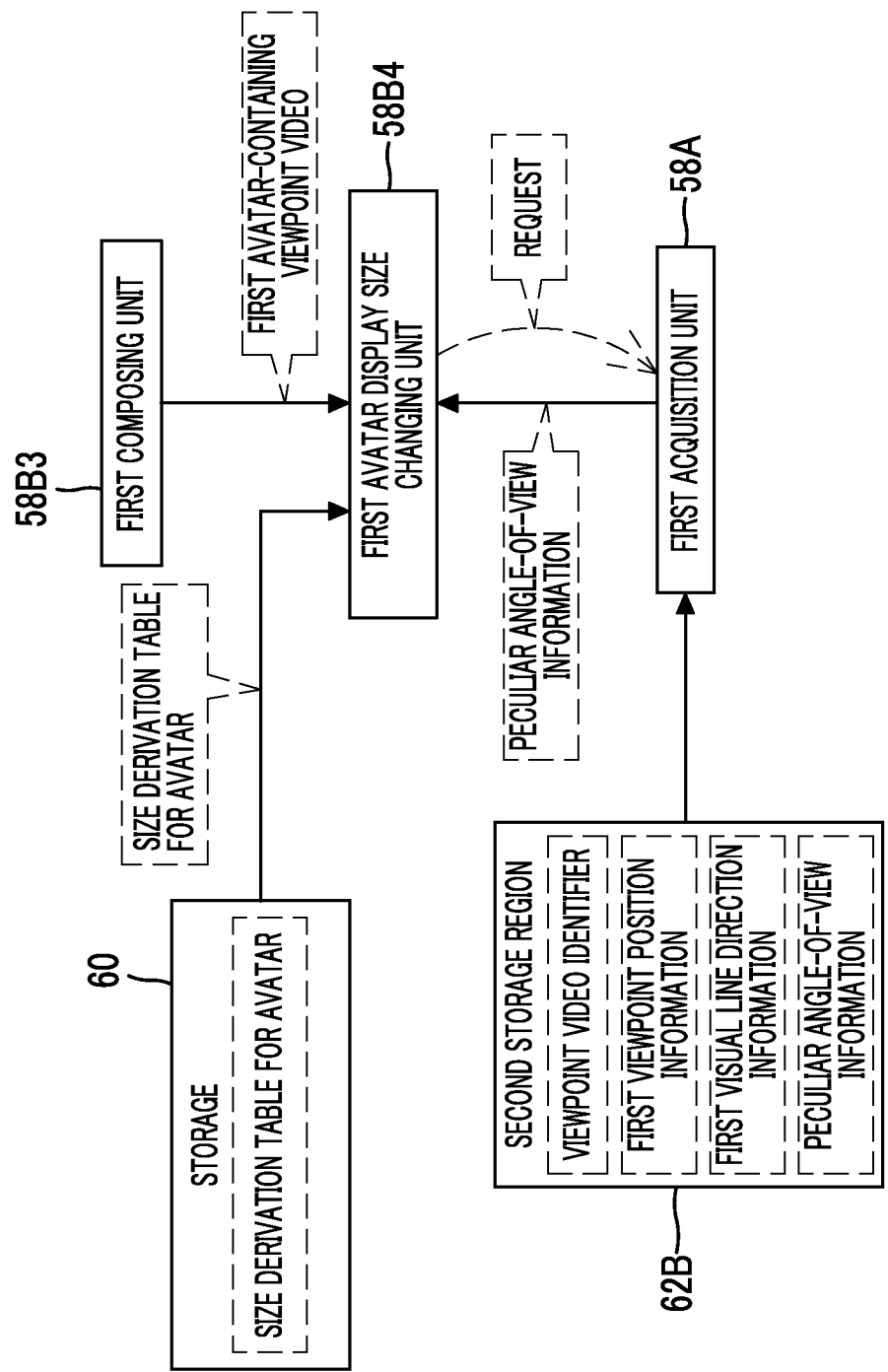
FIG. 21 is a block diagram provided for describing an example of a process content of a first avatar display size changing unit according to the embodiment.

For example, as shown in FIG. 21, in a case in which the first avatar-containing viewpoint video is input from the first composing unit 58B3, the first avatar display size changing unit 58B4 requests the first acquisition unit 58A to acquire the peculiar angle-of-view information. The first acquisition unit 58A acquires the peculiar angle-of-view information from the second storage region 62B in response to the request from the first avatar display size changing unit 58B4 and outputs the acquired peculiar angle-of-view information as the first avatar display size changing unit 58B4.

The storage 60 stores a size derivation table for the avatar. The size derivation table for the avatar is a table in which the angle of view of the viewpoint video 46 is associated with the size of the avatar. The size of the avatar refers to an area of the avatar, for example. A relationship between the angle of view of the viewpoint video 46 and the size of the avatar in the size derivation table for the avatar can be changed in response to the instruction received by the reception device 152. Here, the size derivation table is described as an example, but the technology of the present disclosure is not limited to this, and it is also possible to apply an arithmetic expression with the angle of view of the viewpoint video 46 as an independent variable and the size of the avatar as a dependent variable.

The first avatar display size changing unit 58B4 changes the size of the first avatar in the first avatar-containing viewpoint video to the size depending on the angle of view indicated by the peculiar angle-of-view information. In this case, the first avatar display size changing unit 58B4 derives the first avatar size from the size derivation table for the avatar depending on the peculiar angle-of-view information. As the size of the first avatar, the size corresponding to the angle of view indicated by the peculiar angle-of-view information is derived from the size derivation table for the avatar. The first avatar display size changing unit 58B4 changes the first avatar in the first avatar-containing viewpoint video to have the size derived from the size derivation table for the avatar.

Figure 22:
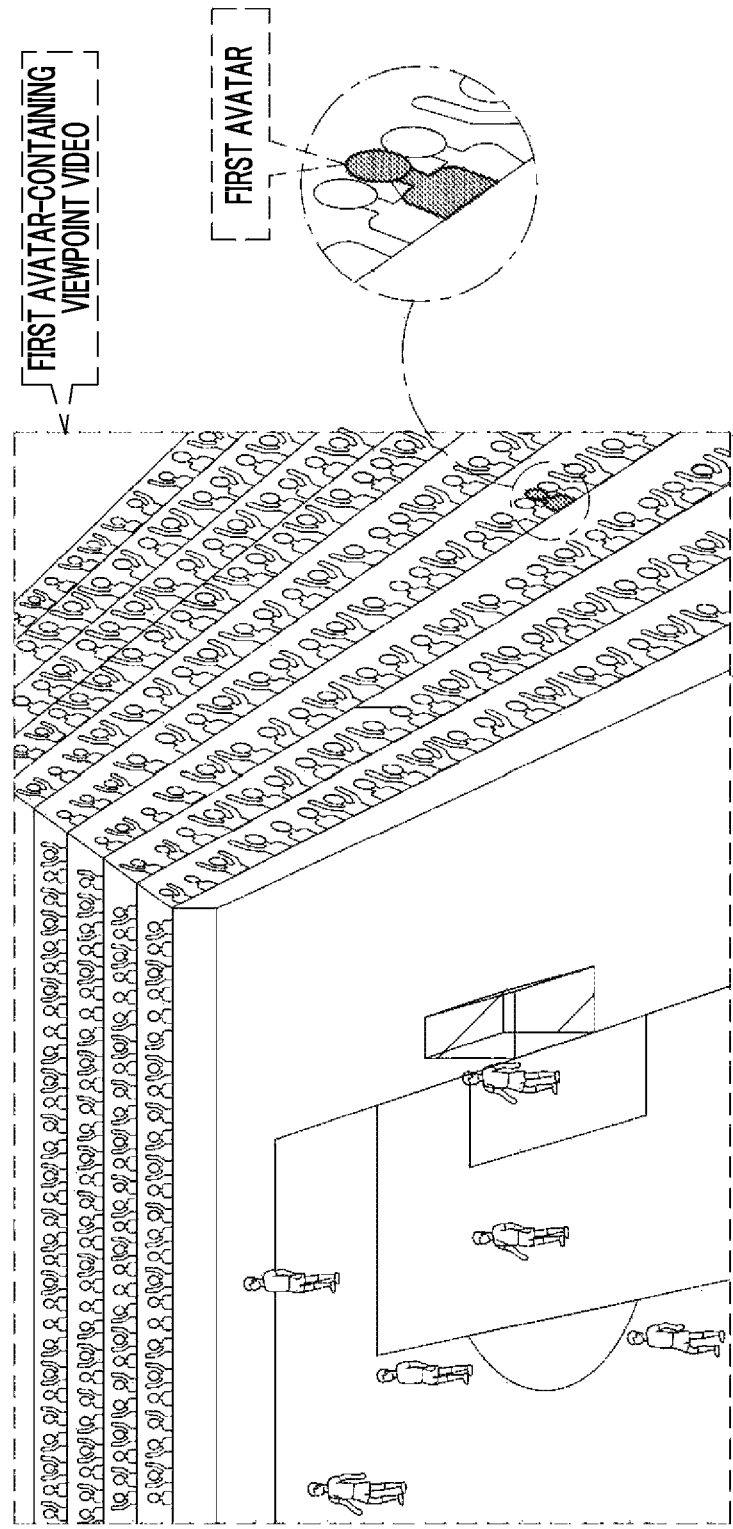
FIG. 22 is a conceptual diagram showing an example of an aspect in which a display aspect of a first avatar is changed by the first avatar display size changing unit according to the embodiment.

For example, the size of the first avatar in the first avatar-containing viewpoint video shown in FIG. 19 is changed to the size of the first avatar in the first avatar-containing viewpoint video shown in FIG. 22 by the first avatar display size changing unit 58B4. In the example shown in FIG. 19, the size of the first avatar is several times or more larger than the size of the spectator in the first avatar-containing viewpoint video, whereas in the example shown in FIG. 22, the size of the first avatar is changed to almost same size as the spectator in the first avatar-containing viewpoint video. As a result, in a case in which the first avatar-containing viewpoint video is displayed on the display 154 of the first HMD 34A, the display size of the first avatar is changed depending on the angle of view of the first avatar-containing viewpoint video displayed on the display 154.

Figure 23:
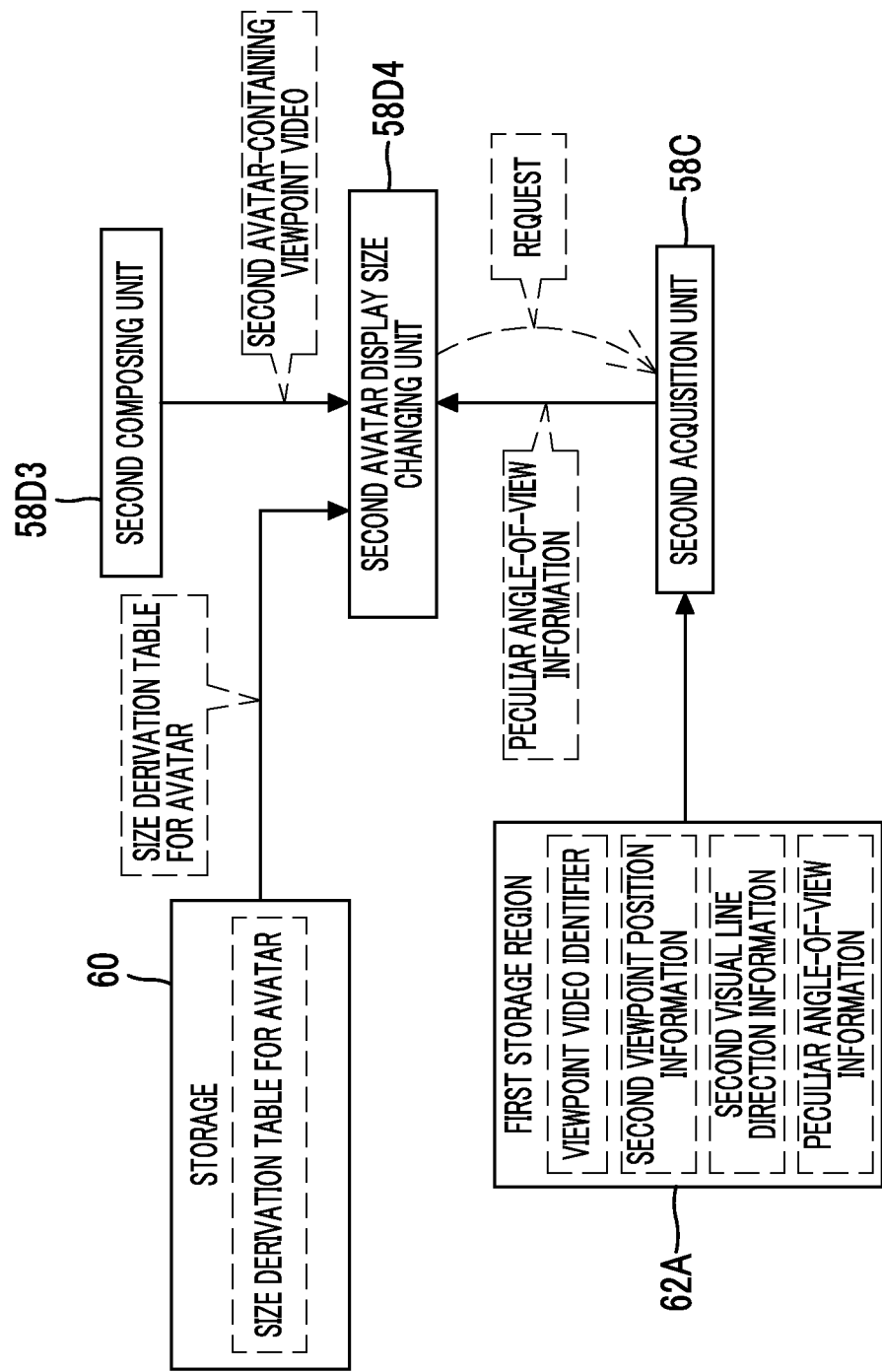
FIG. 23 is a block diagram provided for describing an example of a process content of a second avatar display size changing unit according to the embodiment.

For example, as shown in FIG. 23, in a case in which the second avatar-containing viewpoint video is input from the second composing unit 58D3, the second avatar display size changing unit 58D4 requests the second acquisition unit 58C to acquire the peculiar angle-of-view information. The second acquisition unit 58C acquires the peculiar angle-of-view information from the first storage region 62A in response to the request from the second avatar display size changing unit 58D4 and outputs the acquired peculiar angle-of-view information as the second avatar display size changing unit 58D4.

The second avatar display size changing unit 58D4 changes the size of the second avatar in the second avatar-containing viewpoint video to the size depending on the angle of view indicated by the peculiar angle-of-view information in the same manner as the method in which the size of the first avatar in the first avatar-containing viewpoint video is changed. That is, the second avatar display size changing unit 58D4 derives the second avatar size from the size derivation table for the avatar depending on the peculiar angle-of-view information. As the size of the second avatar, the size corresponding to the angle of view indicated by the peculiar angle-of-view information is derived from the size derivation table for the avatar. The second avatar display size changing unit 58D4 changes the second avatar in the second avatar-containing viewpoint video to have the size derived from the size derivation table for the avatar. As a result, in a case in which the second avatar-containing viewpoint video is displayed on the display 204 of the second HMD 34B, the display size of the second avatar is changed depending on the angle of view of the second avatar-containing viewpoint video displayed on the display 204.

For example, as shown in FIG. 24, the first avatar display size changing unit 58B4 outputs the first avatar-containing viewpoint video obtained by changing the size of the first avatar to the size depending on the angle of view to the first image quality control unit 58B5. The first image quality control unit 58B5 controls the image quality of the first avatar-containing viewpoint video such that the degree of difference between the image quality of the first viewpoint video and the image quality of the first avatar is within the first predetermined range in the first avatar-containing viewpoint video. Here, the "degree of difference" may be a difference between the image quality of the first viewpoint video and the image quality of the first avatar, or may be a ratio one of the image quality of the first viewpoint video or the image quality of the first avatar to the other thereof.

Specifically, the first image quality control unit 58B5 determines whether or not the degree of difference between the image quality of the first viewpoint video and the image quality of the first avatar is within the first predetermined range in the first avatar-containing viewpoint video. Then, in a case in which the degree of difference between the image quality of the first viewpoint video and the image quality of the first avatar is not within the first predetermined range, the first image quality control unit 58B5 controls the image quality of the first avatar-containing viewpoint video to set the degree of difference between the image quality of the first viewpoint video and the image quality of the first avatar within the first predetermined range.

Here, the "image quality" refers to a resolution, a contrast, and a lightness and darkness degree. In addition, the fact that the degree of difference between the image quality of the first viewpoint video and the image quality of the first avatar is within the first predetermined range refers to the fact that a degree of difference of the resolutions is within a predetermined resolution range, a degree of difference of the contrasts is within a predetermined contrast range, and a degree of difference of the lightness and darkness degrees is within a predetermined lightness and darkness degree range. The predetermined resolution range, the predetermined contrast range, the predetermined lightness and darkness degree range may be fixed values or variable values. Examples of the fixed value include a value derived in advance by a sensory test and/or a computer simulation as a value that does not cause a visual discomfort in a case in which the avatar enters the viewpoint video 46. Examples of the variable value include a value that can be changed in response to the instruction received by the reception device 52, 76, 106, 152, or 202.

In the first avatar-containing viewpoint video, by controlling the image quality of the first avatar-containing viewpoint video such that difference between the image quality of the first viewpoint video and the image quality of the first avatar are within the first predetermined range, for example, the image quality of the first avatar shown in FIG. 22 is changed as shown in FIG. 25. That is, the image quality of the first avatar is changed such that a visual discomfort is not caused due to the first avatar appearing from the first viewpoint video or sinking into the first viewpoint video.

Figure 26:
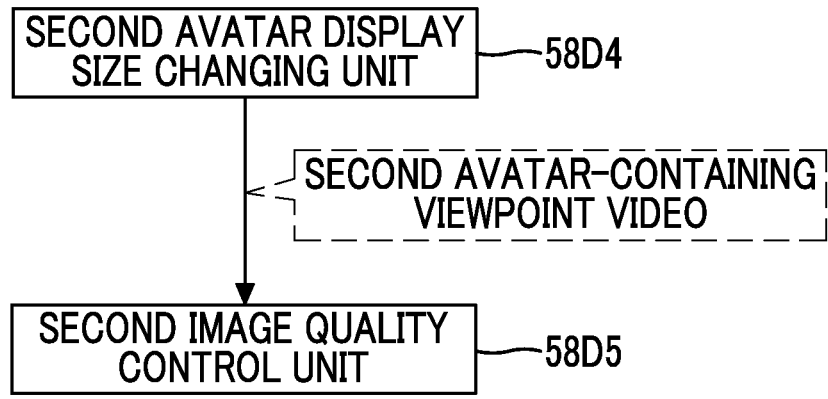
FIG. 26 is a block diagram showing an example of a relationship between the second avatar display size changing unit and a second image quality control unit according to the embodiment.

For example, as shown in FIG. 26, the second avatar display size changing unit 58D4 outputs the second avatar-containing viewpoint video obtained by changing the size of the second avatar to the size depending on the angle of view to the second image quality control unit 58D5. The second image quality control unit 58D5 controls the image quality of the second avatar-containing viewpoint video to set the degree of difference between the image quality of the second viewpoint video and the image quality of the second avatar within the second predetermined range in the second avatar-containing viewpoint video in the same manner as the method by the first image quality control unit 58B5. Here, the "degree of difference" may be a difference between the image quality of the second viewpoint video and the image quality of the second avatar, or may be a ratio one of the image quality of the second viewpoint video or the image quality of the second avatar to the other thereof.

Specifically, the second image quality control unit 58D5 determines whether or not the degree of difference between the image quality of the second viewpoint video and the image quality of the second avatar is within the second predetermined range in the second avatar-containing viewpoint video. Then, in a case in which the degree of difference between the image quality of the second viewpoint video and the image quality of the second avatar is not within the second predetermined range, the second image quality control unit 58D5 controls the image quality of the second avatar-containing viewpoint video to set the degree of difference between the image quality of the second viewpoint video and the image quality of the second avatar within the second predetermined range.

Here, the fact that the degree of difference between the image quality of the second viewpoint video and the image quality of the second avatar is within the second predetermined range refers to the fact that the degree of difference of the resolutions is within the predetermined resolution range, the degree of difference of the contrasts is within the predetermined contrast range, and the degree of difference of the lightness and darkness degrees is within the predetermined lightness and darkness degree range, in the same manner as the relationship between the degree of difference between the image quality of the first viewpoint video and image quality of the first avatar, and the first predetermined range.

In the second avatar-containing viewpoint video, by controlling the image quality of the second avatar-containing viewpoint video such that difference between the image quality of the second viewpoint video and the image quality of the second avatar are within the second predetermined range, the image quality of the second avatar is changed such that a visual discomfort is not caused due to the second avatar appearing from the second viewpoint video or sinking into the second viewpoint video.

Note that, here, although the resolution, the contrast, and the lightness and darkness degree are described as an example of the "image quality", the technology of the present disclosure is not limited to this, and at least one or two of the resolution, the contrast, or the lightness and darkness degree may be used. In addition, the image quality may be a factor that affects the image quality other than the resolution, the contrast, and the lightness and darkness degree.

Figure 27:
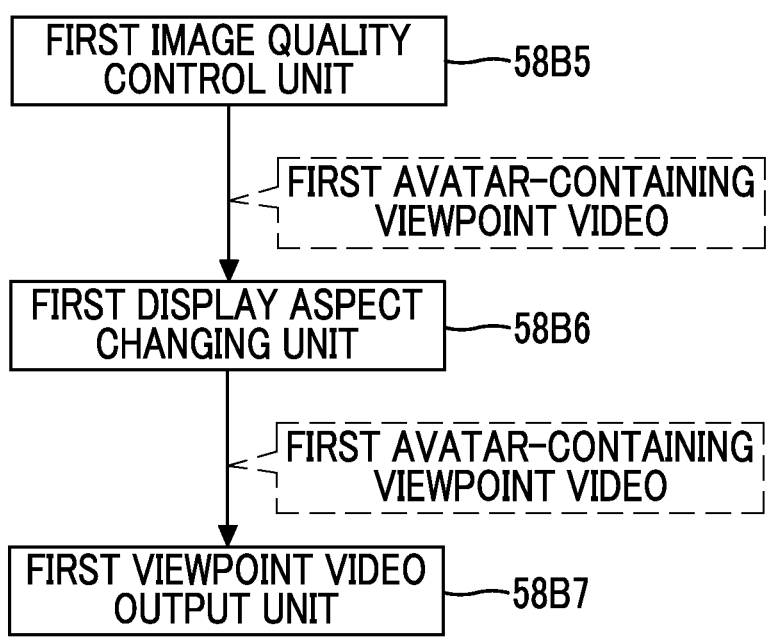
FIG. 27 is a block diagram showing an example of a relationship between the first image quality control unit, a first display aspect changing unit, and the first viewpoint video output unit according to the embodiment.

For example, as shown in FIG. 27, the first image quality control unit 58B5 outputs the first avatar-containing viewpoint video to the first display aspect changing unit 58B6. The first display aspect changing unit 58B6 changes the display aspect of the first avatar depending on the relationship between the size of the first viewpoint video and the size of the first avatar for the first avatar-containing viewpoint video input from the first image quality control unit 58B5.

The first display aspect changing unit 58B6 determines whether or not the ratio of the size of the first avatar to the size of the first viewpoint video is equal to or more than the first predetermined value for the first avatar-containing viewpoint video. In a case in which the ratio of the size of the first avatar to the size of the first viewpoint video is less than the first predetermined value, the first display aspect changing unit 58B6 transmits the first avatar-containing viewpoint video input from the first image quality control unit 58B5 to the first viewpoint video output unit 58B7 as it is. In a case in which the ratio of the size of the first avatar to the size of the first viewpoint video is equal to or more than the first predetermined value, the first display aspect changing unit 58B6 changes the display aspect of the first avatar. Then, the first display aspect changing unit 58B6 outputs the first avatar-containing viewpoint video obtained by changing the display aspect to the first viewpoint video output unit 58B7. The first predetermined value may be a fixed value or a variable value. Examples of the fixed value include a value derived in advance by a sensory test and/or a computer simulation as a lower limit value of the size of the avatar that causes a visual discomfort in a case in which the avatar enters the viewpoint video 46. Examples of the variable value include a value that can be changed in response to the instruction received by any one of the reception device 52, 76, 106, 152, or 202.

Figure 28:
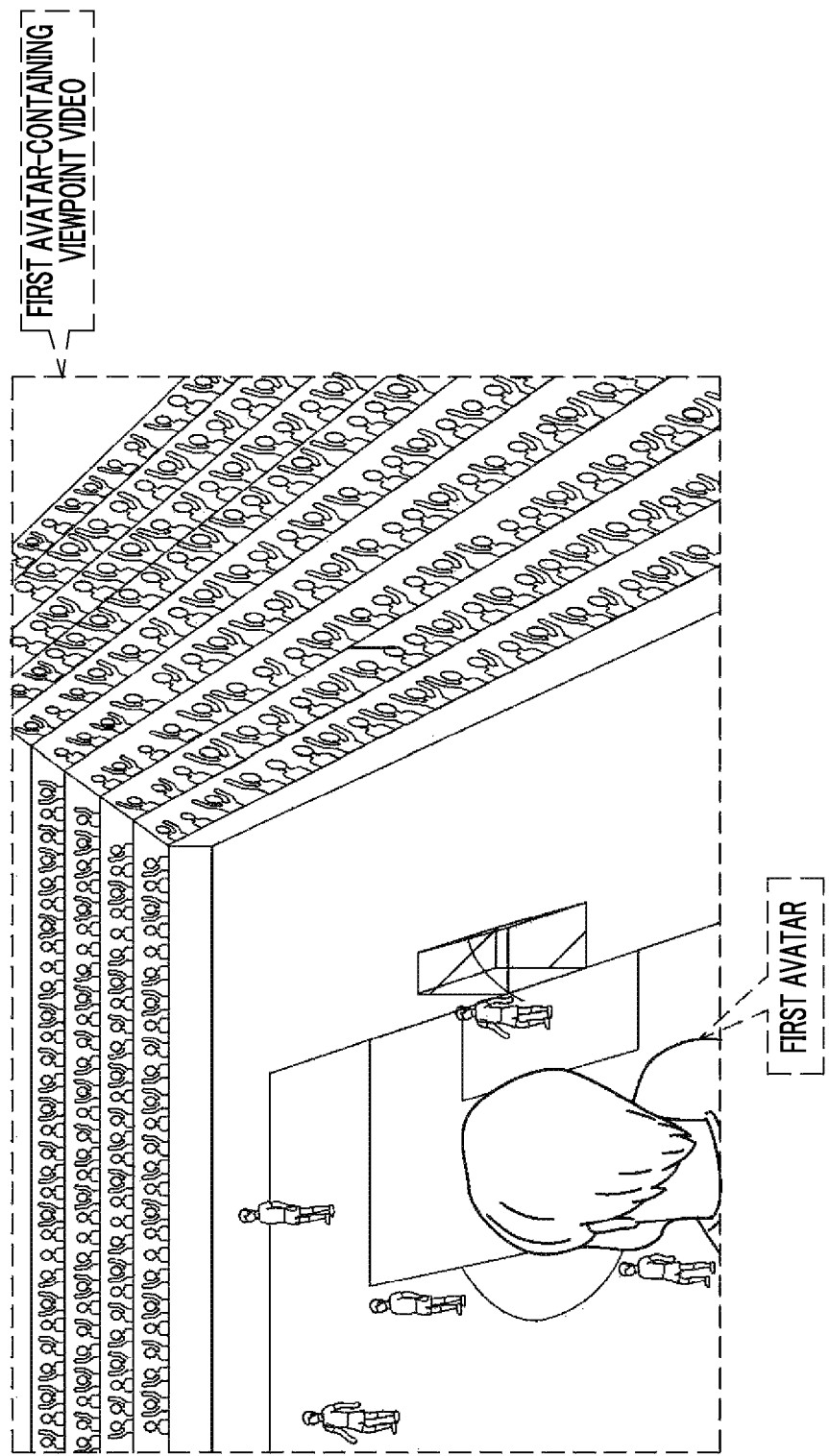
FIG. 28 is a conceptual diagram showing an example of a relationship between a size of the first avatar of which the display aspect is to be changed by the first display aspect changing unit according to the embodiment and a size of the first viewpoint video.
Figure 29:
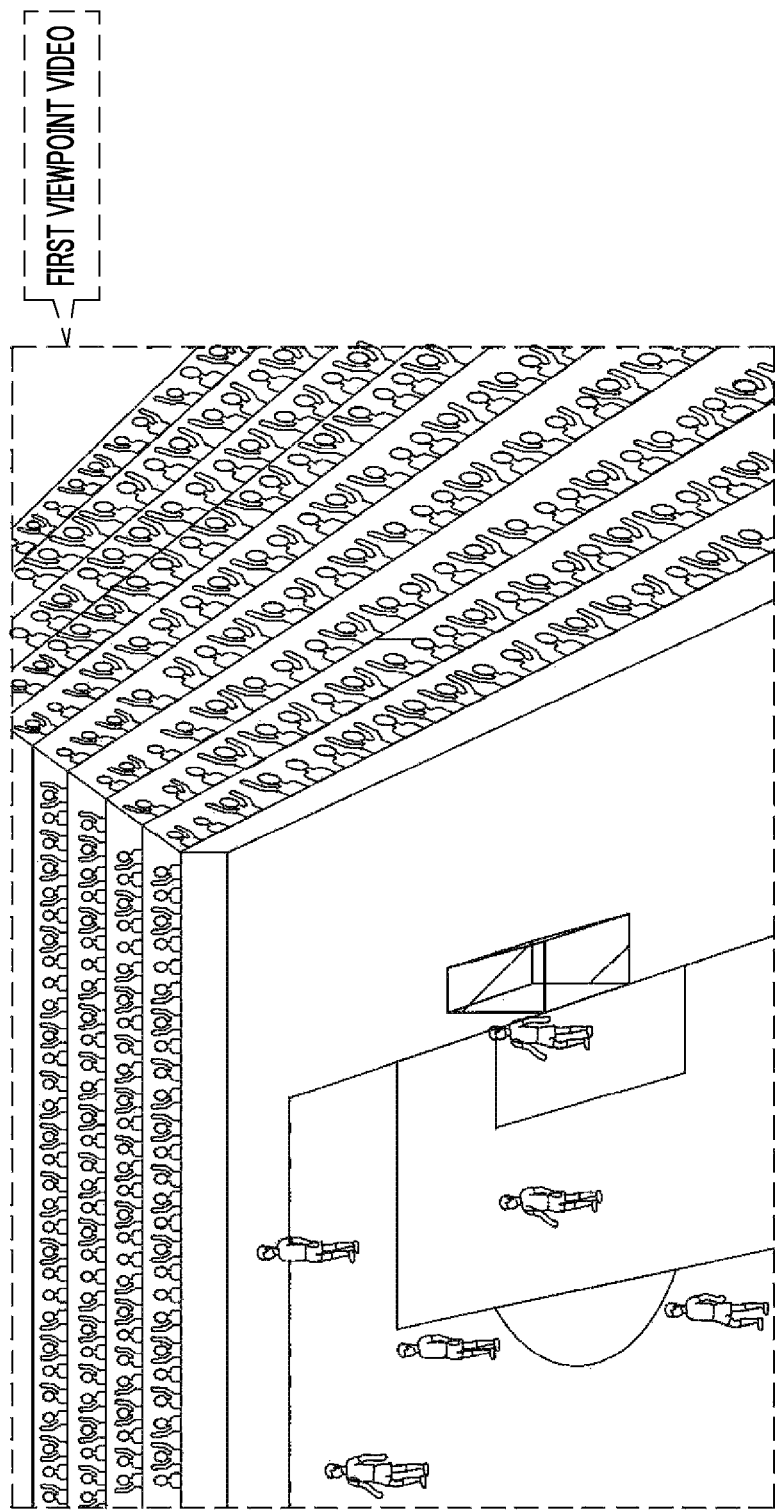
FIG. 29 is a conceptual diagram showing an example of an aspect in which the first avatar is hidden from the first avatar-containing viewpoint video shown in FIG. 28.

An example of changing the display aspect of the first avatar includes hiding the first avatar. That is, in a case in which the ratio of the size of the first avatar to the size of the first viewpoint video is equal to or more than the first predetermined value, the first display aspect changing unit 58B6 deletes the first avatar from the first avatar-containing viewpoint video to change the display aspect of the first avatar-containing viewpoint video. For example, as shown in FIG. 28, in a case in which the ratio of the size of the first avatar to the size of the first viewpoint video is equal to or more than the first predetermined value in the first avatar-containing viewpoint video, for example, the first avatar is deleted from the first avatar-containing viewpoint video as shown in FIG. 29. As a result, the display 154 of the first HMD 34A displays, for example, the first viewpoint video shown in FIG. 29, that is, the first viewpoint video in a state in which the first avatar is hidden.

Figure 30:
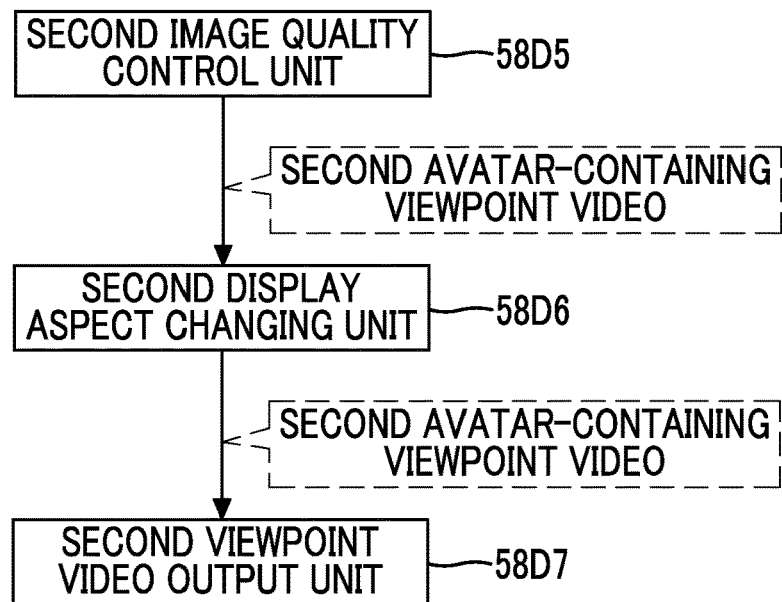
FIG. 30 is a block diagram showing an example of a relationship between the second image quality control unit, a second display aspect changing unit, and the second viewpoint video output unit according to the embodiment.

For example, as shown in FIG. 30, the second image quality control unit 58D5 outputs the second avatar-containing viewpoint video to the second display aspect changing unit 58D6. The second display aspect changing unit 58D6 changes the display aspect of the second avatar depending on the relationship between the size of the second viewpoint video and the size of the second avatar for the second avatar-containing viewpoint video input from the second image quality control unit 58D5.

The second display aspect changing unit 58D6 determines whether or not the ratio of the size of the second avatar to the size of the second viewpoint video is equal to or more than the second predetermined value. In a case in which the ratio of the size of the second avatar to the size of the second viewpoint video is less than the second predetermined value, the second display aspect changing unit 58D6 transmits the second avatar-containing viewpoint video input from the second image quality control unit 58D5 to the second viewpoint video output unit 58D7 as it is. In a case in which the ratio of the size of the second avatar to the size of the second viewpoint video is equal to or more than the second predetermined value, the second display aspect changing unit 58D6 changes the display aspect of the second avatar. Then, the second display aspect changing unit 58D6 outputs the second avatar-containing viewpoint video obtained by changing the display aspect to the second viewpoint video output unit 58D7.

The second predetermined value may be the same value as or a different value from the first predetermined value. In addition, the second predetermined value may be a fixed value or a variable value as in the first predetermined value.

An example of changing the display aspect of the second avatar includes hiding the second avatar. That is, in a case in which the ratio of the size of the second avatar to the size of the second viewpoint video is equal to or more than the second predetermined value, the second display aspect changing unit 58D6 deletes the second avatar from the second avatar-containing viewpoint video to change the display aspect of the second avatar-containing viewpoint video. That is, in a case in which the ratio of the size of the second avatar to the size of the second viewpoint video is equal to or more than the second predetermined value in the second avatar-containing viewpoint video, the second avatar is deleted from the second avatar-containing viewpoint video. As a result, the display 204 of the second HMD 34B displays the second viewpoint video in a state in which the second avatar is hidden.

Figure 31:
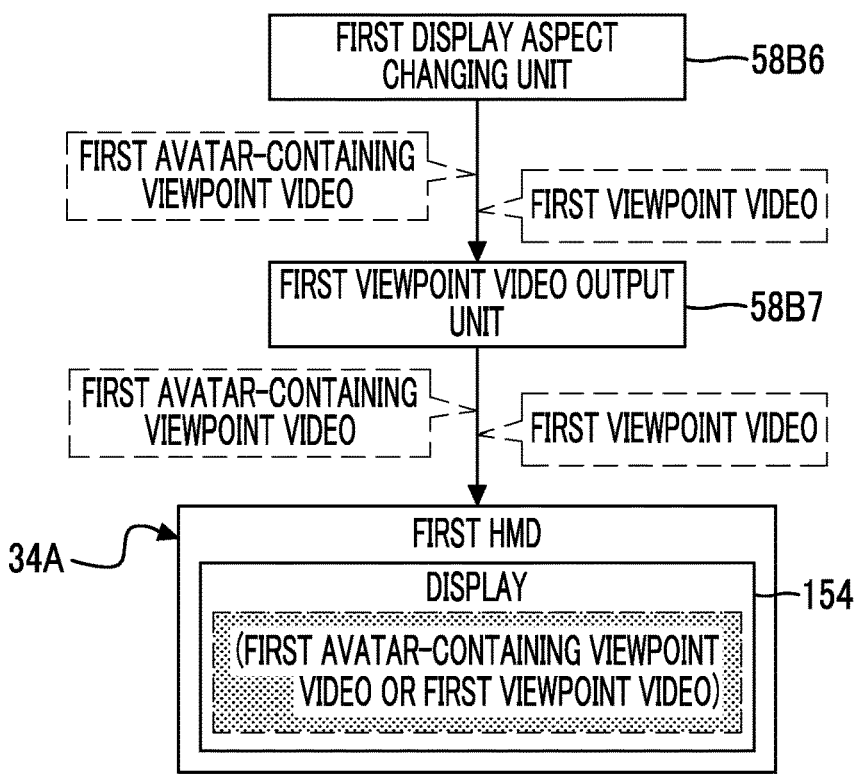
FIG. 31 is a block diagram showing an example of a relationship between the first display aspect changing unit, the first viewpoint video output unit, and the first HMD according to the embodiment.

For example, as shown in FIG. 31, the first avatar-containing viewpoint video or the first viewpoint video is input from the first display aspect changing unit 58B6 to the first viewpoint video output unit 58B7. In a case in which the first avatar-containing viewpoint video is input from the first display aspect changing unit 58B6, the first viewpoint video output unit 58B7 outputs the input first avatar-containing viewpoint video to the first HMD 34A. The first viewpoint video output unit 58B7 outputs the first avatar-containing viewpoint video to the first HMD 34A, and thus the first avatar-containing viewpoint video is displayed on the display 154 of the first HMD 34A.

In a case in which the first viewpoint video is input from the first display aspect changing unit 58B6, the first viewpoint video output unit 58B7 outputs the input first viewpoint video to the first HMD 34A. The first viewpoint video output unit 58B7 outputs the first viewpoint video to the first HMD 34A, and thus the first viewpoint video is displayed on the display 154 of the first HMD 34A.

Figure 32:
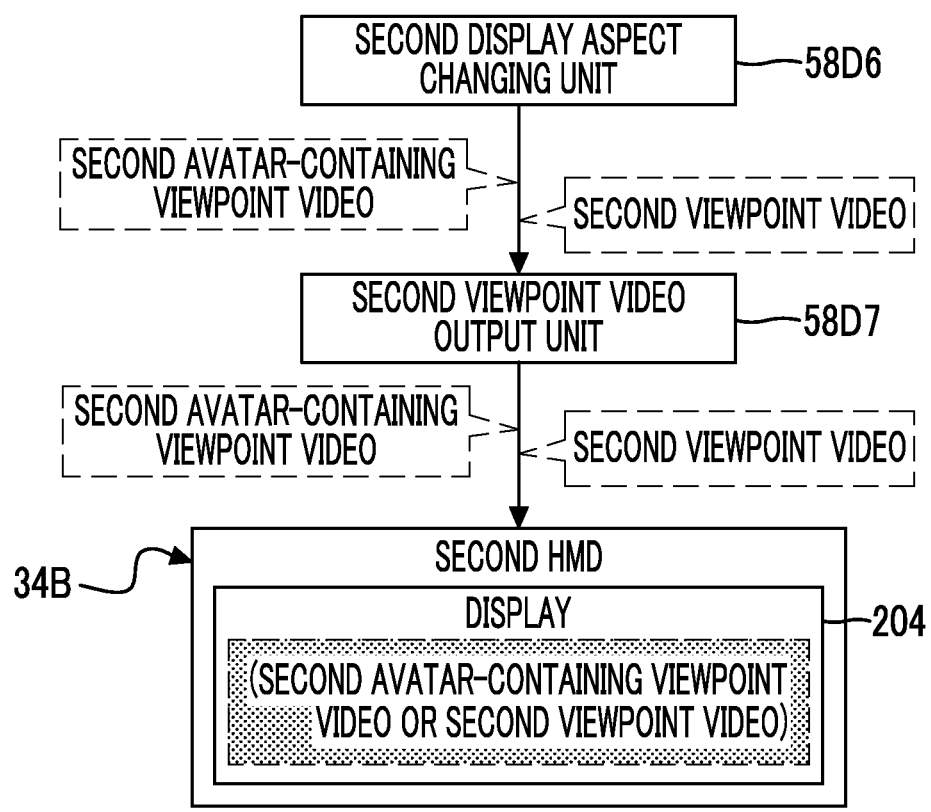
FIG. 32 is a block diagram showing an example of a relationship between the second display aspect changing unit, the second viewpoint video output unit, and the second HMD according to the embodiment.

For example, as shown in FIG. 32, the second avatar-containing viewpoint video or the second viewpoint video is input from the second display aspect changing unit 58D6 to the second viewpoint video output unit 58D7. In a case in which the second avatar-containing viewpoint video is input from the second display aspect changing unit 58D6, the second viewpoint video output unit 58D7 outputs the input second avatar-containing viewpoint video to the second HMD 34B. The second viewpoint video output unit 58D7 outputs the second avatar-containing viewpoint video to the second HMD 34B, and thus the second avatar-containing viewpoint video is displayed on the display 204 of the second HMD 34B.

In a case in which the second viewpoint video is input from the second display aspect changing unit 58D6, the second viewpoint video output unit 58D7 outputs the input second viewpoint video to the second HMD 34B. The second viewpoint video output unit 58D7 outputs the second viewpoint video to the second HMD 34B, and thus the second viewpoint video is displayed on the display 204 of the second HMD 34B.

Figure 33:
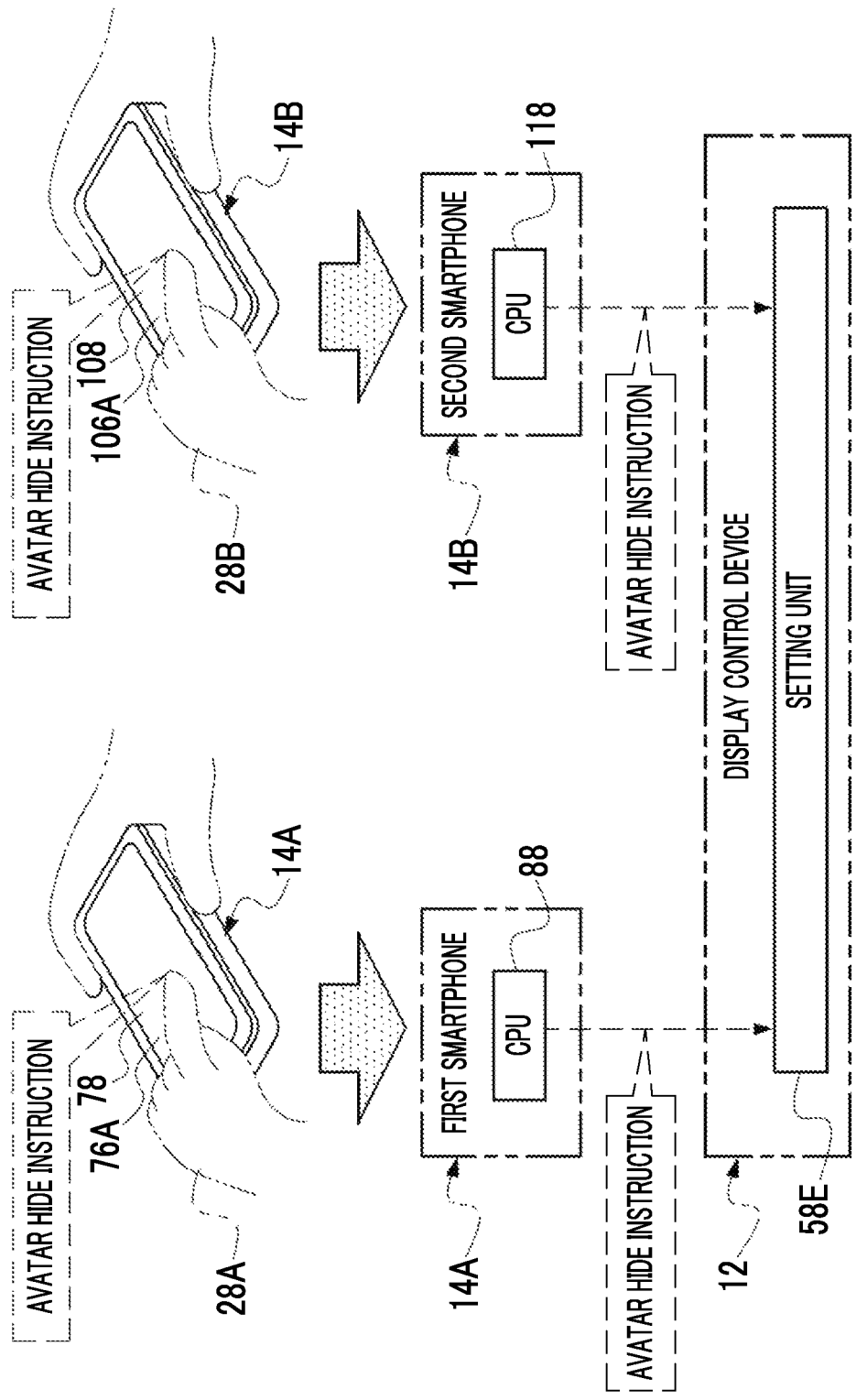
FIG. 33 is a conceptual diagram showing an example of an aspect in which an avatar hide instruction is transmitted from the first smartphone according to the embodiment to a setting unit of the display control device, and an avatar hide instruction is transmitted from the second smartphone according to the embodiment to the setting unit of the display control device.

For example, as shown in FIG. 33, the viewer 28A gives an avatar hide instruction for instructing the first smartphone 14A to hide the avatar. The avatar hide instruction is received by the touch panel 76A of the first smartphone 14A. The first smartphone 14A transmits the avatar hide instruction received by the touch panel 76A to the setting unit 58E of the display control device 12.

On the other hand, the viewer 28B gives the avatar hide instruction to the second smartphone 14B. The avatar hide instruction is received by the touch panel 106A of the second smartphone 14B. The second smartphone 14B transmits the avatar hide instruction received by the touch panel 106A to the setting unit 58E of the display control device 12.

The setting unit 58E performs setting for hiding the second avatar in a case in which the avatar hide instruction transmitted from the second smartphone 14B is received. In addition, the setting unit 58E performs setting for hiding the first avatar in a case in which the avatar hide instruction transmitted from the first smartphone 14A is received. Note that the setting unit 58E is an example of a "first setting unit" and a "second setting unit" according to the technology of the present disclosure.

Figure 34:
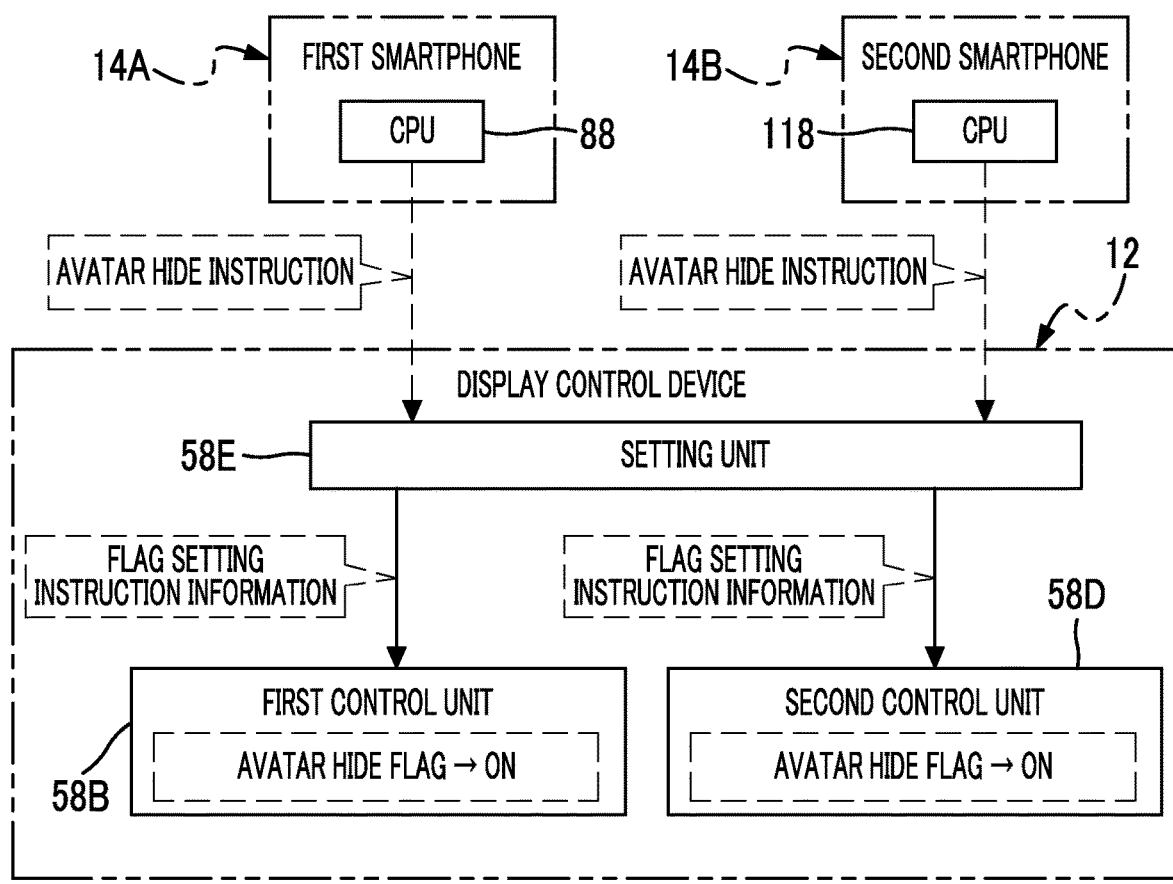
FIG. 34 is a block diagram provided for describing an example of a process content of the setting unit according to the embodiment.

As shown in FIG. 34 For example, in a case in which the avatar hide instruction transmitted from the first smartphone 14A is received, the setting unit 58E outputs flag setting instruction information for giving an instruction for turning an avatar hide flag on to the first control unit 58B. Here, the avatar hide flag refers to a flag for giving an instruction for hiding the avatar. In a case in which the avatar hide instruction transmitted from the second smartphone 14B is received, the setting unit 58E outputs the flag setting instruction information to the second control unit 58D. Note that the reception of the avatar hide instruction transmitted from the first smartphone 14A by the setting unit 58E is an example of a "second predetermined condition" according to the technology of the present disclosure, and the reception of the avatar hide instruction transmitted from the second smartphone 14B by the setting unit 58E is an example of a "first predetermined condition" according to the technology of the present disclosure.

Here, as an example of the "second predetermined condition" according to the technology of the present disclosure, the reception of the avatar hide instruction transmitted from the first smartphone 14A by the setting unit 58E is described as an example, but the technology of the present disclosure is not limited to this. For example, the setting for hiding the first avatar may be performed on a condition that the avatar hide instruction received by another reception device, such as the reception device 152 of the first HMD 34A is transmitted to the display control device 12 and the avatar hide instruction is received by the setting unit 58E of the display control device 12.

In addition, here, as an example of the "first predetermined condition" according to the technology of the present disclosure, the reception of the avatar hide instruction transmitted from the second smartphone 14B by the setting unit 58E is described as an example, but the technology of the present disclosure is not limited to this. For example, the setting for hiding the second avatar may be performed on a condition that the avatar hide instruction received by another reception device, such as the reception device 202 of the second HMD 34B is transmitted to the display control device 12 and the avatar hide instruction is received by the setting unit 58E of the display control device 12.

The first control unit 58B turns on the avatar hide flag in a case in which the flag setting instruction information is input from the setting unit 58E. In a case in which the avatar hide flag is turned on in the first control unit 58B, the first avatar-containing viewpoint video is not generated, and the first viewpoint video output unit 58B7 outputs the first viewpoint video to the first HMD 34A.

The second control unit 58D turns on the avatar hide flag in a case in which the flag setting instruction information is input from the setting unit 58E. In a case in which the avatar hide flag is turned on in the second control unit 58D, the second avatar-containing viewpoint video is not generated, and the second viewpoint video output unit 58D7 outputs the second viewpoint video to the second HMD 34B.

Next, an operation of the information processing system 10 will be described.

First, an example of a flow of the first display control process executed by the CPU 58 of the display control device 12 according to the first display control program 60A will be described with reference to FIGS. 35 to 37. Note that, here, the description will be made on the premise that the plurality of viewpoint videos are generated by executing the viewpoint video generation process by the CPU 58, and the viewpoint video identifier, the peculiar viewpoint position information, the peculiar visual line direction information, and the peculiar angle-of-view information are associated with each viewpoint video. In addition, here, the description will be made on the premise that the first viewpoint visual line instruction is transmitted from the first smartphone 14A to the display control device 12.

Figure 35:
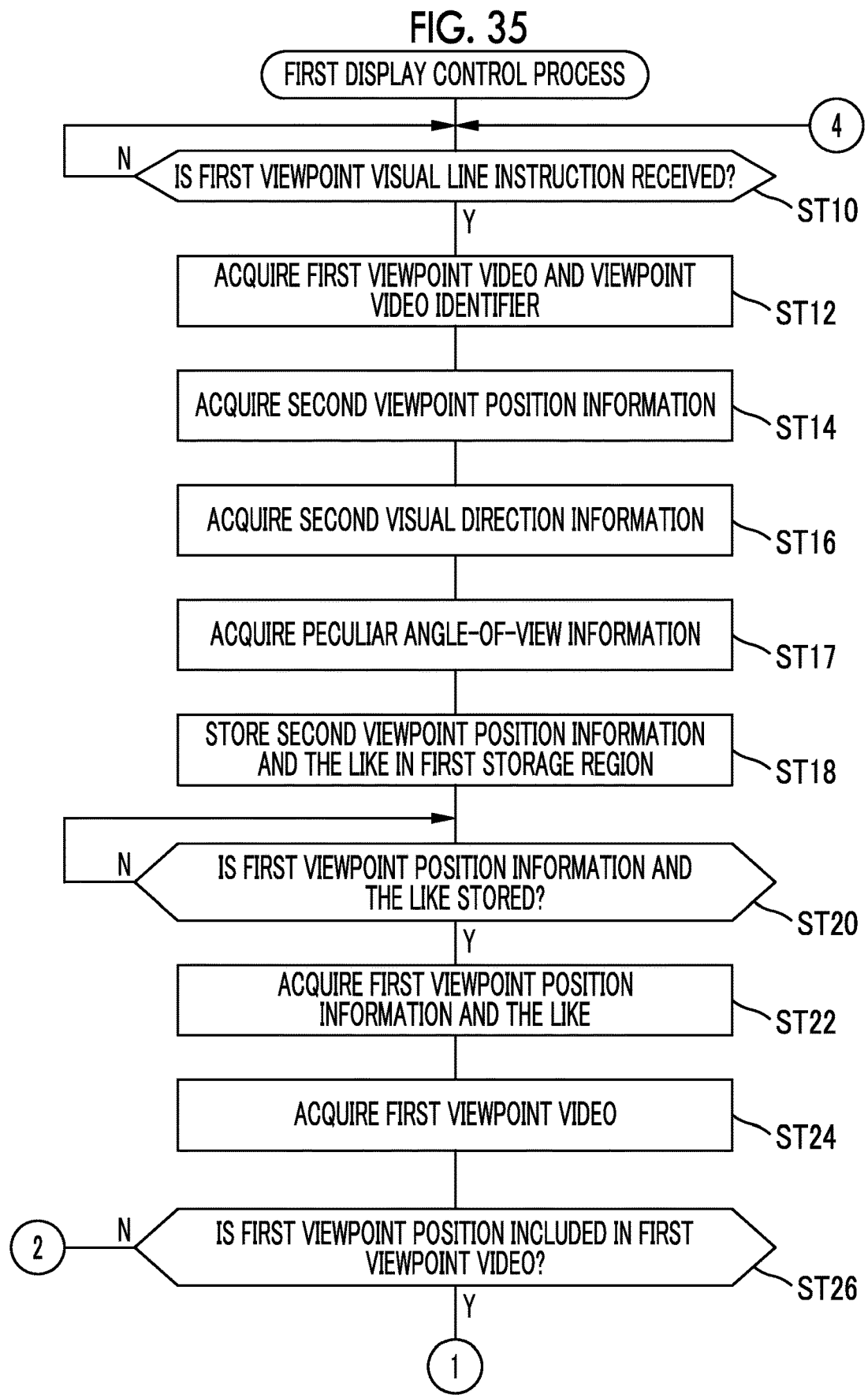
FIG. 35 is a flowchart showing an example of a flow of a first display control process according to the embodiment.

In the first display control process shown in FIG. 35, first, in step ST10, the first viewpoint video acquisition unit 58B1 determines whether or not the first viewpoint visual line instruction transmitted from the first smartphone 14A is received. In a case in which the first viewpoint visual line instruction transmitted from the first smartphone 14A is not received in step ST10, a negative determination is made, and the determination in step ST10 is made again. In a case in which the first viewpoint visual line instruction transmitted from the first smartphone 14A is received in step ST10, a positive determination is made, and the first display control process proceeds to step ST12.

In step ST12, the first viewpoint video acquisition unit 58B1 acquires the viewpoint video 46 associated with the peculiar viewpoint position information and the peculiar visual line direction information corresponding to the first viewpoint visual line instruction as the first viewpoint video, and acquires the first viewpoint video identifier associated with the first viewpoint video.

Subsequently, in step ST14, the first acquisition unit 58A acquires the peculiar viewpoint position information associated with the viewpoint video 46 specified from the viewpoint video identifier acquired in step ST12 as the second viewpoint position information, and then the first display control process proceeds to step ST16.

In step ST16, the first acquisition unit 58A acquires the peculiar visual line direction information associated with the viewpoint video 46 specified from the viewpoint video identifier acquired in step ST12 as the second visual line direction information, and then the first display control process proceeds to step ST17.

In step ST17, the first acquisition unit 58A acquires the peculiar angle-of-view information associated with the viewpoint video 46 specified from the viewpoint video identifier acquired in step ST12, and then the first display control process proceeds to step ST18.

In step ST18, the first acquisition unit 58A stores the second viewpoint position information and the like in the first storage region 62A, and then the first display control process proceeds to step ST20. Here, the second viewpoint position information and the like refer to the viewpoint video identifier acquired in step ST12, the second viewpoint position information acquired in step ST14, the second visual line direction information acquired in step ST16, and the peculiar angle-of-view information acquired in step ST17.

In step ST20, the first acquisition unit 58A determines whether or not the first viewpoint position information and the like are stored in the second storage region 62B. Here, the first viewpoint position information and the like refer to the viewpoint video identifier, the first viewpoint position information, the first visual line direction information, and the peculiar angle-of-view information. In step ST20, in a case in which the first viewpoint position information and the like are not stored in the second storage region 62B, a negative determination is made, and the determination in step ST20 is made again. In step ST20, in a case in which the first viewpoint position information and the like are stored in the second storage region 62B, a positive determination is made, and the first display control process proceeds to step ST22.

In step ST22, the first acquisition unit 58A acquires the first viewpoint position information and the like from the second storage region 62B, and then the first display control process proceeds to step ST24.

In step ST24, the first determination unit 58B2 acquires the first viewpoint video from the first viewpoint video acquisition unit 58B1, and then the first display control process proceeds to step ST26.

In step ST26, the first determination unit 58B2 determines whether or not the first viewpoint position indicated by the first viewpoint position information acquired in step ST22 is included in the first viewpoint video acquired in step ST24.

Figure 36:
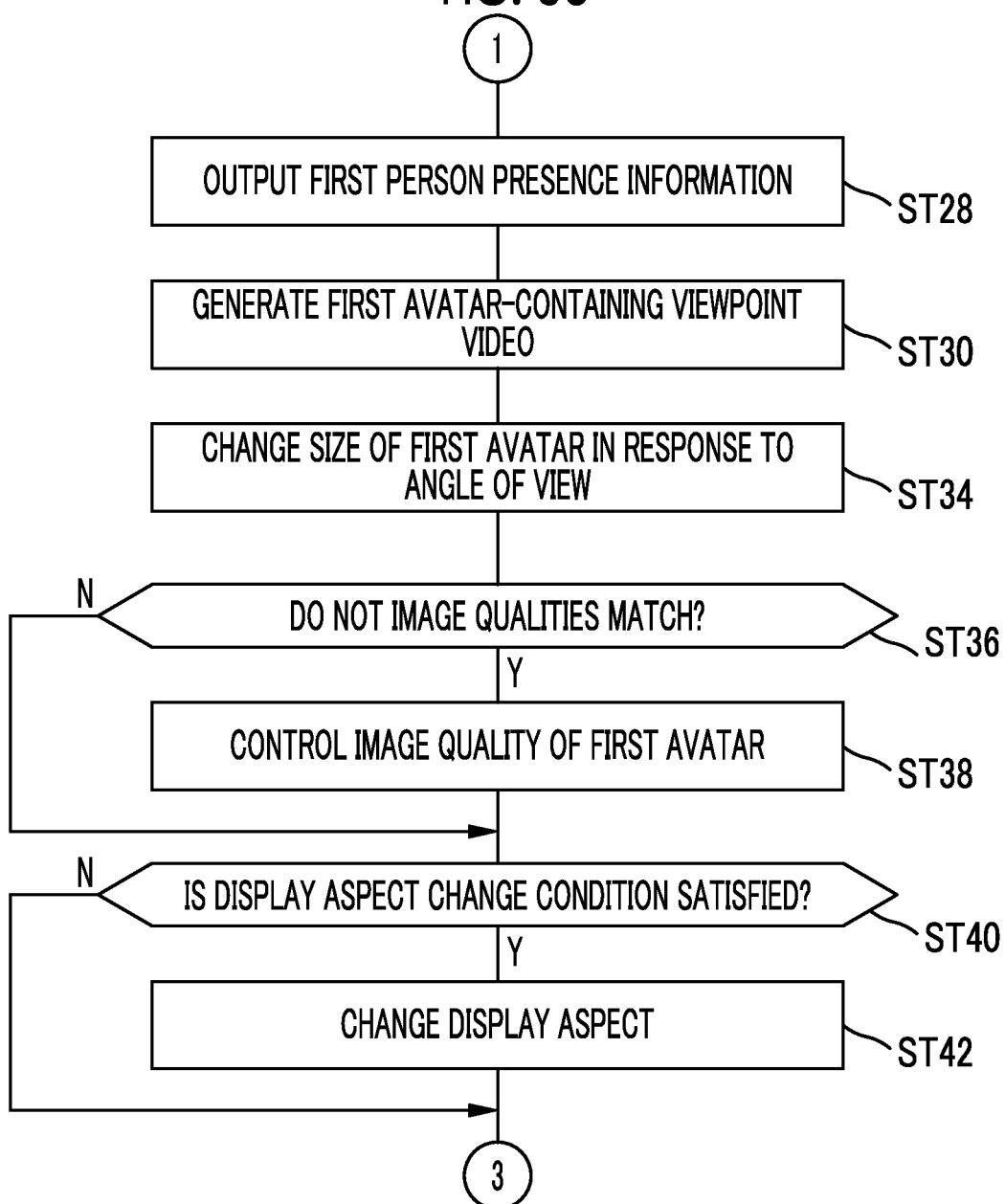
FIG. 36 is a continuation of the flowchart shown in FIG. 35.
Figure 37:
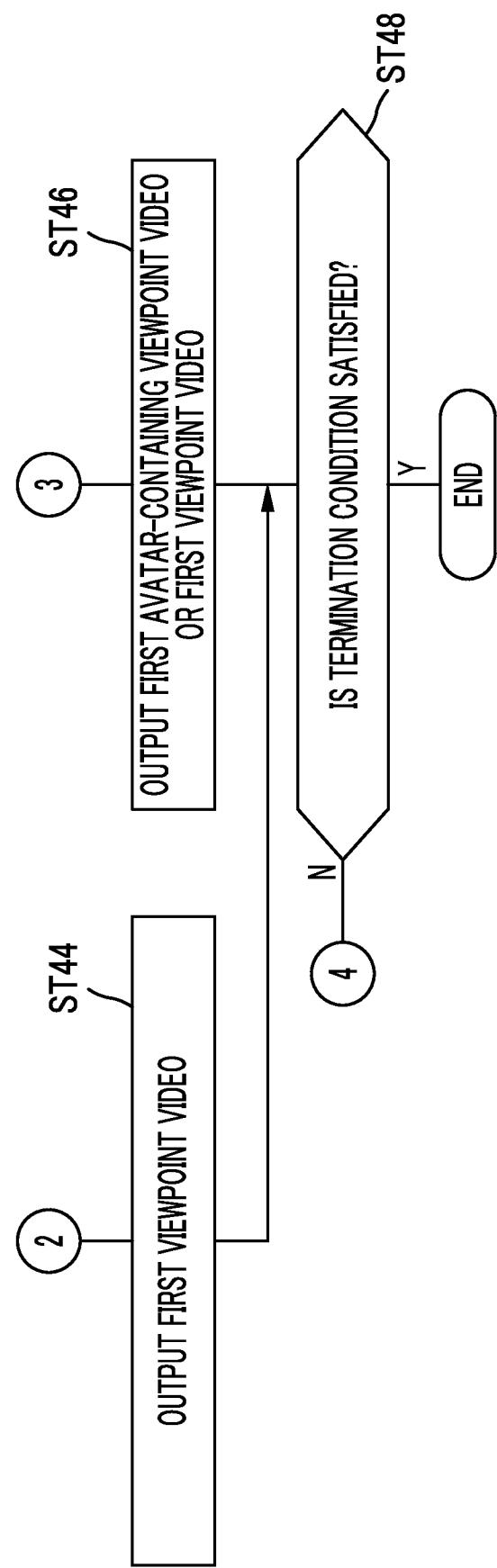
FIG. 37 is a continuation of the flowchart shown in FIGS. 35 and 36.

In step ST26, in a case in which the first viewpoint position is not included in the first viewpoint video, a negative determination is made, and the process proceeds to step ST44 shown in FIG. 37. In step ST26, in a case in which the first viewpoint position is included in the first viewpoint video, a positive determination is made, and the first display control process proceeds to step ST28 shown in FIG. 36.

In step ST28 shown in FIG. 36, the first determination unit 58B2 outputs the first person presence information to the first composing unit 58B3, and then the first display control process proceeds to step ST30.

In step ST30, the first composing unit 58B3 causes the first acquisition unit 58A to acquire the first viewpoint position information and the first visual line direction information from the second storage region 62B. In addition, the first composing unit 58B3 acquires the first reference avatar group from the storage 60. In addition, the first composing unit 58B3 acquires the first viewpoint video from the first viewpoint video acquisition unit 58B1. Then, the first composing unit 58B3 generates the first avatar by using the first visual line direction information and the first reference avatar group. The first composing unit 58B3 specifies the first viewpoint position indicated by the first viewpoint position information from the first viewpoint video and superimposes the first avatar on the first viewpoint video at the specified first viewpoint position to generate the first avatar-containing viewpoint video, and then the first display control process proceeds to step ST34.

In step ST34, the first avatar display size changing unit 58B4 changes the size of the first avatar in the first avatar-containing viewpoint video to the size depending on the angle of view indicated by the peculiar angle-of-view information according to the size derivation table for the avatar in the storage 60, and then the first display control process proceeds to step ST36.

In step ST36, the first image quality control unit 58B5 determines whether or not the image quality of the first avatar in the first avatar-containing viewpoint video in which the size of the first avatar is changed to the size depending on the angle of view in step ST34 does not match with the image quality of the first viewpoint video. Here, "not match" refers to the fact that the degree of difference between the image quality of the first viewpoint video and the image quality of the first avatar is outside the first predetermined range. In step ST36, in a case in which the image quality of the first avatar matches with the image quality of the first viewpoint video, a negative determination is made, and the first display control process proceeds to step ST40. In step ST36, in a case in which the image quality of the first avatar does not match with the image quality of the first viewpoint video, a positive determination is made, and the first display control process proceeds to step ST38.

In step ST38, the first image quality control unit 58B5 controls the image quality of the first avatar-containing viewpoint video such that the degree of difference between the image quality of the first viewpoint video and the image quality of the first avatar is within the first predetermined range in the first avatar-containing viewpoint video, and then the first display control process proceeds to step ST40.

In step ST40, the first display aspect changing unit 58B6 determines whether or not a condition of changing the display aspect of the first avatar included in the first avatar-containing viewpoint video obtained by controlling the image quality of the first avatar by the first image quality control unit 58B5 (first display aspect change condition) is satisfied. Here, the first display aspect change condition refers to, for example, a condition that, for the first avatar-containing viewpoint video obtained by controlling the image quality of the first avatar by the first image quality control unit 58B5, the ratio of the first avatar to the size of the whole first avatar-containing viewpoint video, that is, the size of the first viewpoint video is equal to or more than the first predetermined value.

In a case in which the first display aspect change condition is not satisfied in step ST40, a negative determination is made, and the first display control process proceeds to step ST46 shown in FIG. 37. In a case in which the first display aspect change condition is satisfied in step ST40, a positive determination is made, and the first display control process proceeds to step ST42.

In step ST42, the first display aspect changing unit 58B6 changes the display aspect of the first avatar-containing viewpoint video by deleting the first avatar from the first avatar-containing viewpoint video. By deleting the first avatar from the first avatar-containing viewpoint video, the first avatar-containing viewpoint video is changed to the first viewpoint video. In a case in which the execution of the process of step ST42 is terminated, the first display control process proceeds to step ST46 shown in FIG. 37.

In step ST44 shown in FIG. 37, the first viewpoint video output unit 58B7 outputs the first viewpoint video to the first HMD 34A. The first HMD 34A causes the display 154 to display the first viewpoint video input from the first viewpoint video output unit 58B7. In a case in which the execution of the process of step ST44 is terminated, the first display control process proceeds to step ST48.

In step ST46 shown in FIG. 37, the first viewpoint video output unit 58B7 outputs the first avatar-containing viewpoint video or the first viewpoint video to the first HMD 34A. That is, the first viewpoint video output unit 58B7 outputs the first avatar-containing viewpoint video to the first HMD 34A in a case in which a negative determination is made in step ST40, and outputs the first viewpoint video to the first HMD 34A in a case in which a positive determination is made in step ST40. The first HMD 34A causes the display 154 to display the first viewpoint video input from the first viewpoint video output unit 58B7, and causes the display 154 to display the first avatar-containing viewpoint video input from the first viewpoint video output unit 58B7. In a case in which the execution of the process of step ST46 is terminated, the first display control process proceeds to step ST48.

In step ST48, the CPU 58 determines whether or not a condition for terminating the first display control process (first display control process termination condition) is satisfied. Examples of the first display control process termination condition include a condition that an instruction for terminating the first display control process is received by the reception device 52, 76, 106, 152 or 202.

In a case in which the first display control process termination condition is not satisfied in step ST48, a negative determination is made, and the first display control process proceeds to step ST10 shown in FIG. 35. In a case in which the first display control process termination condition is satisfied in step ST48, a positive determination is made, and the first display control process is terminated.

Next, an example of a flow of the second display control process executed by the CPU 58 of the display control device 12 according to the second display control program 60B will be described with reference to FIGS. 38 to 40. Note that, here, the description will be made on the premise that the plurality of viewpoint videos are generated by executing the viewpoint video generation process by the CPU 58, and the viewpoint video identifier, the peculiar viewpoint position information, the peculiar visual line direction information, and the peculiar angle-of-view information are associated with each viewpoint video. In addition, here, the description will be made on the premise that the second viewpoint visual line instruction is transmitted from the second smartphone 14B to the display control device 12.

Figure 38:
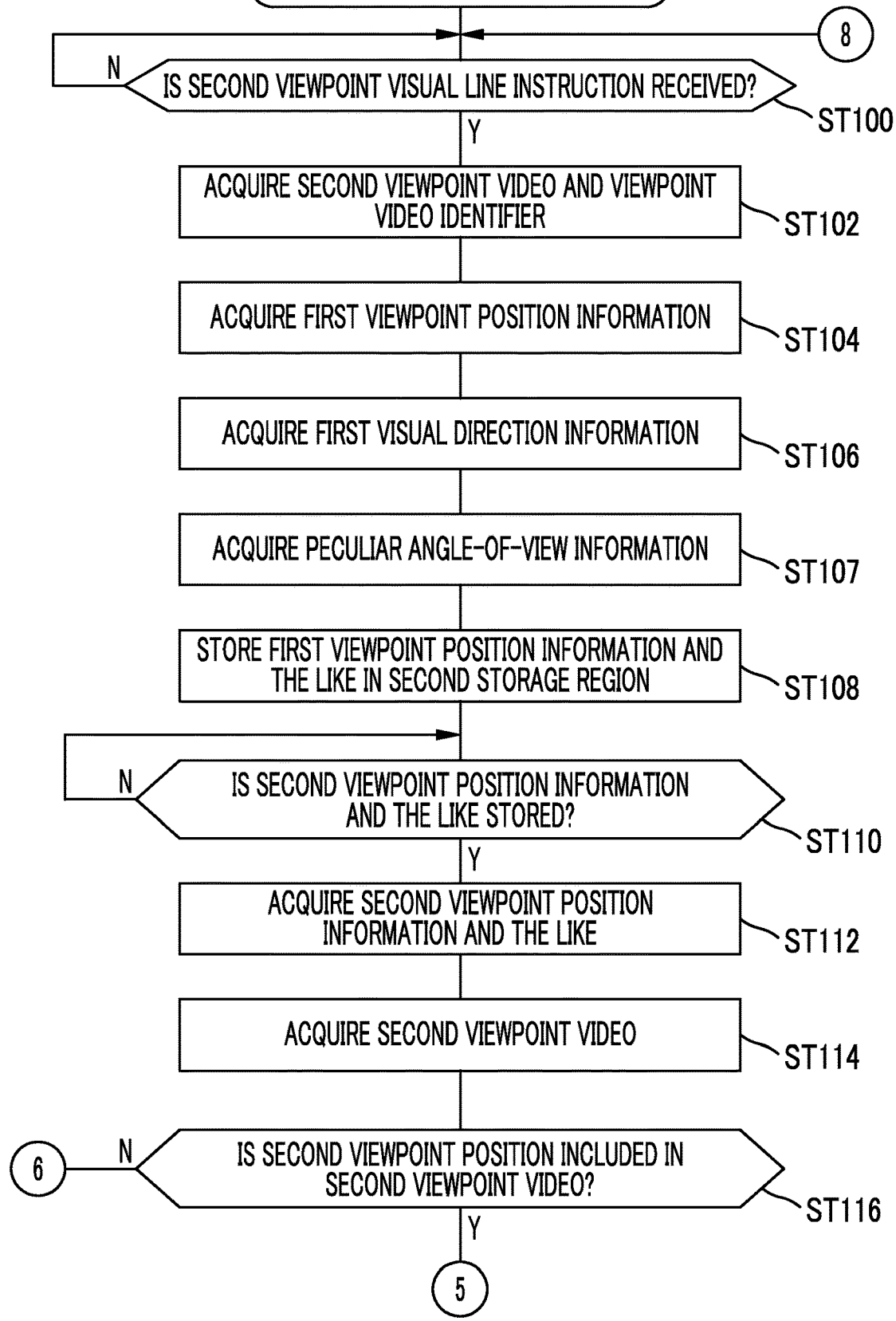
FIG. 38 is a flowchart showing an example of a flow of a second display control process according to the embodiment.

In the second display control process shown in FIG. 38, first, in step ST100, the second viewpoint video acquisition unit 58D1 determines whether or not the second viewpoint visual line instruction transmitted from the second smartphone 14B is received. In a case in which the second viewpoint visual line instruction transmitted from the second smartphone 14B is not received in step ST100, a negative determination is made, and the determination in step ST100 is made again. In a case in which the second viewpoint visual line instruction transmitted from the second smartphone 14B is received in step ST100, a positive determination is made, and the second display control process proceeds to step ST102.

In step ST102, the second viewpoint video acquisition unit 58D1 acquires the viewpoint video 46 associated with the peculiar viewpoint position information and the peculiar visual line direction information corresponding to the second viewpoint visual line instruction as the second viewpoint video, and acquires the second viewpoint video identifier associated with the second viewpoint video.

Subsequently, in step ST104, the second acquisition unit 58C acquires the peculiar viewpoint position information associated with the viewpoint video 46 specified from the viewpoint video identifier acquired in step ST102 as the first viewpoint position information, and then the second display control process proceeds to step ST106.

In step ST106, the second acquisition unit 58C acquires the peculiar visual line direction information associated with the viewpoint video 46 specified from the viewpoint video identifier acquired in step ST102 as the first visual line direction information, and then the second display control process proceeds to step ST107.

In step ST107, the second acquisition unit 58C acquires the peculiar angle-of-view information associated with the viewpoint video 46 specified from the viewpoint video identifier acquired in step ST102, and then the second display control process proceeds to step ST108.

In step ST108, the second acquisition unit 58C stores the first viewpoint position information and the like in the second storage region 62B, and then the second display control process proceeds to step ST110. Here, the first viewpoint position information and the like refer to the viewpoint video identifier acquired in step ST102, the first viewpoint position information acquired in step ST104, the first visual line direction information acquired in step ST106, and the peculiar angle-of-view information acquired in step ST107.

In step ST110, the second acquisition unit 58C determines whether or not the second viewpoint position information and the like are stored in the first storage region 62A. Here, the second viewpoint position information and the like refer to the viewpoint video identifier, the second viewpoint position information, the second visual line direction information, and the peculiar angle-of-view information. In step ST110, in a case in which the second viewpoint position information and the like are not stored in the first storage region 62A, a negative determination is made, and the determination in step ST110 is made again. In step ST110, in a case in which the second viewpoint position information and the like are stored in the first storage region 62A, a positive determination is made, and the second display control process proceeds to step ST112.

In step ST112, the second acquisition unit 58C acquires the second viewpoint position information and the like from the first storage region 62A, and then the second display control process proceeds to step ST114.

In step ST114, the second determination unit 58D2 acquires the second viewpoint video from the second viewpoint video acquisition unit 58D1, and then the second display control process proceeds to step ST116.

In step ST116, the second determination unit 58D2 determines whether or not the second viewpoint position indicated by the second viewpoint position information acquired in step ST112 is included in the second viewpoint video acquired in step ST114. In step ST116, in a case in which the second viewpoint position is not included in the second viewpoint video, a negative determination is made, and the second display control process proceeds to step ST134 shown in FIG. 40. In step ST116, in a case in which the second viewpoint position is included in the second viewpoint video, a positive determination is made, and the second display control process proceeds to step ST118 shown in FIG. 39.

Figure 39:
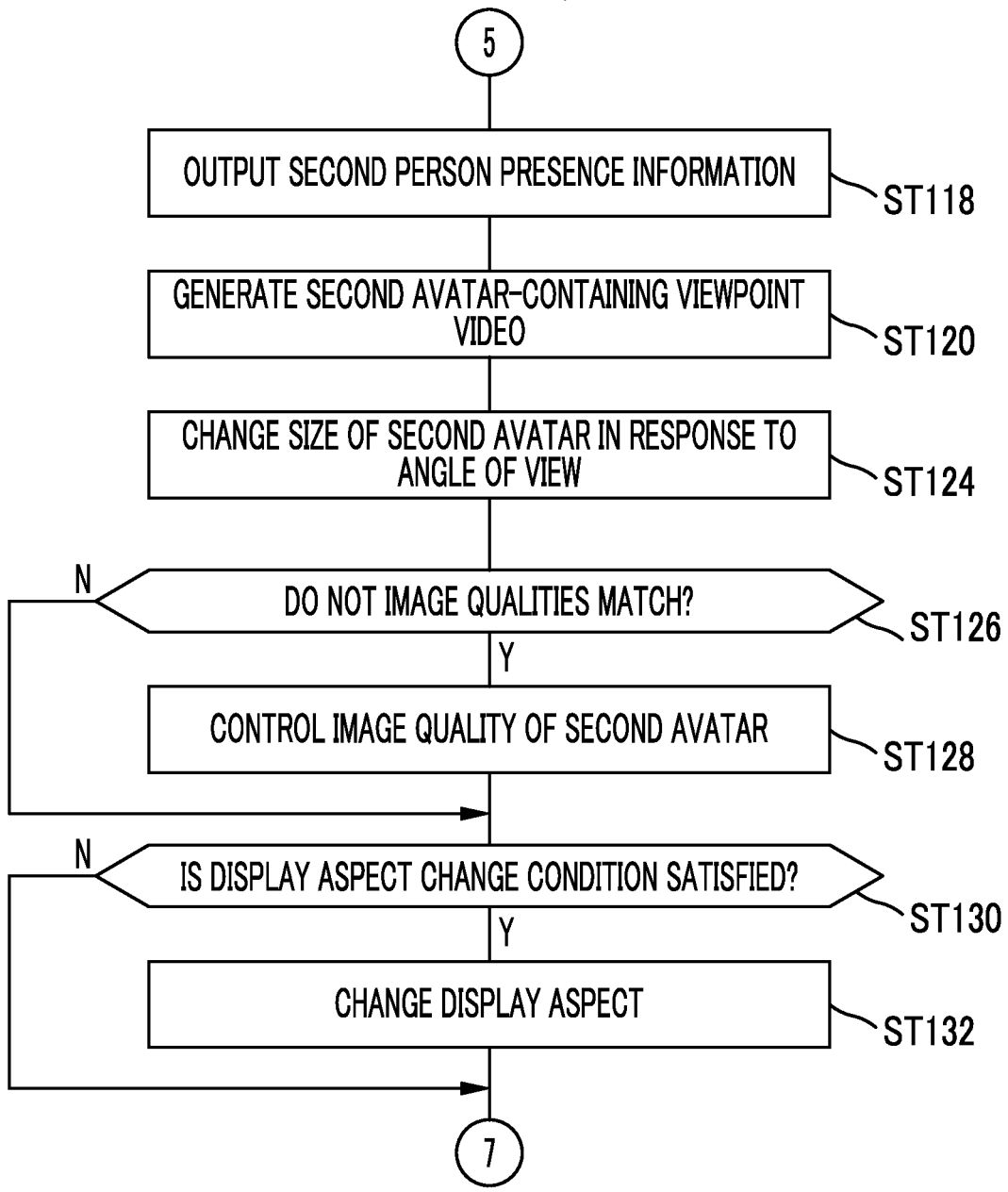
FIG. 39 is a continuation of the flowchart shown in FIG. 38.

In step ST118 shown in FIG. 39, the second determination unit 58D2 outputs the second person presence information to the second composing unit 58D3, and then the second display control process proceeds to step ST120.

In step ST120, the second composing unit 58D3 causes the second acquisition unit 58C to acquire the second viewpoint position information and the second visual line direction information from the first storage region 62A. In addition, the second composing unit 58D3 acquires the second reference avatar group from the storage 60. In addition, the second composing unit 58D3 acquires the second viewpoint video from the second viewpoint video acquisition unit 58D1. Then, the second composing unit 58D3 generates the second avatar by using the second visual line direction information and the second reference avatar group. The second composing unit 58D3 specifies the second viewpoint position indicated by the second viewpoint position information from the second viewpoint video and superimposes the second avatar on the second viewpoint video at the specified second viewpoint position to generate the second avatar-containing viewpoint video, and then the second display control process proceeds to step ST124.

In step ST124, the second avatar display size changing unit 58D4 changes the size of the second avatar in the second avatar-containing viewpoint video to the size depending on the angle of view indicated by the peculiar angle-of-view information according to the size derivation table for the avatar in the storage 60, and then the second display control process proceeds to step ST126.

In step ST126, the second image quality control unit 58D5 determines whether or not the image quality of the second avatar in the second avatar-containing viewpoint video in which the size of the second avatar is changed to the size depending on the angle of view in step ST124 does not match with the image quality of the second viewpoint video. Here, "not match" refers to the fact that the degree of difference between the image quality of the second viewpoint video and the image quality of the second avatar is outside the second predetermined range. In step ST126, in a case in which the image quality of the second avatar matches with the image quality of the second viewpoint video, a negative determination is made, and the second display control process proceeds to step ST130. In step ST126, in a case in which the image quality of the second avatar does not match with the image quality of the second viewpoint video, a positive determination is made, and the second display control process proceeds to step ST128.

In step ST128, the second image quality control unit 58D5 controls the image quality of the second avatar-containing viewpoint video such that the degree of difference between the image quality of the second viewpoint video and the image quality of the second avatar is within the second predetermined range in the second avatar-containing viewpoint video, and then the second display control process proceeds to step ST130.

In step ST130, the second display aspect changing unit 58D6 determines whether or not a condition of changing the display aspect of the second avatar included in the second avatar-containing viewpoint video obtained by controlling the image quality of the second avatar by the second image quality control unit 58D5 (second display aspect change condition) is satisfied. Here, the second display aspect change condition refers to, for example, a condition that, for the second avatar-containing viewpoint video obtained by controlling the image quality of the second avatar by the second image quality control unit 58D5, the ratio of the second avatar to the size of the whole second avatar-containing viewpoint video, that is, the size of the second viewpoint video is equal to or more than the second predetermined value.

Figure 40:
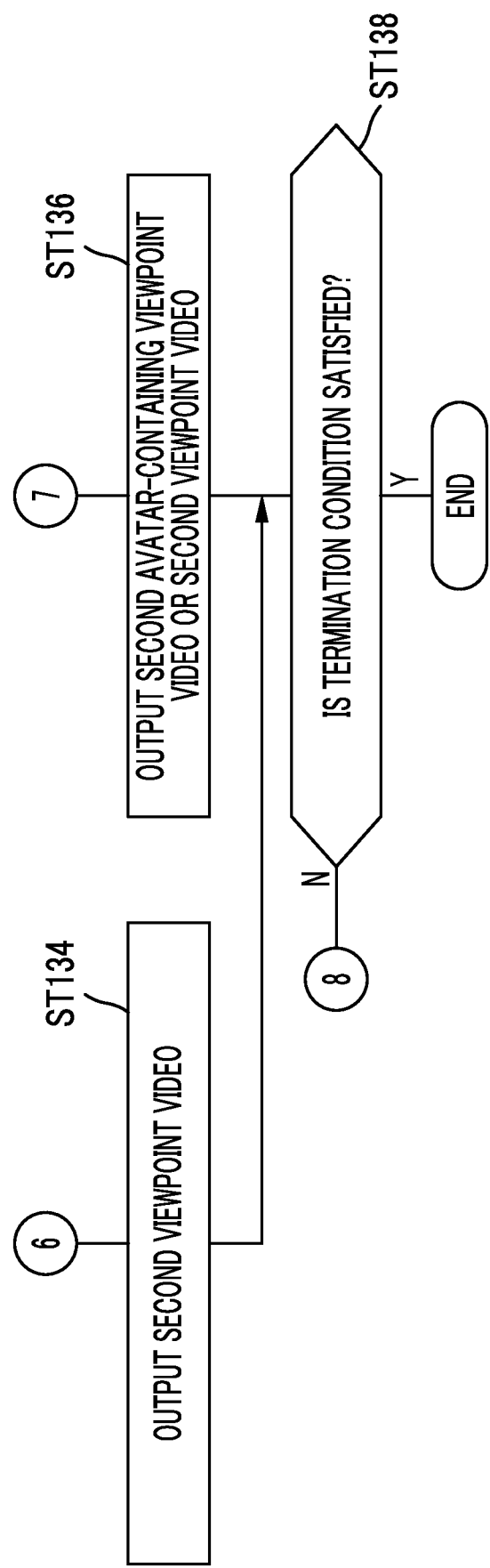
FIG. 40 is a continuation of the flowchart shown in FIGS. 38 and 39.

In a case in which the second display aspect change condition is not satisfied in step ST130, a negative determination is made, and the second display control process proceeds to step ST136 shown in FIG. 40. In a case in which the second display aspect change condition is satisfied in step ST130, a positive determination is made, and the second display control process proceeds to step ST132.

In step ST132, the second display aspect changing unit 58D6 changes the display aspect of the second avatar-containing viewpoint video by deleting the second avatar from the second avatar-containing viewpoint video. By deleting the second avatar from the second avatar-containing viewpoint video, the second avatar-containing viewpoint video is changed to the second viewpoint video. In a case in which the execution of the process of step ST132 is terminated, the second display control process proceeds to step ST136 shown in FIG. 40.

In step ST134 shown in FIG. 40, the second viewpoint video output unit 58D7 outputs the second viewpoint video to the second HMD 34B. The second HMD 34B causes the display 204 to display the second viewpoint video input from the second viewpoint video output unit 58D7. In a case in which the execution of the process of step ST134 is terminated, the second display control process proceeds to step ST138.

In step ST136 shown in FIG. 40, the second viewpoint video output unit 58D7 outputs the second avatar-containing viewpoint video or the second viewpoint video to the second HMD 34B. That is, the second viewpoint video output unit 58D7 outputs the second avatar-containing viewpoint video to the second HMD 34B in a case in which a negative determination is made in step ST130, and outputs the second viewpoint video to the second HMD 34B in a case in which a positive determination is made in step ST130. The second HMD 34B causes the display 204 to display the second viewpoint video input from the second viewpoint video output unit 58D7, and causes the display 204 to display the second avatar-containing viewpoint video input from the second viewpoint video output unit 58D7. In a case in which the execution of the process of step ST136 is terminated, the second display control process proceeds to step ST138.

In step ST138, the CPU 58 determines whether or not a condition for terminating the second display control process (second display control process termination condition) is satisfied. Examples of the second display control process termination condition include a condition that an instruction for terminating the second display control process is received by the reception device 52, 76, 106, 152, or 202.

In a case in which the second display control process termination condition is not satisfied in step ST138, a negative determination is made, and the second display control process proceeds to step ST100 shown in FIG. 38. In a case in which the second display control process termination condition is satisfied in step ST138, a positive determination is made, and the second display control process is terminated.

Next, an example of a flow of the setting process executed by the CPU 58 of the display control device 12 according to the setting program 60C will be described with reference to FIG. 41. Note that, here, the description will be made on the premise that the avatar hide instruction is transmitted from the first smartphone 14A. In addition, the setting process in a case in which the avatar hide instruction is transmitted from the second smartphone 14B is different from the setting process in a case in which the avatar hide instruction is transmitted from the first smartphone 14A only in that the second control unit 58D is operated by the setting unit 58E operating the second control unit 58D. Therefore, the description of the setting process in a case in which the avatar hide instruction is transmitted from the second smartphone 14B will be omitted.

Figure 41:
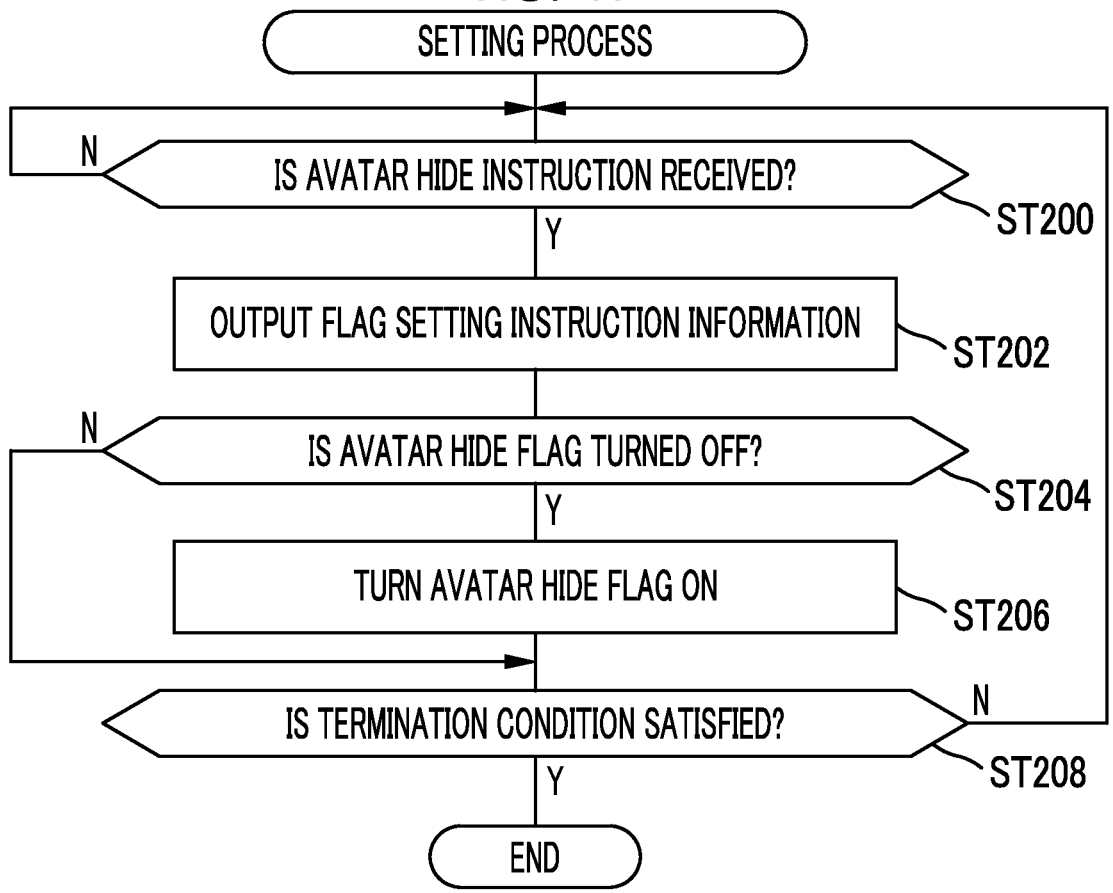
FIG. 41 is a flowchart showing an example of a flow of a setting process according to the embodiment.

In the setting process shown in FIG. 41, first, in step ST200, the setting unit 58E determines whether or not the avatar hide instruction transmitted from the first smartphone 14A is received. In a case in which the avatar hide instruction transmitted from the first smartphone 14A is not received in step ST200, a negative determination is made, and the determination in step ST200 is made again. In a case in which the avatar hide instruction transmitted from the first smartphone 14A is received in step ST200, a positive determination is made, and the setting process proceeds to step ST202.

In step ST202, the setting unit 58E outputs the flag setting instruction information to the first control unit 58B, and then the setting process proceeds to step ST204.

In step ST204, the first control unit 58B determines whether or not the avatar hide flag is turned off. In a case in which the avatar hide flag is turned on in step ST204, a negative determination is made, and the setting process proceeds to step ST208. In a case in which the avatar hide flag is turned off in step ST204, a positive determination is made, and the setting process proceeds to step ST206.

In step ST206, the first control unit 58B changes the avatar hide flag from off to on, and then the setting process proceeds to step ST208. In a case in which the avatar hide flag is turned on, the first avatar-containing viewpoint video is not generated, and the first viewpoint video is displayed on the display 154 of the first HMD 34A.

In step ST208, the setting unit 58E determines whether or not a condition for terminating the setting process (setting process termination condition) is satisfied. Examples of the setting process termination condition include a condition that the instruction for terminating the setting process is received by any one of the reception devices 52, 76, 106, 152, or 202.

In a case in which the setting process termination condition is not satisfied in step ST208, a negative determination is made, and the setting process proceeds to step ST200. In a case in which the setting process termination condition is satisfied in step ST208, a positive determination is made, and the setting process is terminated.

As described above, in the display control device 12, the first avatar for specifying the first viewpoint position is displayed in the first viewpoint video in a case in which the first viewpoint position is included in the first viewpoint video selected from among the plurality of viewpoint videos 46. Then, the size of the first avatar is changed depending on the angle of view of the first viewpoint video, so that the display size of the first avatar is changed depending on the angle of view of the first viewpoint video. Therefore, in a state in which the presence of the viewer 28B can be perceived through the first viewpoint video selected from among the plurality of viewpoint videos 46, a sense of presence of the viewer 28B can be changed depending on the angle of view of the viewpoint video viewed by the viewer 28A.

In addition, the display control device 12 performs a control of setting the degree of difference between the image quality of the first viewpoint video and the image quality of the first avatar within the first predetermined range. Therefore, as compared to a case in which the degree of difference between the image quality of the first viewpoint video and the image quality of the first avatar is outside the first predetermined range, a visual discomfort caused due to the difference of the image quality of the first viewpoint video and the image quality of the first avatar can be reduced.

In addition, in the display control device 12, the display aspect of the first avatar is changed depending on the relationship between the size of the first viewpoint video and the size of the first avatar, that is, the relationship between the display size of the first viewpoint video and the display size of the first avatar. Therefore, as compared to a case in which the display aspect of the first avatar is fixed regardless of the relationship between the display size of the first viewpoint video and the display size of the first avatar, a visual discomfort caused due to the difference of the display size of the first viewpoint video and the display size of the first avatar can be reduced.

In addition, in the display control device 12, the display aspect of the first avatar is changed in a case in which the ratio of the display size of the first avatar to the display size of the first viewpoint video is equal to or more than the first predetermined value. Specifically, the first avatar is hidden. Therefore, as compared to a case in which the display aspect of the first avatar is fixed regardless of whether or not the ratio of the display size of the first avatar to the display size of the first viewpoint video is equal to or more than the first predetermined value, a visual discomfort caused by the presence of the first avatar prohibiting the visual recognition of the first viewpoint video can be reduced.

In addition, in the display control device 12, the first HMD 34A having the display 154 is mounted on the head of the viewer 28A, and the first avatar-containing viewpoint video is displayed on the display 154. Therefore, the first viewpoint video and the first avatar can be visually perceived by the viewer 28A through the first HMD 34A.

In addition, in the display control device 12, the first viewpoint video is selected from among the plurality of viewpoint videos 46 in response to the first viewpoint visual line instruction received by the touch panel 76A of the first smartphone 14A. Therefore, it is possible to provide the viewpoint video from among the plurality of viewpoint videos 46, which is intended by the viewer 28A, to the viewer 28A.

In addition, in the display control device 12, the first visual line direction information is acquired by the first acquisition unit 58A. Then, the avatar for specifying the first visual line direction indicated by the first visual line direction information acquired by the first acquisition unit 58A is generated as the first avatar. Therefore, the visual line direction of the viewer 28B can be perceived by the viewer 28A through the first viewpoint video selected from among the plurality of viewpoint videos 46.

In addition, in the display control device 12, each of the plurality of viewpoint videos 46 has the peculiar viewpoint position information. In addition, each of the plurality of viewpoint videos 46 is the video showing the imaging region observed from the viewpoint position indicated by the corresponding peculiar viewpoint position information. Then, the peculiar viewpoint position information of any one of the plurality of viewpoint videos 46 is acquired by the first acquisition unit 58A as the first viewpoint position information. Therefore, as compared to a case in which the viewpoint position of the viewer 28A is determined independently of the viewpoint video 46, the viewpoint position having a strong association with the viewpoint video 46 can be determined as the viewpoint position of the viewer 28A.

In addition, in the display control device 12, the peculiar viewpoint position information corresponding to the second viewpoint video displayed on the display 204 of the second HMD 34B is acquired by the first acquisition unit 58A as the first viewpoint position information. Therefore, as compared to a case in which the viewpoint position of the viewer 28A is determined independently of the second viewpoint video displayed on the display 204 of the second HMD 34B, the viewpoint position having a strong association with the second viewpoint video displayed on the display 204 of the second HMD 34B can be determined as the viewpoint position of the viewer 28A.

In addition, in the display control device 12, the information indicating the direction facing the second viewpoint video displayed on the display 204 of the second HMD 34B is acquired by the first acquisition unit 58A as the first visual line direction information. Therefore, the visual line direction of the viewer 28B can be easily determined as compared to a case in which the visual line direction of the viewer 28B is determined by detecting the visual line direction of the viewer 28B by a detection device.

In addition, in the display control device 12, the second HMD 34B having the display 204 is mounted on the head of the viewer 28B, and the second avatar-containing viewpoint video is displayed on the display 204. Therefore, the second viewpoint video and the second avatar can be visually perceived by the viewer 28B through the second HMD 34B.

In addition, in the display control device 12, the second viewpoint video is selected from among the plurality of viewpoint videos 46 in response to the second viewpoint visual line instruction received by the touch panel 106A of the second smartphone 14B. Therefore, it is possible to provide the viewpoint video from among the plurality of viewpoint videos 46, which is intended by the viewer 28B, to the viewer 28B.

In addition, in the display control device 12, the second avatar for specifying the second viewpoint position is displayed in the second viewpoint video in a case in which the second viewpoint position is included in the second viewpoint video selected from among the plurality of viewpoint videos 46. Then, the size of the second avatar is changed depending on the angle of view of the second viewpoint video, so that the display size of the second avatar is changed depending on the angle of view of the second viewpoint video. Therefore, in a state in which the viewers 28A and 28B can perceive each other's presence through the viewpoint video 46 selected from among the plurality of viewpoint videos 46, the senses of presence of the viewers 28A and 28B can be changed depending on the angle of view of the viewpoint video 46 visually recognized.

In addition, the display control device 12 performs a control of setting the degree of difference between the image quality of the second viewpoint video and the image quality of the second avatar within the second predetermined range. Therefore, as compared to a case in which the degree of difference between the image quality of the second viewpoint video and the image quality of the second avatar is outside the second predetermined range, a visual discomfort caused due to the difference of the image quality of the second viewpoint video and the image quality of the second avatar can be reduced.

In addition, in the display control device 12, the display aspect of the first avatar is changed depending on the relationship between the size of the second viewpoint video and the size of the second avatar, that is, the relationship between the display size of the second viewpoint video and the display size of the second avatar. Therefore, as compared to a case in which the display aspect of the second avatar is fixed regardless of the relationship between the display size of the second viewpoint video and the display size of the second avatar, a visual discomfort caused due to the difference of the display size of the second viewpoint video and the display size of the second avatar can be reduced.

In addition, in the display control device 12, the display aspect of the second avatar is changed in a case in which the ratio of the display size of the second avatar to the display size of the second viewpoint video is equal to or more than the second predetermined value. Specifically, the second avatar is hidden. Therefore, as compared to a case in which the display aspect of the second avatar is fixed regardless of whether or not the ratio of the display size of the second avatar to the display size of the second viewpoint video is equal to or more than the second predetermined value, a visual discomfort caused by the presence of the second avatar prohibiting the visual recognition of the second viewpoint video can be reduced.

In addition, in the display control device 12, the second visual line direction information is acquired by the second acquisition unit 58C. Then, the avatar for specifying the second visual line direction indicated by the second visual line direction information acquired by the second acquisition unit 58C is generated as the second avatar. Therefore, the visual line direction of the viewer 28A can be perceived by the viewer 28B through the second viewpoint video selected from among the plurality of viewpoint videos 46.

In addition, in the display control device 12, each of the plurality of viewpoint videos 46 has the peculiar viewpoint position information. In addition, each of the plurality of viewpoint videos 46 is the video showing the imaging region observed from the viewpoint position indicated by the corresponding peculiar viewpoint position information. Then, the peculiar viewpoint position information of any one of the plurality of viewpoint videos 46 is acquired by the first acquisition unit 58A as the first viewpoint position information, and the peculiar viewpoint position information of any one of the plurality of viewpoint videos 46 is acquired by the second acquisition unit 58C as the second viewpoint position information. Therefore, as compared to a case in which the viewpoint position of each of the viewers 28A and 28B is determined independently of the viewpoint video 46, the viewpoint position having a strong association with the viewpoint video 46 can be determined as the viewpoint position of each of the viewers 28A and 28B.

In addition, in the display control device 12, the peculiar viewpoint position information corresponding to the second viewpoint video displayed on the display 204 of the second HMD 34B is acquired by the first acquisition unit 58A as the first viewpoint position information. In addition, the peculiar viewpoint position information corresponding to the first viewpoint video displayed on the display 154 of the first HMD 34A is acquired by the second acquisition unit 58C as the second viewpoint position information. Therefore, as compared to a case in which the viewpoint position of each of the viewers 28A and 28B is determined independently of the displayed viewpoint video 46, the viewpoint position having a strong association with the displayed viewpoint video 46 can be determined as the viewpoint position of each of the viewers 28A and 28B.

In addition, in the display control device 12, the information indicating the direction facing the second viewpoint video displayed on the display 204 of the second HMD 34B is acquired by the first acquisition unit 58A as the first visual line direction information. In addition, the information indicating the direction facing the first viewpoint video displayed on the display 154 of the first HMD 34A is acquired by the second acquisition unit 58C as the second visual line direction information. Therefore, as compared to a case in which the visual line direction of the viewer 28B is determined by detecting the visual line direction of the viewer 28B by a first detection device and the visual line direction of the viewer 28A is determined by detecting the visual line direction of the viewer 28A by a second detection device, the visual line direction of each of the viewers 28A and 28B can be easily determined.

In addition, in the display control device 12, the setting unit 58E performs setting for hiding the second avatar in a case in which the avatar hide instruction transmitted from the second smartphone 14B is received by the setting unit 58E. Therefore, it is possible to hide the second avatar in the viewpoint video 46 depending on the intention of the viewer 28B.

In addition, in the display control device 12, the first viewpoint position and the second viewpoint position are limited to a partial region of the imaging region (in the examples shown in FIGS. 1 and 3, the spectator seat 26). Therefore, as compared to a case in which the first viewpoint position and the second viewpoint position are not limited to a partial region of the imaging region, the viewers 28A and 28B can easily perceive each other's presence through the viewpoint video selected from among the plurality of viewpoint videos 46.

In addition, in the display control device 12, the setting unit 58E performs setting for hiding the first avatar in a case in which the avatar hide instruction transmitted from the first smartphone 14A is received by the setting unit 58E. Therefore, it is possible to hide the first avatar in the viewpoint video 46 depending on the intention of the viewer 28A.

Further, in the display control device 12, the virtual viewpoint video 46C is included in the plurality of viewpoint videos 46. Therefore, it is possible to grasp the aspect of the imaging region observed from a position at which the actual imaging apparatus is not present.

Note that, in the embodiment described above, the first viewpoint position and the second viewpoint position are limited to a partial region of the imaging region (in the examples shown in FIGS. 1 and 3, the spectator seat 26), but the technology of the present disclosure is not limited to this, and the first viewpoint position or the second viewpoint position may be limited to a partial region of the imaging region.

In addition, in the embodiment described above, the hide of the avatar has been described as an example of changing the display aspect of the avatar, but the technology of the present disclosure is not limited to this. For example, another example of changing the display aspect of the avatar includes display of only the outline of the avatar, and translucency of the avatar.

In addition, in the embodiment described above, the aspect example has been described in which the display aspect of the first avatar is changed only depending on the relationship between the display size of the first viewpoint video and the display size of the first avatar, but the technology of the present disclosure is not limited to this. For example, the first display aspect changing unit 58B6 may change the display aspect of the first avatar depending on the relationship between the display size of the first viewpoint video and the display size of the first avatar and the relationship between the display position of the first viewpoint video and the display position of the first avatar.

Figure 42:
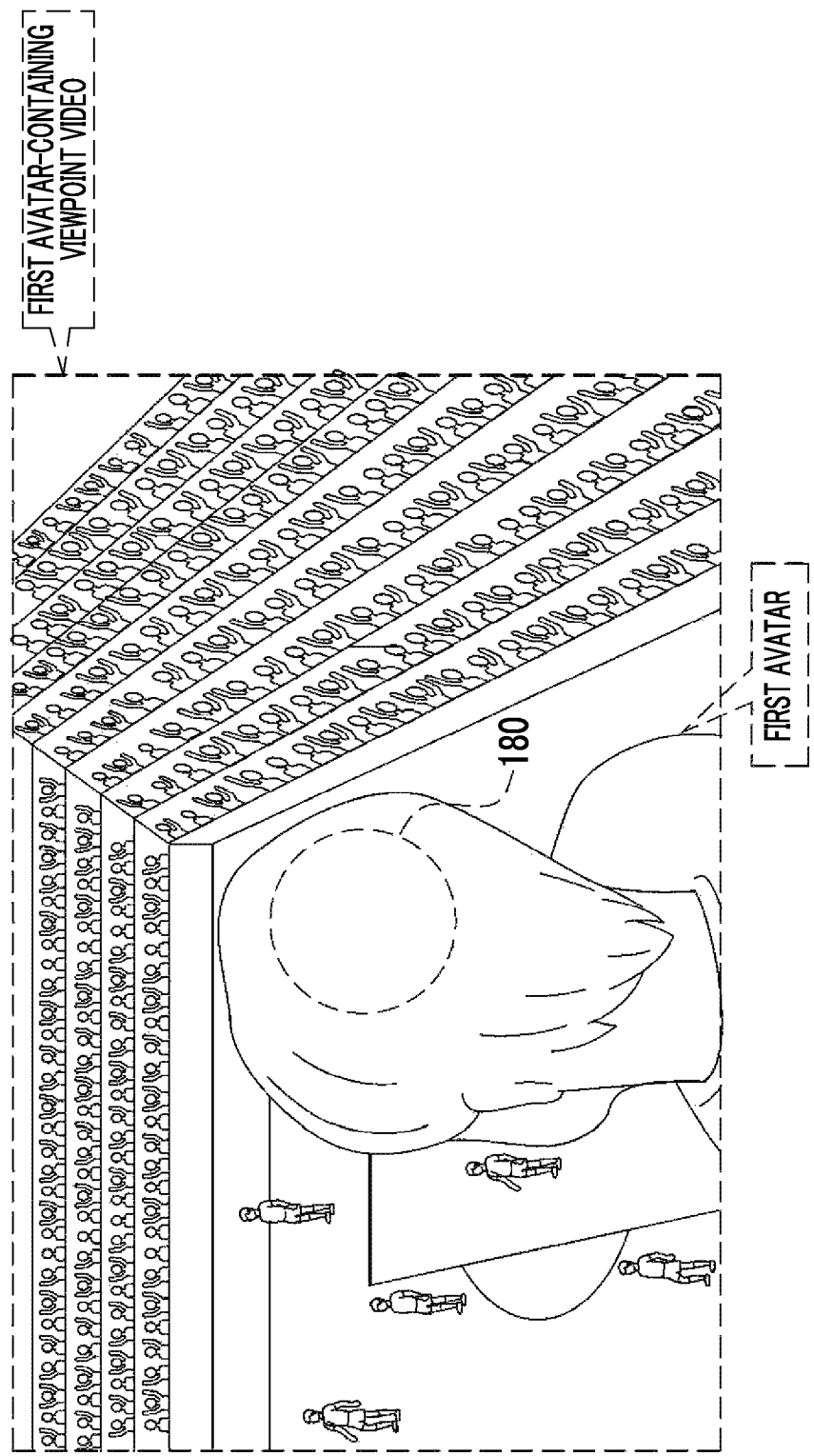
FIG. 42 is a conceptual diagram showing an example of an aspect in which the first avatar is superimposed on a center region of the first avatar-containing viewpoint video.

For example, as shown in FIG. 42, in a case in which the ratio of the display size of the first avatar to the display size of the first avatar-containing viewpoint video is equal to or more than the first predetermined value and the first avatar is superimposed on a specific region (center region 180 in the example shown in FIG. 42) of the first avatar-containing viewpoint video, the display aspect of the first avatar is changed by the first display aspect changing unit 58B6. Examples of the change in the display aspect of the first avatar include deleting the first avatar from the first avatar-containing viewpoint video, displaying only the outline of the first avatar, and translucency the first avatar.

With the present configuration, as compared to the display aspect of the first avatar is fixed regardless of the relationship between the display size of the first viewpoint video and the display size of the first avatar and the relationship between the display position of the first viewpoint video and the display position of the first avatar, a visual discomfort caused by the difference between the display size of the first viewpoint video and the display size of the first avatar and the difference between the display position of the first viewpoint video and the display position of the first avatar can be reduced.

In the example shown in FIG. 42, the display aspect of the first avatar is changed in a case in which the first avatar is superimposed on the center region 180, but the technology of the present disclosure is not limited to this, and the display aspect of the first avatar may be changed in a case in which the first avatar is superimposed on a region different from the center region 180 of the first avatar-containing viewpoint video.

In addition, in the example shown in FIG. 42, the relationships of the size and the position between the first avatar-containing viewpoint video and the first avatar are described as an example. However, the display aspect of the second avatar may be changed by the second display aspect changing unit 58D6 in the same manner as the change of the display aspect of the first avatar as long as the same conditions are satisfied for the relationships of the size and the position between the second avatar-containing viewpoint video and the second avatar. As a result, as compared to the display aspect of the second avatar is fixed regardless of the relationship between the display size of the second viewpoint video and the display size of the second avatar and the relationship between the display position of the second viewpoint video and the display position of the second avatar, a visual discomfort caused by the difference between the display size of the second viewpoint video and the display size of the second avatar and the difference between the display position of the second viewpoint video and the display position of the second avatar can be reduced.

In addition, in the embodiment described above, the aspect example has been described in which the display aspect of the first avatar is changed by hiding the first avatar by the first display aspect changing unit 58B6 in a case in which the ratio of the display size of the first avatar to the display size of the first viewpoint video is equal to or more than the first predetermined value, but the technology of the present disclosure is not limited to this. For example, in a case in which the ratio of the display size of the first avatar to the display size of the first viewpoint video is less than a third predetermined value, the first display aspect changing unit 58B6 may cause the display 154 of the first HMD 34A to display the first avatar in the display aspect emphasized more than other regions of the first avatar-containing viewpoint video. Examples of the display aspect emphasized more than other regions include highlighting the outline of the first avatar, displaying with a mark, such as an arrow indicating the visual line direction of the first avatar, and pop-up display of the first avatar. Note that the third predetermined value is an example of a "second threshold value" according to the technology of the present disclosure. Examples of the third predetermined value include the first predetermined value described above. In addition, the third predetermined value may be a value smaller than the first predetermined value.

With the present configuration, as compared to a case in which the display aspect of the first avatar is fixed regardless of whether or not the ratio of the display size of the first avatar to the display size of the first viewpoint video is less than the third predetermined value, the presence of the viewer 28B can easily be perceived through the viewpoint video selected from among the plurality of viewpoint videos 46.

Here, the aspect example has been described in which the first avatar is displayed in the display aspect emphasized more than other regions of the first avatar-containing viewpoint video in a case in which the ratio of the display size of the first avatar to the display size of the first viewpoint video is less than the third predetermined value, but the technology of the present disclosure is not limited to this. For example, the display aspect of the second avatar may be changed by the second display aspect changing unit 58D6 in the same manner as the change of the display aspect of the first avatar as long as the same condition is satisfied for the relationship between the display size of the second viewpoint video and the display size of the second avatar. As a result, as compared to a case in which the display aspect of the second avatar is fixed regardless of whether or not the ratio of the display size of the second avatar to the display size of the second viewpoint video is less than the third predetermined value, the presence of the viewer 28A can easily be perceived through the viewpoint video selected from among the plurality of viewpoint videos 46. Note that, in this case, the "third predetermined value" is an example of a "fourth threshold value" according to the technology of the present disclosure.

Figure 43:
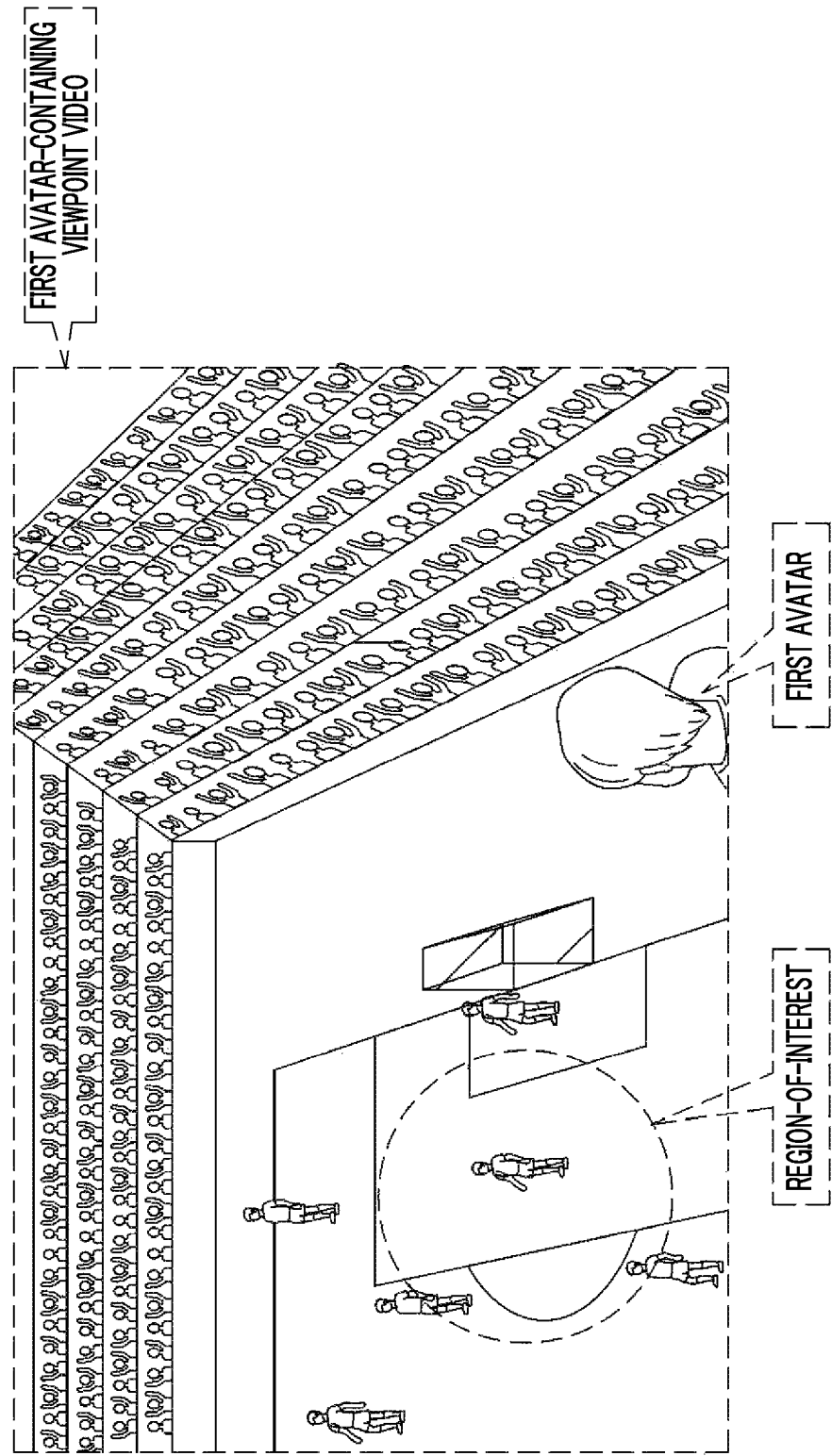
FIG. 43 is a conceptual diagram showing an example of an aspect in which the first avatar is superimposed on a region-of-interest in the first avatar-containing viewpoint video.
Figure 44:
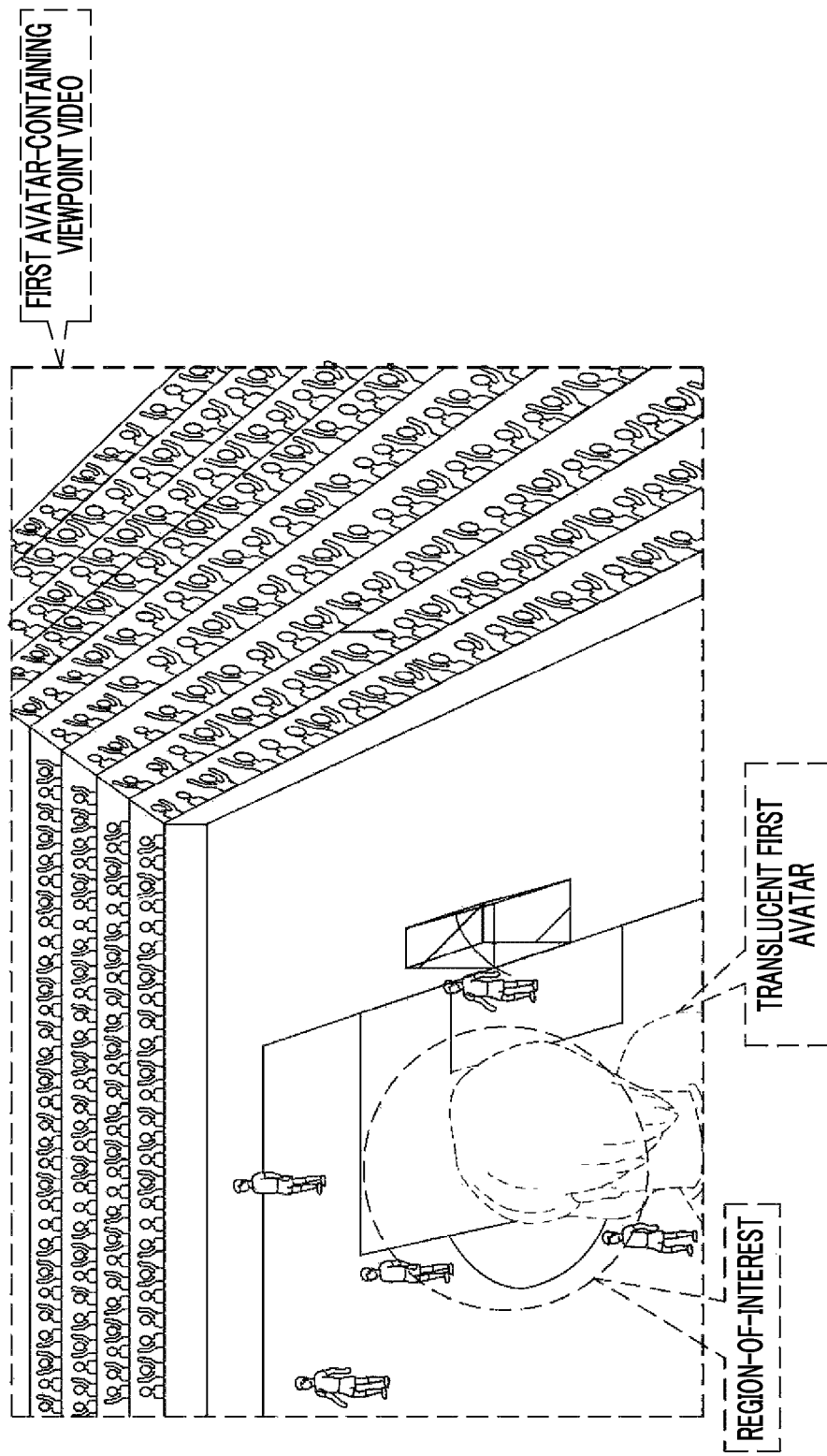
FIG. 44 is a conceptual diagram showing an example of an aspect in which the first avatar is superimposed on the region-of-interest in the first avatar-containing viewpoint video and the first avatar is translucent.

In addition, in the example shown in FIG. 42, the aspect example has been described in which the display aspect is changed in a case in which the first avatar is superimposed on the center region 180, but the technology of the present disclosure is not limited to this. For example, as shown in FIGS. 43 and 44, the display aspect may be changed by the first display aspect changing unit 58B6 in a case in which at least a part of the first avatar is superimposed on a region-of-interest of the viewer 28A with respect to the first avatar-containing viewpoint video. In the example shown in FIG. 43, the first avatar is not superimposed on the region-of-interest, whereas in the example shown in FIG. 44, the first avatar is superimposed on the region-of-interest. In this case, a translucent first avatar that the first avatar is translucent is superimposed and displayed on the first viewpoint video.

The region-of-interest may be determined in response to the instruction received by the reception device 76 of the first smartphone 14A and/or the reception device 152 of the first HMD 34A. In addition, an eye movement of the viewer 28A may be detected by the eye tracker 166 (see FIG. 6) of the first HMD 34A, and the region-of-interest in the first avatar-containing viewpoint video may be determined depending on the detection result.

Note that the display aspect may be changed by the second display aspect changing unit 58D6 in a case in which at least a part of the second avatar is superimposed on a region-of-interest of the viewer 28B with respect to the second avatar-containing viewpoint video. In this case as well, the region-of-interest may be determined in response to the instruction received by the reception device 106 of the second smartphone 14B and/or the reception device 202 of the second HMD 34B. In addition, an eye movement of the viewer 28B may be detected by the eye tracker 216 (see FIG. 6) of the second HMD 34B, and the region-of-interest in the second avatar-containing viewpoint video may be determined depending on the detection result.

In addition, in the embodiment described above, the aspect example has been described in which the peculiar visual line direction information is used as the first visual line direction information and the second visual line direction information, but the technology of the present disclosure is not limited to this. For example, the first visual line direction information may be determined based on the detection result of the eye tracker 166, or the second visual line direction information may be determined based on the detection result of the eye tracker 216.

In addition, in the embodiment described above, the description has been made on the premise that neither the viewers 28A nor 28B spectates in the spectator seat 26, but the viewer 28A and/or the viewer 28B may spectate in the spectator seat 26. In this case, the positions of the viewers 28A and 28B may be specified based on the reception results of the GPS receivers 72 and 102, and the specified positions of the viewers 28A and 28B may be used as the first viewpoint position and the second viewpoint position.

In addition, in the embodiment described above, the aspect example has been described in which one viewpoint video is selected as the first viewpoint video from among the plurality of viewpoint videos 46 in response to the first viewpoint visual line instruction given to the first smartphone 14A, but the technology of the present disclosure is not limited to this. For example, in a state in which the plurality of viewpoint videos 46 are displayed on the display 78 of the first smartphone 14A, the viewer 28A may select any of the viewpoint videos 46 as the first viewpoint video via the touch panel 76A. Note that the same applies to the selection of the second viewpoint video.

In addition, in the embodiment described above, the avatar has been described as an example, but the technology of the present disclosure is not limited to this, and any information may be adopted as long as one of the viewers 28A and 28B can specify the viewpoint position and the visual line direction of the other thereof. Examples of the information for specifying the viewpoint position and the visual line direction include the mark, such as the arrow, a combination of the mark, such as an arrow, and the avatar, or an arrow indicating the position of the avatar.

In addition, in the embodiment described above, the aspect example has been described in which the first display control process, the second display control process, and the setting process (hereinafter referred to as a "display control device side process" in a case in which a distinction is not necessary) are executed by the CPU 58 of the display control device 12, but the technology of the present disclosure is not limited to this, and the display control device side process may be distributed and executed by the first smartphone 14A, the second smartphone 14B, the first HMD 34A, and the second HMD 34B.

Figure 45:
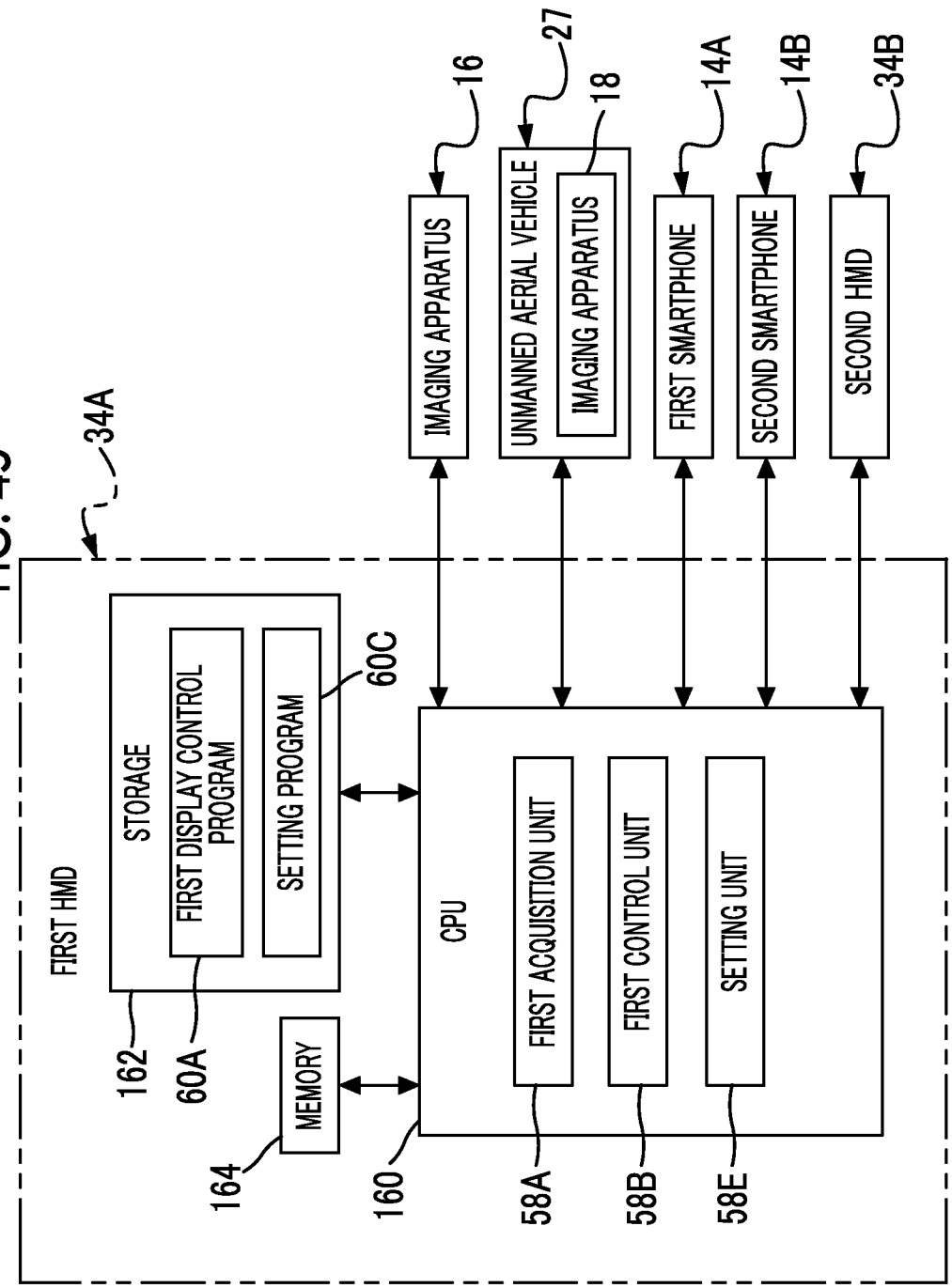
FIG. 45 is a block diagram showing a modification example of a configuration of the first HMD according to the embodiment.

For example, the first display control process and the setting process may be executed by the first HMD 34A, and the second display control process and the setting process may be executed by the second HMD 34B. In this case, as shown in FIG. 45, for example, the first display control program 60A and the setting program 60C are stored in the storage 162 of the first HMD 34A. The CPU 160 executes the first display control process by being operated as the first acquisition unit 58A and the first control unit 58B according to the first display control program 60A. In addition, the CPU 160 executes the setting process by being operated as the setting unit 58E according to the setting program 60C.

Figure 46:
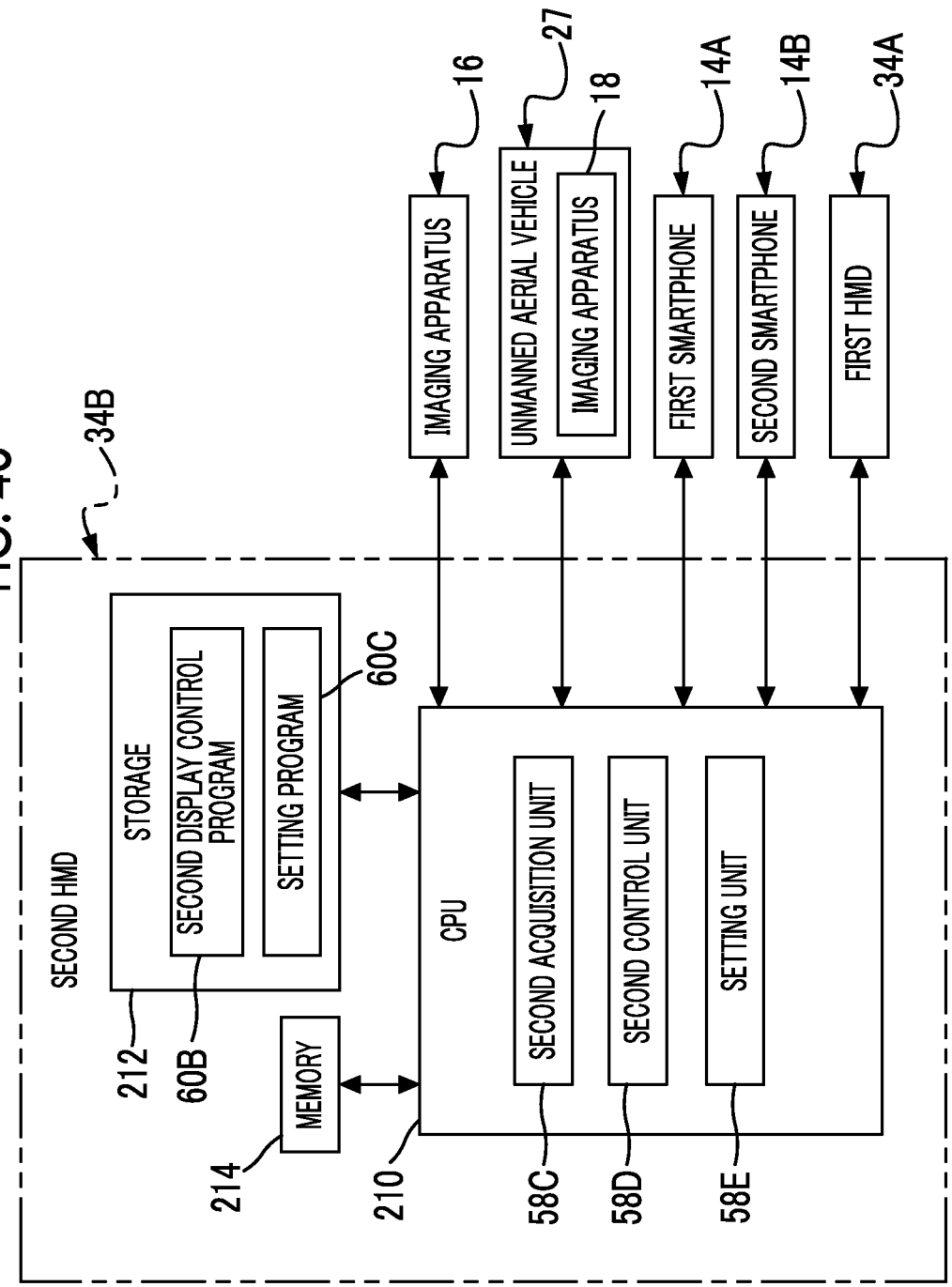
FIG. 46 is a block diagram showing a modification example of a configuration of the second HMD according to the embodiment.

On the other hand, as shown in FIG. 46, for example, the second display control program 60B and the setting program 60C are stored in the storage 212 of the second HMD 34B. The CPU 210 executes the second display control process by being operated as the second acquisition unit 58C and the second control unit 58D according to the second display control program 60B. In addition, the CPU 210 executes the setting process by being operated as the setting unit 58E according to the setting program 60C.

In addition, in the embodiment described above, the first HMD 34A and the second HMD 34B have been described as examples, but the technology of the present disclosure is not limited to this, and at least one of the first HMD 34A or the second HMD 34B can be substituted with various devices equipped with an arithmetic device, such as a smartphone, a tablet terminal, a head-up display, or a personal computer.

In addition, in the embodiment described above, the soccer stadium 22 has been described as an example, but it is merely an example, and any place, such as a baseball stadium, a curling stadium, and a swimming pool, may be adopted as long as the plurality of imaging apparatuses can be installed.

In addition, in the embodiment described above, the wireless communication method using the base station 20 has been described as an example, but it is merely an example, and the technology of the present disclosure is established even in the wired communication method using the cable.

In addition, in the embodiment described above, the unmanned aerial vehicle 27 has been described as an example, but the technology of the present disclosure is not limited to this, and the imaging region may be imaged by the imaging apparatus 18 suspended by a wire (for example, a self-propelled imaging apparatus that can move along the wire).

In addition, in the embodiment described above, the computers 50, 70, 100, 150 and 200 have been described, but the technology of the present disclosure is not limited to theses. For example, instead of the computers 50, 70, 100, 150, and/or 200, a device including an ASIC, an FPGA, and/or a PLD may be applied. In addition, instead of the computers 50, 70, 100, 150, and/or 200, a combination of a hardware configuration and a software configuration may be used.

Figure 47:
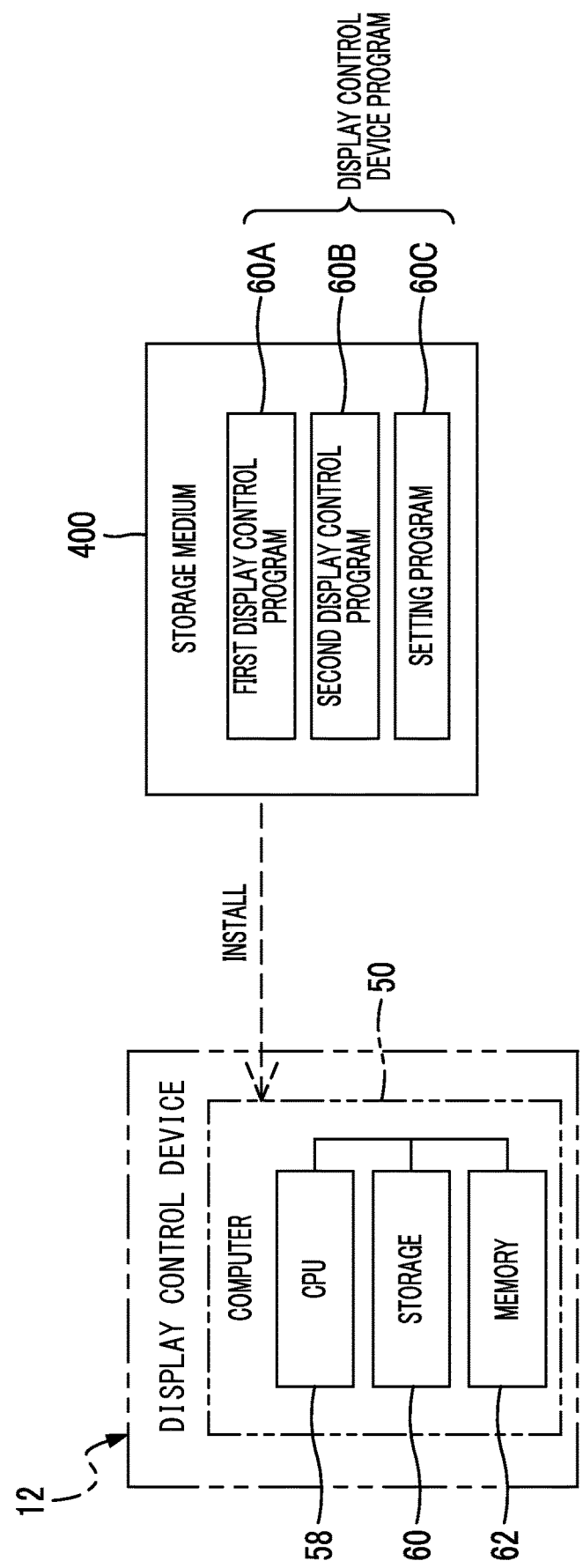
FIG. 47 is a block diagram showing an example of an aspect in which a display control device program in a storage medium in which a display control device program according to the embodiment is stored is installed in a computer of the display control device.

In addition, in the embodiment described above, the display control device program is stored in the storage 60, but the technology of the present disclosure is not limited to this, and as shown in FIG. 47, for example, the display control device program may be stored in any portable storage medium 400, such as an SSD or a USB memory, which is a non-transitory storage medium. In this case, the display control device program stored in the storage medium 400 is installed in the computer 50, and the CPU 58 executes the display control device side process according to the display control device program.

In addition, the display control device program may be stored in a storage unit of another computer or a server device connected to the computer 50 via a communication network (not shown), and the display control device program may be downloaded to the display control device 12 in response to the request of the display control device 12. In this case, the display control device side process based on the downloaded display control device program is executed by the CPU 58 of the computer 50.

In addition, in the embodiment described above, the CPU 58 has been described as an example, but the technology of the present disclosure is not limited to this, and a GPU may be adopted. In addition, a plurality of CPUs may be adopted instead of the CPU 58. That is, the display control device side process may be executed by one processor or a plurality of physically separated processors.

The following various processors can be used as a hardware resource for executing the display control device side process. Examples of the processor include a CPU, which is a general-purpose processor that functions as software, that is, the hardware resource for executing the display control device side process according to the program, as described above. In addition, another example of the processor includes a dedicated electric circuit which is a processor having a circuit configuration specially designed for executing a specific process, such as an FPGA, a PLD, or an ASIC. A memory is also built in or connected to each processor, and each processor executes the display control device side process by using the memory.

The hardware resource for executing the display control device side process may be configured by one of the various processors, or may be a combination of two or more processors of the same type or different types (for example, a combination of a plurality of FPGAs or a combination of a CPU and an FPGA). In addition, the hardware resource for executing the display control device side process may be one processor.

As an example of configuring the hardware resource with one processor, first, as represented by a computer such as a client computer or a server, there is a form in which one processor is configured by a combination of one or more CPUs and software, and the processor functions as the hardware resource for executing the display control device side process. Secondly, as represented by SoC, there is an aspect in which a processor that realizes the functions of the whole system including a plurality of the hardware resources for executing the display control device side process with one IC chip is used. In this way, the display control device side process is realized by using one or more of the various processors described above as the hardware resource.

Further, as the hardware structure of these various processors, more specifically, an electric circuit in which circuit elements such as semiconductor elements are combined can be used.

In addition, the display control device side process described above is merely an example. Therefore, it is needless to say that unnecessary steps may be deleted, new steps may be added, or the process order may be changed within a range that does not deviate from the gist.

The contents described and shown above are the detailed description of the parts according to the technology of the present disclosure, and are merely examples of the technology of the present disclosure. For example, the description of the configuration, the function, the action, and the effect above are the description of examples of the configuration, the function, the action, and the effect of the parts according to the technology of the present disclosure. Accordingly, it is needless to say that unnecessary parts may be deleted, new elements may be added, or replacements may be made with respect to the contents described and shown above within a range that does not deviate from the gist of the technology of the present disclosure. In addition, in order to avoid complications and facilitate understanding of the parts according to the technology of the present disclosure, in the contents described and shown above, the description of common technological knowledge and the like that do not particularly require description for enabling the implementation of the technology of the present disclosure are omitted.

In the present specification, "A and/or B" is synonymous with "at least one of A or B". That is, "A and/or B" means that it may be only A, only B, or a combination of A and B. In addition, in the present specification, in a case in which three or more matters are associated and expressed by "and/or", the same concept as "A and/or B" is applied.

All of the documents, the patent applications, and the technical standards described in the present specification are incorporated in the present specification by referring to the same extent as a case in which individual document, patent application, and technical standard are specifically and individually noted to be incorporated by reference.

Regarding the embodiment described above, the following supplementary note will be further disclosed.
(Supplementary Note 1)

A display control device including a processor, and a memory built in or connected to the processor, in which the processor acquires first viewpoint position information indicating a first viewpoint position of a first person with respect to an imaging region, performs a control of displaying a first viewpoint video selected from among a plurality of viewpoint videos generated based on images obtained by imaging the imaging region from a plurality of viewpoint positions different from each other on a first display unit, the first display unit being capable of displaying a video visually recognized by a second person different from the first person, and performs a control of displaying first specific information for specifying the first viewpoint position indicated by the acquired first viewpoint position information in the first viewpoint video and performs a control of changing a display size of the first specific information depending on an angle of view of the first viewpoint video displayed on the first display unit in a case in which the first viewpoint position indicated by the acquired first viewpoint position information is included in the first viewpoint video.

What is claimed is:

1. A display control device comprising:
a processor; and
a memory connected to or built in the processor,
wherein the processor
acquires first position information indicating a first position of a first person with respect to an imaging region,
performs a control of causing a first display capable of displaying a video visually recognized by a second person different from the first person to display a first viewpoint video selected from among a plurality of viewpoint videos, and
performs a control of displaying first specific information for specifying the first position indicated by the acquired first position information in the first viewpoint video and performs a control of changing a display size of the first specific information depending on an angle of view of the first viewpoint video displayed on the first display in a case in which the first position indicated by the acquired first position information is included in the first viewpoint video.

2. The display control device according to claim 1, wherein the processor performs a control of setting a degree of difference between an image quality of the first viewpoint video and an image quality of the first specific information within a first predetermined range.

3. The display control device according to claim 1, wherein the processor performs a control of changing a display aspect of the first specific information depending on a relationship between a display size of the first viewpoint video and the display size of the first specific information.

4. The display control device according to claim 3, wherein the processor changes the display aspect of the first specific information by performing a control of hiding the first specific information, performing a control of displaying only an outline of the first specific information, or performing a control of translucently displaying the first specific information in a case in which a ratio of the display size of the first specific information to the display size of the first viewpoint video is equal to or more than a first threshold value.

5. The display control device according to claim 3, wherein the processor changes the display aspect of the first specific information depending on the relationship between the display size of the first viewpoint video and the display size of the first specific information and a relationship between a display position of the first viewpoint video and a display position of the first specific information.

6. The display control device according to claim 3, wherein the processor performs a control of displaying the first specific information in a display aspect emphasized more than other regions in the first viewpoint video in a case in which a ratio of the display size of the first specific information to the display size of the first viewpoint video is less than a second threshold value.

7. The display control device according to claim 1, wherein the first display is provided in a first head mounted display mounted on the second person.

8. The display control device according to claim 1, wherein the first viewpoint video is a viewpoint video selected from among the plurality of viewpoint videos in response to a first instruction for selecting any one of the plurality of viewpoint videos, which is received by a first reception device capable of receiving the first instruction.

9. The display control device according to claim 1,
wherein the processor further acquires first visual line direction information indicating a first visual line direction of the first person with respect to the imaging region, and
the first specific information includes information for specifying the first visual line direction indicated by the first visual line direction information acquired by the processor.

10. The display control device according to claim 1,
wherein each of the plurality of viewpoint videos has peculiar viewpoint position information indicating a peculiar viewpoint position,
each of the plurality of viewpoint videos is a video showing the imaging region observed from the corresponding peculiar viewpoint position, and
the first position information is the peculiar viewpoint position information of any one of the plurality of viewpoint videos.

11. The display control device according to claim 10,
wherein the processor acquires the peculiar viewpoint position information corresponding to a second viewpoint video selected from among the plurality of viewpoint videos, which is displayed on a second display capable of displaying a video visually recognized by the first person and the second viewpoint video, as the first position information.

12. The display control device according to claim 1,
wherein the processor further acquires first visual line direction information indicating a first visual line direction of the first person with respect to the imaging region,
the first specific information includes information for specifying the first visual line direction indicated by the first visual line direction information acquired by the processor, and
the processor acquires information indicating a direction facing a second viewpoint video selected from among the plurality of viewpoint videos, which is displayed on a second display capable of displaying a video visually recognized by the first person and the second viewpoint video, as the first visual line direction information.

13. The display control device according to claim 12,
wherein the second display is provided in a second head mounted display mounted on the first person.

14. The display control device according to claim 11,
wherein the second viewpoint video is a viewpoint video selected from among the plurality of viewpoint videos in response to a second instruction for selecting any one of the plurality of viewpoint videos, which is received by a second reception device capable of receiving the second instruction.

15. The display control device according to claim 1,
wherein the processor
acquires second viewpoint position information indicating a second viewpoint position of the second person with respect to the imaging region,
performs a control of causing a second display capable of displaying a video visually recognized by the first person to display a second viewpoint video selected from among the plurality of viewpoint videos, and
performs a control of displaying second specific information for specifying the second viewpoint position indicated by the acquired second viewpoint position information in the second viewpoint video and performs a control of changing a display size of the second specific information depending on an angle of view of the second viewpoint video displayed on the second display in a case in which the second viewpoint position indicated by the acquired second viewpoint position information is included in the second viewpoint video.

16. The display control device according to claim 15,
wherein the processor performs a control of setting a degree of difference between an image quality of the second viewpoint video and an image quality of the second specific information within a second predetermined range.

17. The display control device according to claim 15,
wherein the processor performs a control of changing a display aspect of the second specific information depending on a relationship between a display size of the second viewpoint video and the display size of the second specific information.

18. The display control device according to claim 17,
wherein the processor changes the display aspect of the second specific information by performing a control of hiding the second specific information, performing a control of displaying only an outline of the second specific information, or performing a control of translucently displaying the second specific information in a case in which a ratio of the display size of the second specific information to the display size of the second viewpoint video is equal to or more than a third threshold value.

19. The display control device according to claim 15,
wherein the processor changes the display aspect of the second specific information depending on a relationship between a display size of the second viewpoint video and the display size of the second specific information and a relationship between a display position of the second viewpoint video and a display position of the second specific information.

20. The display control device according to claim 17,
wherein the processor performs a control of displaying the second specific information in a display aspect emphasized more than other regions in the second viewpoint video in a case in which a ratio of the display size of the second specific information to the display size of the second viewpoint video is less than a fourth threshold value.

21. The display control device according to claim 15,
wherein the processor further acquires second visual line direction information indicating a second visual line direction of the second person with respect to the imaging region, and
the second specific information includes information for specifying the second visual line direction indicated by the second visual line direction information acquired by the processor.

22. The display control device according to claim 15,
wherein each of the plurality of viewpoint videos has peculiar viewpoint position information indicating a peculiar viewpoint position,
each of the plurality of viewpoint videos is a video showing the imaging region observed from the corresponding peculiar viewpoint position, and
each of the first position information and the second viewpoint position information is the peculiar viewpoint position information of any one of the plurality of viewpoint videos.

23. The display control device according to claim 22,
wherein the processor acquires the peculiar viewpoint position information corresponding to the second viewpoint video selected from among the plurality of viewpoint videos, which is displayed on the second display capable of displaying the video visually recognized by the first person and the second viewpoint video, as the first position information, and the processor acquires the peculiar viewpoint position information corresponding to the first viewpoint video displayed on the first display as the second viewpoint position information.

24. The display control device according to claim 15, wherein the processor further acquires first visual line direction information indicating a first visual line direction of the first person with respect to the imaging region, the first specific information includes information for specifying the first visual line direction indicated by the first visual line direction information acquired by the processor, the processor acquires information indicating a direction facing the second viewpoint video displayed on the second display as the first visual line direction information, the processor further acquires second visual line direction information indicating a second visual line direction of the second person with respect to the imaging region, the second specific information includes information for specifying the second visual line direction indicated by the second visual line direction information acquired by the processor, and the processor acquires information indicating a direction facing the first viewpoint video displayed on the first display as the second visual line direction information.

25. The display control device according to claim 15, wherein the second display is provided in a second head mounted display mounted on the first person.

26. The display control device according to claim 15, wherein the second viewpoint video is a viewpoint video selected from among the plurality of viewpoint videos in response to a second instruction for selecting any one of the plurality of viewpoint videos, which is received by a second reception device capable of receiving the second instruction.

27. The display control device according to claim 15, wherein the processor performs setting for hiding the second specific information in a case in which a first predetermined condition is satisfied.

28. The display control device according to claim 1, wherein a viewpoint position of at least one of the first person or the second person with respect to the imaging region is limited to a partial region of the imaging region.

29. The display control device according to claim 1, wherein the processor performs setting for hiding the first specific information in a case in which a second predetermined condition is satisfied.

30. The display control device according to claim 1, wherein at least one of the plurality of viewpoint videos is a virtual viewpoint video.

31. A display control method comprising:

acquiring first position information indicating a first position of a first person with respect to an imaging region;

performing a control of causing a first display capable of displaying a video visually recognized by a second person different from the first person to display a first viewpoint video selected from among a plurality of viewpoint videos; and performing a control of displaying first specific information for specifying the first position indicated by the acquired first position information in the first viewpoint video and performing a control of changing a display size of the first specific information depending on an angle of view of the first viewpoint video displayed on the first display in a case in which the first position indicated by the acquired first position information is included in the first viewpoint video.

32. A non-transitory computer-readable storage medium storing a program for causing a computer to execute a process comprising:

acquiring first position information indicating a first position of a first person with respect to an imaging region;

performing a control of causing a first display capable of displaying a video visually recognized by a second person different from the first person to display a first viewpoint video selected from among a plurality of viewpoint videos; and performing a control of displaying first specific information for specifying the first position indicated by the acquired first position information in the first viewpoint video and performing a control of changing a display size of the first specific information depending on an angle of view of the first viewpoint video displayed on the first display in a case in which the first position indicated by the acquired first position information is included in the first viewpoint video.

\* \* \* \* \*